(12) United States Patent
Harrison et al.

(10) Patent No.: US 12,552,786 B2
(45) Date of Patent: *Feb. 17, 2026

(54) INHIBITORS OF αvβ6 INTEGRIN

(71) Applicant: Morphic Therapeutic, Inc., Waltham, MA (US)

(72) Inventors: Bryce A. Harrison, Framingham, MA (US); James E. Dowling, Lexington, MA (US); Aleksey I. Gerasyuto, Flemington, NJ (US); Matthew G. Bursavich, Needham, MA (US); Dawn M. Troast, Bedford, MA (US); Blaise S. Lippa, Newton, MA (US); Bruce N. Rogers, Belmont, MA (US); Cheng Zhong, Belmont, MA (US); Qi Qiao, Natick, MA (US); Fu-Yang Lin, Sudbury, MA (US); Brian Sosa, Cambridge, MA (US); Andrea Bortolato, Metuchen, NJ (US); Mats A. Svensson, New York, NY (US); Eugene Hickey, Danbury, CT (US); Kyle D. Konze, Katonah, NY (US); Tyler Day, New York, NY (US); Byungchan Kim, West New York, NJ (US)

(73) Assignee: Morphic Therapeutic, Inc., Waltham, MA (US)

( * ) Notice: Subject to any disclaimer, the term of this patent is extended or adjusted under 35 U.S.C. 154(b) by 700 days.

This patent is subject to a terminal disclaimer.

(21) Appl. No.: 17/967,342

(22) Filed: Oct. 17, 2022

(65) Prior Publication Data
US 2023/0219947 A1    Jul. 13, 2023

Related U.S. Application Data

(63) Continuation of application No. 17/718,844, filed on Apr. 12, 2022, now abandoned, which is a continuation of application No. 17/513,327, filed on Oct. 28, 2021, now abandoned, which is a continuation of application No. 17/271,990, filed as application No. PCT/US2019/048738 on Aug. 29, 2019, now abandoned.

(60) Provisional application No. 62/724,419, filed on Aug. 29, 2018.

(51) Int. Cl.
   *C07D 471/04*   (2006.01)
   *A61K 9/00*     (2006.01)
   *C07D 519/00*   (2006.01)

(52) U.S. Cl.
   CPC .......... *C07D 471/04* (2013.01); *A61K 9/0053* (2013.01); *C07D 519/00* (2013.01)

(58) Field of Classification Search
   CPC ... C07D 471/04; C07D 519/00; A61K 9/0053
   See application file for complete search history.

(56) References Cited

U.S. PATENT DOCUMENTS

| | | | |
|---|---|---|---|
| 5,952,341 | A | 9/1999 | Duggan et al. |
| 6,017,926 | A | 1/2000 | Askew et al. |
| 6,048,861 | A | 4/2000 | Askew et al. |
| 6,069,143 | A | 5/2000 | Ali et al. |
| 6,232,308 | B1 | 5/2001 | Askew |
| 6,358,970 | B1 | 3/2002 | Duggan et al. |
| 6,723,711 | B2 | 4/2004 | Biediger et al. |
| 8,716,226 | B2 | 5/2014 | Ruminski et al. |
| 9,572,801 | B2 | 2/2017 | Askew et al. |
| 10,604,520 | B2 | 3/2020 | Jiang et al. |
| 10,696,672 | B2 | 6/2020 | Morgans, Jr. et al. |
| 10,793,564 | B2 | 10/2020 | Cha et al. |
| 11,021,480 | B2 | 6/2021 | Harrison et al. |
| 11,040,955 | B2 | 6/2021 | Brewer et al. |
| 11,046,669 | B2 | 6/2021 | Harrison et al. |
| 11,046,685 | B2 | 6/2021 | Harrison et al. |
| 11,739,087 | B2 | 8/2023 | Harrison et al. |
| 11,795,167 | B2 | 10/2023 | Harrison et al. |
| 11,827,621 | B2 | 11/2023 | Brewer et al. |
| 12,145,935 | B2 | 11/2024 | Harrison et al. |
| 12,415,796 | B2 | 9/2025 | Brewer et al. |
| 2001/0034445 | A1 | 10/2001 | Ali et al. |
| 2002/0010176 | A1 | 1/2002 | Askew et al. |
| 2002/0035127 | A1 | 3/2002 | Head et al. |
| 2004/0043988 | A1 | 3/2004 | Khanna et al. |
| 2008/0045521 | A1 | 2/2008 | Arnould et al. |
| 2009/0104116 | A1 | 4/2009 | Zischinsky et al. |
| 2012/0289481 | A1 | 11/2012 | O'Neil et al. |
| 2014/0038910 | A1 | 2/2014 | Ruminski et al. |
| 2014/0051715 | A1 | 2/2014 | Ruminski et al. |
| 2014/0349968 | A1 | 11/2014 | O'Neil et al. |

(Continued)

FOREIGN PATENT DOCUMENTS

| | | | | |
|---|---|---|---|---|
| CN | 101861319 A | | 10/2010 | |
| CN | 110573499 B | * | 4/2023 | ........... C07D 401/12 |

(Continued)

OTHER PUBLICATIONS

Extended European Search Report for EP Application No. 22205911.5 dated Mar. 5, 2023.

(Continued)

*Primary Examiner* — Joseph K McKane
*Assistant Examiner* — David M Shim
(74) *Attorney, Agent, or Firm* — Macharri Vorndran-Jones

(57) ABSTRACT

Disclosed are small molecule inhibitors of αvβ6 integrin, and methods of using them to treat a number of diseases and conditions.

20 Claims, 2 Drawing Sheets

(56) References Cited

U.S. PATENT DOCUMENTS

| | | |
|---|---|---|
| 2016/0280705 A1 | 9/2016 | Anderson et al. |
| 2017/0290817 A1 | 10/2017 | Anderson et al. |
| 2017/0369490 A1 | 12/2017 | Askew et al. |
| 2018/0008583 A1 | 1/2018 | Fukunaga et al. |
| 2018/0093984 A1 | 4/2018 | Jiang et al. |
| 2018/0244648 A1 | 8/2018 | Harrison et al. |
| 2019/0248832 A1 | 8/2019 | Almeida et al. |
| 2019/0276449 A1 | 9/2019 | Cha et al. |
| 2020/0002334 A1 | 1/2020 | Harrison et al. |
| 2020/0071322 A1 | 3/2020 | Harrison et al. |
| 2020/0087299 A1 | 3/2020 | Brewer et al. |
| 2020/0109141 A1 | 4/2020 | Cha et al. |
| 2020/0157075 A1 | 5/2020 | Harrison et al. |
| 2020/0354359 A1 | 11/2020 | Harrison et al. |
| 2020/0385384 A1 | 12/2020 | Harrison et al. |
| 2021/0276975 A1 | 9/2021 | Brewer et al. |
| 2021/0284640 A1 | 9/2021 | Harrison et al. |
| 2022/0073511 A1 | 3/2022 | Harrison et al. |
| 2023/0219947 A1 | 7/2023 | Harrison et al. |
| 2023/0219949 A1 | 7/2023 | Harrison et al. |
| 2023/0242524 A1 | 8/2023 | Harrison et al. |
| 2024/0116929 A1 | 4/2024 | Harrison et al. |
| 2024/0327378 A1 | 10/2024 | Brewer et al. |
| 2024/0376095 A1 | 11/2024 | Harrison et al. |
| 2025/0223289 A1 | 7/2025 | Harrison et al. |

FOREIGN PATENT DOCUMENTS

| | | | |
|---|---|---|---|
| EP | 0537696 | A1 | 4/1993 |
| EP | 0623615 | A1 | 11/1994 |
| EP | 0796855 | A1 | 9/1997 |
| EP | 2221308 | A1 | 8/2010 |
| JP | 2015/524412 | A | 8/2015 |
| WO | WO-1993/10091 | A2 | 5/1993 |
| WO | WO-93/14077 | A1 | 7/1993 |
| WO | WO-97/24122 | A1 | 7/1997 |
| WO | WO-97/24124 | A1 | 7/1997 |
| WO | WO-97/25323 | A1 | 7/1997 |
| WO | WO-97/26250 | A1 | 7/1997 |
| WO | WO-97/36871 | A1 | 10/1997 |
| WO | WO-98/08840 | A1 | 3/1998 |
| WO | WO-98/18460 | A1 | 5/1998 |
| WO | WO-98/46220 | A1 | 10/1998 |
| WO | WO-1998/044797 | A1 | 10/1998 |
| WO | WO-1999/026945 | A1 | 6/1999 |
| WO | WO-1999/030709 | A1 | 6/1999 |
| WO | WO-1999/030713 | A1 | 6/1999 |
| WO | WO-1999/031061 | A1 | 6/1999 |
| WO | WO-1999/031099 | A1 | 6/1999 |
| WO | WO-2000/006169 | A1 | 2/2000 |
| WO | WO-2000/031067 | A1 | 6/2000 |
| WO | WO-2000/037487 | A1 | 6/2000 |
| WO | WO-2000/072801 | A2 | 12/2000 |
| WO | WO-2000/073260 | A1 | 12/2000 |
| WO | WO-2000/78317 | A1 | 12/2000 |
| WO | WO-2001/005810 | A2 | 1/2001 |
| WO | WO-2001/023357 | A2 | 4/2001 |
| WO | WO-2001/044194 | A2 | 6/2001 |
| WO | WO-2001/053262 | A1 | 7/2001 |
| WO | WO-2001/053297 | A1 | 7/2001 |
| WO | WO-2001/096334 | A2 | 12/2001 |
| WO | WO-2002/16328 | A1 | 2/2002 |
| WO | WO-2002/022124 | A1 | 3/2002 |
| WO | WO-2002/022615 | A1 | 3/2002 |
| WO | WO-2002/022616 | A2 | 3/2002 |
| WO | WO-02/060438 | A1 | 8/2002 |
| WO | WO-2002/074730 | A1 | 9/2002 |
| WO | WO-2002/090325 | A2 | 11/2002 |
| WO | WO-2003/066594 | A2 | 8/2003 |
| WO | WO-2004/020435 | A1 | 3/2004 |
| WO | WO-2006/024699 | A1 | 3/2006 |
| WO | WO-2008/157162 | A1 | 12/2008 |
| WO | WO-2014/015054 | A1 | 1/2014 |
| WO | WO-2014/154725 | A1 | 10/2014 |
| WO | WO-2014/154809 | A1 | 10/2014 |
| WO | WO-2015/103643 | A2 | 7/2015 |
| WO | WO-2015/150557 | A1 | 10/2015 |
| WO | WO-2015/179823 | A2 | 11/2015 |
| WO | WO-2016/022851 | A1 | 2/2016 |
| WO | WO-2016/046225 | A1 | 3/2016 |
| WO | WO-2016/046226 | A1 | 3/2016 |
| WO | WO-2016/046230 | A1 | 3/2016 |
| WO | WO-2016/046241 | A1 | 3/2016 |
| WO | WO-2016/176532 | A1 | 11/2016 |
| WO | WO-2017/117538 | A1 | 7/2017 |
| WO | WO-2017/158072 | A1 | 9/2017 |
| WO | WO-2017/162570 | A1 | 9/2017 |
| WO | WO-2017/162572 | A1 | 9/2017 |
| WO | WO-2017/162575 | A1 | 9/2017 |
| WO | WO-2018/009501 | A1 | 1/2018 |
| WO | WO-2018/049068 | A1 | 3/2018 |
| WO | WO-2018/085552 | A1 | 5/2018 |
| WO | WO-2018/085578 | A1 | 5/2018 |
| WO | WO-2018/089353 | A1 | 5/2018 |
| WO | WO-2018/089355 | A1 | 5/2018 |
| WO | WO-2018/089357 | A1 | 5/2018 |
| WO | WO-2018/089358 | A1 | 5/2018 |
| WO | WO-2018/089360 | A1 | 5/2018 |
| WO | WO-2018/119087 | A1 | 6/2018 |
| WO | WO-2018/132268 | A1 | 7/2018 |
| WO | WO-2018/160521 | A2 | 9/2018 |
| WO | WO-2018/160522 | A1 | 9/2018 |
| WO | WO-2019/173653 | A1 | 9/2019 |
| WO | WO-2020/006315 | A1 | 1/2020 |
| WO | WO-2020/009889 | A1 | 1/2020 |
| WO | WO-2020/047207 | A1 | 3/2020 |
| WO | WO-2020/047208 | A1 | 3/2020 |
| WO | WO-2020/047239 | A1 | 3/2020 |
| WO | WO-2020/076862 | A1 | 4/2020 |
| WO | WO-2020/081154 | A1 | 4/2020 |
| WO | WO-2020/210404 | A1 | 10/2020 |
| WO | WO-2020/047207 | A8 | 12/2020 |

OTHER PUBLICATIONS

Meanwell, "Fluorine and Fluorinated Motifs in the Design and Application of Bioisosteres for Drug Design", J. Med. Chem., 61, 5822-5880 (Year: 2018).

Schwartz, "Integrins and extracellular matrix in mechanotransduction", Cold Spring Harbor Perspectives in Biology, 2.12: 1-13, a005066 (2010).

Anderson et al., "The discovery of an orally bioavailable pan-#v integrin inhibitor for idiopathic pulmonary fibrosis," J. Med. Chem., Just Accepted Manuscript, (2019).

Bennet et al., "Cecil Textbook of Medicine," 20th Edition, 1:1004-1010 (1996).

Brashear et al., "Non-Peptide $\alpha_v\beta_3$ Antagonists. Part 5: Identification of Potent RGD Mimetics Incorporating 2-Aryl β-Amino Acids as Aspartic Acid Replacements," Bioorganic & Medicinal Chemistry Letters 12: 3483-3486 (2002).

Breslin et al., "Nonpeptide $\alpha_v\beta_3$ antagonists. Part 10: In vitro and in vivo evaluation of a potent 7-methyl substituted tetrahydro-[1,8]naphthyridine derivative," Bioorganic & Medicinal Chemistry Letters, 14: 4515-4518 (2004).

Coleman et al., "Nonpeptide $\alpha_v\beta_3$ Antagonists. Part 11: Discovery and Preclinical Evaluation of Potent $\alpha_v\beta_3$ Antagonists for the Prevention and Treatment of Osteoporosis," J. Med. Chem. 47: 4829-4837 (2004).

Cui et al., "In Vitro and in Vivo Metabolism of a Potent and Selective Integrin $\alpha_v\beta_3$ Antagonist in Rats, Dogs, and Monkeys," Drug Metabolism and Disposition, 32(8): 848-861 (2004).

Database Accession No. 1380858-49-0., Database Registry [Online] Chemical Abstracts Service: XP002799454 (2012).

Database Accession No. 1380909-02-3., Database Registry [Online] Chemical Abstracts Service: XP002799455 (2012).

Database Accession No. 1380948-25-3., Database Registry [Online] Chemical Abstracts Service: XP002799456 (2012).

Database Accession No. 1380999-27-8., Database Registry [Online] Chemical Abstracts Service: XP002799457 (2012).

(56) References Cited

OTHER PUBLICATIONS

Database Accession No. 1571616-43-7., Database Registry [Online] Chemical Abstracts Service: XP002799458 (2014).
Database Accession No. 1623225-85-3., Database Registry [Online] Chemical Abstracts Service: XP002799459 (2014).
Database Accession No. 1837357-51-3., Database Registry [Online] Chemical Abstracts Service: XP002799460 (2015).
Database Accession No. 1838839-35-2., Database Registry [Online] Chemical Abstracts Service: XP002799461 (2015).
Database Accession No. 1940788-29-3., Database Registry [Online] Chemical Abstracts Service: XP002799462 (2016).
Database Accession No. 2038980-05-9., Database Registry [Online] Chemical Abstracts Service: XP002799463 (2016).
Database Registry, Chemical Abstracts Services, CAS Registry No. 1155165-04-0 (Entered STN: Oct. 6, 2009).
Dermeret et al., "Another Anniversary for the War on Cancer," Bio/Technology, 12:320 (1994).
Duggan et al., "Nonpeptide $\alpha_v\beta_3$ Antagonists. 1. Transformation of a Potent, Integrin-Selective $\alpha_v\beta_3$ Antagonist into a Potent $\alpha_v\beta_3$ Antagonist," J. Med. Chem. 43: 3736-3745 (2000).
Extended European Search Report for EP Application No. 18761396.3 mailed Jul. 2, 2020.
Extended European Search Report for EP Application No. 19853732.6 dated Jul. 15, 2022.
Extended European Search Report for EP Application No. 20190341.6 dated Sep. 28, 2020.
Extended European Search Report for EP Application No. 22173105.2 dated Aug. 18, 2022.
Extended European Search Report for EP Application No. 22189738.2 dated Jan. 26, 2023.
Extended European Search Report for EP Application No. EP 18760393.1 dated Jul. 14, 2020.
Extended European Search Report for EP Application No. EP 19194490 dated Dec. 10, 2019.
Extended European Search Report in EP Application No. 19856339.7 dated Apr. 25, 2022.
Extended European Search Report in EP Application No. 19873423.8 dated Apr. 28, 2022.
Freshney et al., "Culture of Animal Cells, A Manual of Basic Technique," 4, (1983).
Goodman et al., "Nanomolar Small Molecule Inhibitors for $\alpha_v\beta_6$, $\alpha_v\beta_5$, and $\alpha_v\beta_3$ Integrins," J. Med. Chem. 45: 1045-1051 (2002).
Hall et al., "Characterisation of a novel, high affinity and selective $\alpha_v\beta_6$ integrin RGD-mimetic radioligand," Biochemical Pharmacology, 117(1): 88-96 (2016).
Hatley et al., "An αv-RGD integrin inhibitor toolbox: drug discovery insight, challenges and opportunities," Angew. Chem., 57(13): 3298-3321 (2017).
Hutchinson et al., "Nonpeptide $\alpha_v\beta_3$ Antagonists. 8. In Vitro and in Vivo Evaluation of a Potent $\alpha_v\beta_3$ Antagonist for the Prevention and Treatment of Osteoporosis," J. Med. Chem. 46: 4790- 4798 (2003).
International Preliminary Report on Patentability for International Application No. PCT/EP00/06188 mailed May 31, 2001.
International Preliminary Report on Patentability for International Application No. PCT/EP02/01836 mailed Oct. 14, 2002.
International Preliminary Report on Patentability for International Application No. PCT/EP2003/000327 mailed Dec. 3, 2003.
International Preliminary Report on Patentability for International Application No. PCT/EP2014/056167 mailed Sep. 29, 2015.
International Preliminary Report on Patentability for International Application No. PCT/EP99/09842 mailed Jan. 12, 2001.
International Preliminary Report on Patentability for International Application No. PCT/FI2005/050305 mailed Feb. 28, 2007.
International Preliminary Report on Patentability for International Application No. PCT/GB00/02020 mailed Sep. 19, 2001.
International Preliminary Report on Patentability for International Application No. PCT/GB00/04831 mailed Oct. 1, 2002.
International Preliminary Report on Patentability for International Application No. PCT/US00/14901 mailed Mar. 28, 2001.
International Preliminary Report on Patentability for International Application No. PCT/US00/16849 mailed Jun. 29, 2001.
International Preliminary Report on Patentability for International Application No. PCT/US00/26537 mailed Jan. 1, 2002.
International Preliminary Report on Patentability for International Application No. PCT/US01/01298 mailed Oct. 8, 2001.
International Preliminary Report on Patentability for International Application No. PCT/US01/01953 mailed Sep. 8, 2001.
International Preliminary Report on Patentability for International Application No. PCT/US01/28238 mailed Jul. 31, 2002.
International Preliminary Report on Patentability for International Application No. PCT/US01/28404 mailed Apr. 25, 2002.
International Preliminary Report on Patentability for International Application No. PCT/US01/42146 mailed Sep. 5, 2002.
International Preliminary Report on Patentability for International Application No. PCT/US02/13457 mailed Jul. 22, 2003.
International Preliminary Report on Patentability for International Application No. PCT/US2019/048734 dated Mar. 2, 2021 (Our Reference MTX-00625).
International Preliminary Report on Patentability for International Application No. PCT/US2019/048737 dated Mar. 2, 2021 (Our Reference MTX-00725).
International Preliminary Report on Patentability for International Application No. PCT/US2019/048738 dated Mar. 2, 2021 (Our Reference MTX-00825).
International Preliminary Report on Patentability for International Application No. PCT/US2019/048782 dated Mar. 2, 2021 (Our Reference MTX-00925).
International Search Report and Written Opinion for International Application No. PCT/US/18/19838 mailed Aug. 8, 2018 (Our reference MTX-00325).
International Search Report and Written Opinion for International Application No. PCT/US18/19839 mailed Aug. 9, 2018 (Our reference MTX-00425).
International Search Report and Written Opinion for International Application No. PCT/US2019/048734 mailed Mar. 20, 2020 (Our Reference MTX-00625).
International Search Report and Written Opinion for International Application No. PCT/US2019/048737 dated Dec. 27, 2019 (our reference MTX-007.25).
International Search Report and Written Opinion for International Application No. PCT/US2019/048738 mailed Jan. 7, 2020 (Our reference MTX-00825).
International Search Report and Written Opinion for International Application No. PCT/US2019/048782 mailed Dec. 27, 2019 (Our reference MTX-00925).
International Search Report for International Application No. PCT/US2019/055252 mailed Jan. 23, 2020.
Invitation to Pay Additional Fees for International Application No. PCT/US2019/048737 dated Oct. 11, 2019.
Invitation to Pay Additional Fees for International Application No. PCT/US2019/048738 dated Oct. 11, 2019.
Invitation to Pay Additional Fees for International Application No. PCT/US2019/048782 dated Oct. 11, 2019.
Kinney el al., "Suzuki-Miyaura Approach to JNJ-26076713, an Orally Active Tetrahydroquinoline-Containing $\alpha_v\beta_3/\alpha_v\beta_5$ Integrin Antagonist. Enantioselective Synthesis and Stereochemical Studies," J. Org. Chem., 73: 2302-2310 (2008).
Macdonald et al., "Passing on the medicinal chemistry baton: training undergraduates to be industry-ready through research projects between the University of Nottingham and GlaxoSmithKline," Drug Discovery Today, 21(6): 880-887 (2016).
Maden et al., "Safety, tolerability and pharmacokinetics of GSK3008348, a novel integrin αvβ6 inhibitor, in healthy participants," European Journal of Clinical Pharmacology, 74: 701-709 (2018).
Meissner et al., "Nonpeptide avß3 antagonists. Part 2: constrained glycyl amides derived from the RGD tripeptide," Bioorganic & Medicinal Chemistry Letters, 12(1): 25-29 (2002).
Peng et al., "Integrin $\alpha_v\beta_6$ Critically Regulates Hepatic Progenitor Cell Function and Promotes Ductular Reaction, Fibrosis, and Tumorigenesis," Hepatology 63(1): 217-232 (2016).

(56) References Cited

OTHER PUBLICATIONS

Perkins et al., "Non-peptide $\alpha_v\beta_3$ Antagonists: Identification of Potent, Chain-Shortened RGD Mimetics that Incorporate a Central Pyrrolidinone Constraint," Bioorganic & Medicinal Chemistry Letters 13: 4285-4288 (2003).
Pickarski et al., "Orally active avß3 integrin inhibitor MK-0429 reduces melanoma metastasis," Oncology Reports, 33(6): 2737-2745 (2015).
Procopiou et al., "Discovery of (S)-3-(3-(3,5-Dimethyl-1H-pyrazol-1-yl)phenyl)-4-((R)-3-(2-(5,6,7,8-tetrahydro-1,8-naphthyridin-2-yl)ethyl)pyrrolidin-1-yl)butanoic Acid, a Nonpeptidic $\alpha_v\beta_6$ Integrin Inhibitor for the Inhaled Treatment of Idiopathic Pulmonary Fibrosis," Journal of Medicinal Chemistry, 61(18): 8417-8443 (2018).
Prueksaritanont et al., "Disposition of a novel and potent $\alpha_v\beta_3$ antagonist in animals, and extrapolation to man," Xenobiotica 34(1):103-115 (2004).
Prueksaritanont et al., "Renal elimination of a novel and potent $\alpha_v\beta_3$ integrin antagonist in animals," Xenobiotica 34(11/12):1059-1074 (2004).
Raab-Westphal et al., "Integrins as Therapeutic Targets: Successes and Cancers," Cancers, 9(110):1-28 (2017).
Rosenthal et al., "Evaluation of the safety, pharmacokinetics and treatment effects of an $\alpha_v\beta_3$ integrin inhibitor on bone turnover and disease activity in men with hormone-refractory prostate cancer and bone metastases," Asia-Pac J Clin Oncol 6:42-48 (2010).
Rosenthal et al., "Evaluation of the safety, pharmacokinetics and treatment effects of an $\alpha_v\beta_3$ integrin inhibitor on bone turnover and disease activity in men with hormone-refractory prostate cancer and bone metastases," Journal of Clinical Oncology 6: 42-48 (2010).
Rubtsov et al., "RGD-based Therapy: Principles of Selectivity," Current Pharmaceutical Design, 22: 925-932 (2016).
Santulli et al., "Studies with an Orally Bioavailable $\alpha_v$ Integrin Antagonist in Animal Models of Ocular Vasculopathy: Retinal Neovascularization in Mice and Retinal Vascular Permeability in Diabetic Rats," Journal of Pharmacology and Experimental Therapeutics, 324(3): 894-901 (2008).
Search Report and Written Opinion for Singaporean Application No. 11201907820S issued Nov. 3, 2020.
Tipping et al., Relative Binding Affinities of Integrin Antagonists by Equilibrium Dialysis and Liquid Chromatography-Mass Spectrometry, Medicinal Chemistry Letters, 6(2): 221-224 (2015).
Wang et al., "Non-peptide $\alpha_v\beta_3$ antagonists. Part 7: 3-Substituted tetrahydro-[1,8]naphthyridine derivatives," Bioorganic & Medicinal Chemistry Letters, 14: 1049-1052 (2004).
Whilding et al., "The integrin $\alpha_v\beta_6$: a novel target for CAR T-cell immunotherapy?," Biochem. Soc. Trans., 44: 349-355 (2016).
Whitman et al., "Nonpeptide $\alpha_v\beta_3$ antagonists. Part 9: Improved pharmacokinetic profile through the use of an aliphatic, des-amide backbone," Bioorganic & Medicinal Chemistry Letters, 14: 4411-4415 (2004).
Written Opinion for International Application No. PCT/US2017/067622 mailed Mar. 8, 2018.
Written Opinion for International Application No. PCT/US2019/021243 mailed Jul. 5, 2019.
Written Opinion for International Application No. PCT/US2019/039624 mailed Sep. 13, 2019.
Written Opinion for International Application No. PCT/US2019/055252 mailed Jan. 23, 2020.
Zhou et al., "An integrin antagonist (MK-0429) decreases proteinuria and renal fibrosis in the ZSF1 rat diabetic nephropathy model," Pharmacology Research & Perspectives, 5(5): 1-14 (2017).
Notice of Allowance dated Mar. 31, 2023 for U.S. Appl. No. 17/239,045 (7 pages).

\* cited by examiner

A: IC$_{50}$ <0.01 µM; B: 0.01 µM < IC$_{50}$ <0.1 µM; and C: 0.1 µM < IC$_{50}$ <1 µM.

| Compound | αvβ6 IC$_{50}$ | Compound | αvβ6 IC$_{50}$ | Compound | αvβ6 IC$_{50}$ |
|---|---|---|---|---|---|
| 1 | B | 17 | B | 33-E2 | B |
| 2 | B | 18 | C | 34-E1 | C |
| 3 | A | 19 | B | 34-E2 | B |
| 4-E1 | A | 20 | B | 35 | C |
| 4-E2 | A | 21 | C | 36-E1 | B |
| 5 | A | 22 | A | 36-E2 | A |
| 6 | A | 23 | A | 37-A | C |
| 7 | B | 24 | B | 37-B | A |
| 8-E1 | C | 25 | C | 38 | B |
| 8-E2 | B | 26 | B | 39 | A |
| 9 | B | 27 | B | 40-A-E1 | A |
| 10 | B | 28 | A | 40-B-E1 | C |
| 11 | B | 29 | B | 40-B-E2 | A |
| 12 | B | 30 | B | 41-A-E1 | C |
| 13-E1 | B | 31-E1 | B | 41-A-E2 | A |
| 13-E2 | B | 31-E2 | A | 41-B-E1 | A |
| 14 | B | 32-E1 | A | 41-B-E2 | C |
| 15 | B | 32-E2 | A | | |
| 16 | B | 32-E3 | A | | |

Figure 2

MDCK-MDR1 with PGP inh (A->B) [10^6 cm/s]

A: >20; B: 15-20; C: 10-<15; D: 5-<10; E: <5; NT: not tested

| Compound | MDCK-MDR1 w/ PGP inh (A-B) | Compound | MDCK-MDR1 w/ PGP inh (A-B) | Compound | MDCK-MDR1 w/ PGP inh (A-B) |
|---|---|---|---|---|---|
| 1 | B | 17 | A | 33-E2 | C |
| 2 | D | 18 | NT | 34-E1 | NT |
| 3 | C | 19 | B | 34-E2 | A |
| 4-E1 | NT | 20 | NT | 35 | NT |
| 4-E2 | A | 21 | NT | 36-E1 | NT |
| 5 | D | 22 | NT | 36-E2 | B |
| 6 | NT | 23 | C | 37-A | NT |
| 7 | NT | 24 | NT | 37-B | A |
| 8-E1 | NT | 25 | E | 38 | NT |
| 8-E2 | A | 26 | C | 39 | D |
| 9 | NT | 27 | NT | 40-A-E1 | A |
| 10 | E | 28 | E | 40-B-E1 | NT |
| 11 | NT | 29 | NT | 40-B-E2 | D |
| 12 | D | 30 | B | 41-A-E1 | NT |
| 13-E1 | NT | 31-E1 | NT | 41-A-E2 | B |
| 13-E2 | D | 31-E2 | A | 41-B-E1 | D |
| 14 | E | 32-E1 | NT | 41-B-E2 | NT |
| 15 | D | 32-E2 | NT | | |
| 16 | E | 32-E3 | C | | |

INHIBITORS OF αvβ6 INTEGRIN

RELATED APPLICATION

This application is a continuation of U.S. application Ser. No. 17/718,844, filed Apr. 12, 2022; which is a continuation of U.S. application Ser. No. 17/513,327, filed Oct. 28, 2021; which is a continuation of U.S. application Ser. No. 17/271,990, filed Feb. 26, 2021; which is a 371 national stage application based on Patent Cooperation Treaty Application serial number PCT/US2019/048738, filed Aug. 29, 2019; which claims the benefit of priority to U.S. Provisional Patent Application No. 62/724,419, filed Aug. 29, 2018.

TECHNICAL FIELD

This disclosure relates to novel chemical compounds and methods useful for inhibiting αvβ6 integrin.

BACKGROUND

The heterodimeric integrin family of receptors modulate cellular shape and cell adhesion to the extracellular matrix in response to extrinsic and intrinsic cues.

Integrin signaling controls cell survival, cell cycle progression, cell differentiation, and cell migration.

The integrin receptor exclusively can signal a cell bi-directionally, both "inside-out" and "outside-in." Thus, they mediate cell migration by transmitting forces from the extracellular matrix to the cytoskeleton and regulate cytoskeletal organization to achieve shape changes needed during cell migration. RGD-binding integrins can bind to and activate TGF-β, and have recently been implicated in fibrotic disease.

Integrins are expressed on the surface of most of human cells. Their pathology contributes to a diverse set of human diseases, including platelet disorders, atherosclerosis, cancer, osteoporosis, fibrosis, diabetic neuropathy of the kidney, macular degeneration and various autoimmune and chronic inflammation diseases.

The role of integrins as drug targets has long been recognized, and a total of six injectable integrin inhibitors have been approved by the Food and Drug Administration for the treatment of various therapeutic indications: inflammatory bowel disease (Entyvio®, Tysabri®), multiple sclerosis (Tysabri®), psoriasis (Raptiva®), and acute coronary syndrome (Reopro®, Aggrastat®, Integrilin®). However, there has been a notable absence of therapeutic success with orally bioavailable integrin inhibitors.

Of the 24 known integrin heterodimers, as least half have relevance in inflammation, fibrosis, oncology and vascular disease. There exists a need for new classes of integrin inhibitors.

However, there remains a need for a small molecule integrin inhibitor of αvβ6 suitable for oral administration. The oral administration route is preferred for small-molecule delivery as it allows a wide range of doses to be administered, allows convenient patient self-administration, is adaptable to varying dosage regimens and needs no special equipment. Therefore, it is important to identify of αvβ6 integrin inhibitor compounds that are not only potent at the intended biological target, but are also demonstrating other characteristics relating to the ability of the compound to be absorbed in the body (e.g, after oral delivery) in a therapeutically effective manner. For example, αvβ6 integrin inhibitor compounds can be selected based on both potency and based on performance in an in vitro permeability assay (e.g., evaluating the ability of compounds to cross a layer of Madin-Darby Canine Kidney (MDCK) cells from the apical to basolateral side (A→B)).

SUMMARY

Applicants have discovered novel αvβ6 integrin inhibitor compounds and evaluated the possession, performance and utility of representative examples of such compounds, both for biochemical potency (e.g., using the assay of Example 7 to evaluate fluorescence polarization assays of compounds for αvβ6 binding) and in vitro permeability properties (e.g., using the assay of Example 8 to evaluate MDCK permeability).

In certain embodiments, the invention relates to a compound of Formula I:

$$\text{A-B-C} \qquad (I)$$

wherein:
A is

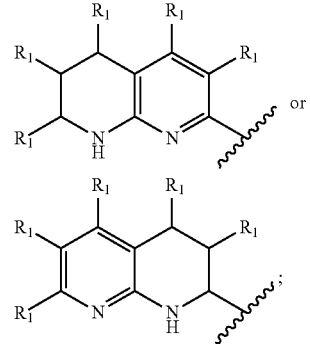

B is alkylene, -alkylene-(O), -alkylene-N(R)C(O)—, -alkylene-(heterocyclyl)-C(O)—, -alkylene-C(O)N(R)—, -alkylene-C(O)—, -alkylene-N(R)—, -alkylene-N(R)C(O)N(R)—, -alkylene-N(R)SO$_2$—, -alkylene-(aryl)-, -alkylene-(heterocyclyl)-, -alkylene-(heterocyclyl)-alkylene-, -aryl-alkylene-N(R)C(O)—, -aryl-C(O)N(R)—, -aryl-N(R)C(O)—, -(heterocyclyl)-alkylene-, -heterocyclyl-alkylene-N(R)C(O)—, -heterocyclyl-C(O)N(R)—, —O-heterocyclyl-, -alkylene-O—, -heterocyclyl-C(O)—, cycloalkylene, -cycloalkylene-O-alkylene-C*(H)(F)—, -alkylene-C*(H)(F)—, -alkylene-C*(F)$_2$—, -alkylene-C(H)(F)C*H$_2$—, or -alkylene-C(F)$_2$C*H$_2$—;

C is

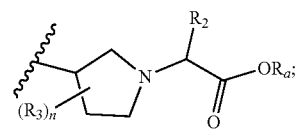

R is H, alkyl, or aryl;
R$_1$ is independently H, alkyl, halide, alkoxy, CF$_3$, OH, alkylene-OH, NO$_2$, —N(H)R, or NH$_2$;
R$_2$ is substituted or unsubstituted bicyclic aromatic heterocyclyl;
R$_3$ is independently is selected from H, halide, CF$_3$, alkyl, alkylene-alkoxy, aryl, hydroxyl, and alkoxy;

$R_a$ is H, $(C_1$-$C_6)$alkyl, —$C_1$-$C_6$alkylene-O—$(C_1$-$C_6)$alkyl, or —$(C_1$-$C_6)$alkylene-O—C(O)O$(C_1$-$C_6)$alkyl;

n is 0, 1, 2, 3, or 4;

* denotes the point of attachment of B to C; and the absolute configuration at any stereocenter is R, S, or a mixture thereof;

or a pharmaceutically acceptable salt thereof.

In certain embodiments, the invention relates to a compound of Formula I:

A-B—C  (I)

wherein:
A is

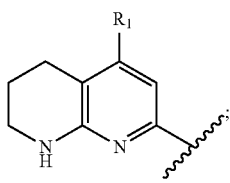

B is -alkylene-O—, -alkylene-C*(H)(F)—, -alkylene-C*(H)(F)—, -alkylene-C*(F)$_2$—, -alkylene-C(H)(F)C*H$_2$—, or -alkylene-C(F)$_2$C*H$_2$—;

C is

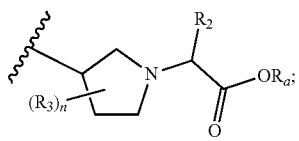

$R_1$ is independently H or alkoxy;

$R_2$ is substituted or unsubstituted bicyclic aromatic heterocyclyl;

$R_a$ is H;

n is 0;

* denotes the point of attachment of B to C; and the absolute configuration at any stereocenter is R, S, or a mixture thereof;

or a pharmaceutically acceptable salt thereof.

Preferably, A in the compounds of formula (I) comprises substitution of each $R_1$ independently as H or alkoxy (e.g., methoxy). B in the compounds of formula (I) (e.g., in combination with each $R_1$ being H or alkoxy) preferably comprises a linear, unbranched alkylene having 2 to 12 carbon atoms (e.g., —(CH$_2$)$_4$—). In some compounds, B can combine with C to form an ether containing 4 carbon atoms (e.g., —(CH$_2$)$_4$—O—). In some compounds, B can be selected from the group consisting of: —(CH$_2$)$_4$—O—, —(CH$_2$)$_4$—C*(H)(F)—, and —(CH$_2$)$_4$—C*(F)$_2$. C in the compounds of formula (I) (e.g., in combination with each $R_1$ being H or alkoxy and/or B comprising a 4-carbon linear alkylene) preferably comprises $R_a$ that is H. In some embodiments, $R_2$ is substituted with one or more $R_3'$, where $R_3'$ is selected from alkyl including cycloalkyl (e.g., $C_1$-$C_6$ linear, branched or cyclic, including methyl, and cyclopropyl) or alkoxy or O-containing heterocycloalkyl (e.g., 1-6 atom linear, branched or cyclic alkoxy or heterocycloalkyl). In some examples, C in the compounds of formula (I) (e.g., in combination with each $R_1$ being H or alkoxy and/or B comprising a 4-carbon linear alkylene, and $R_a$ that is H) further comprises $R_2$ that is selected from:

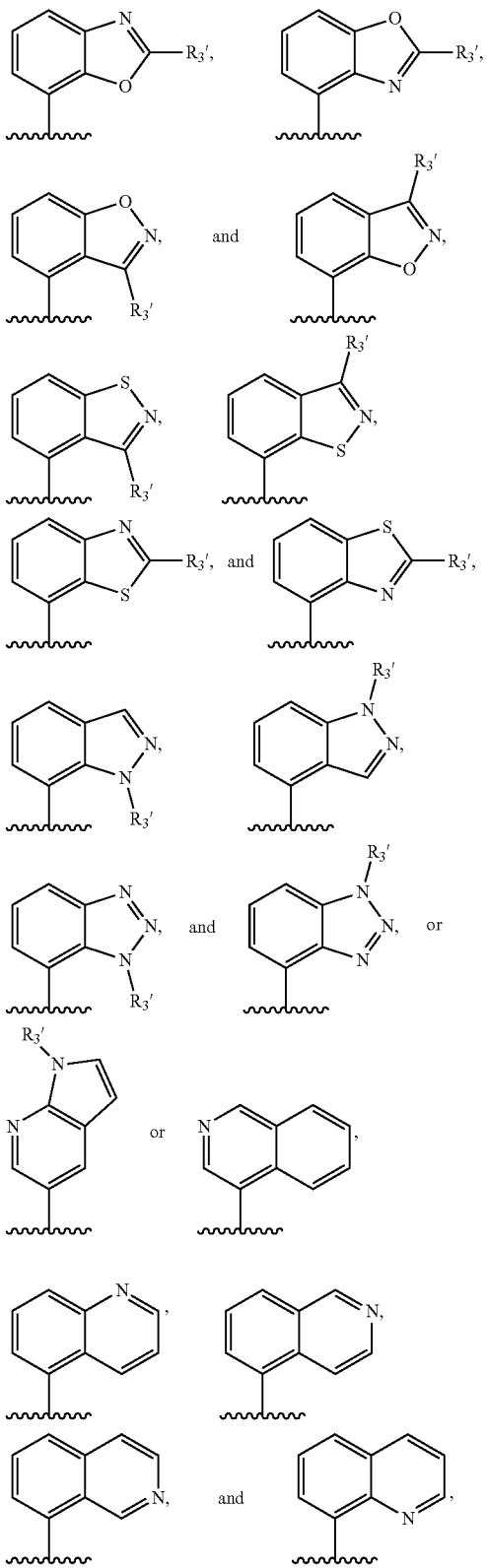

and where $R_3'$ is defined above.

In some compounds, $R_2$ is selected from:

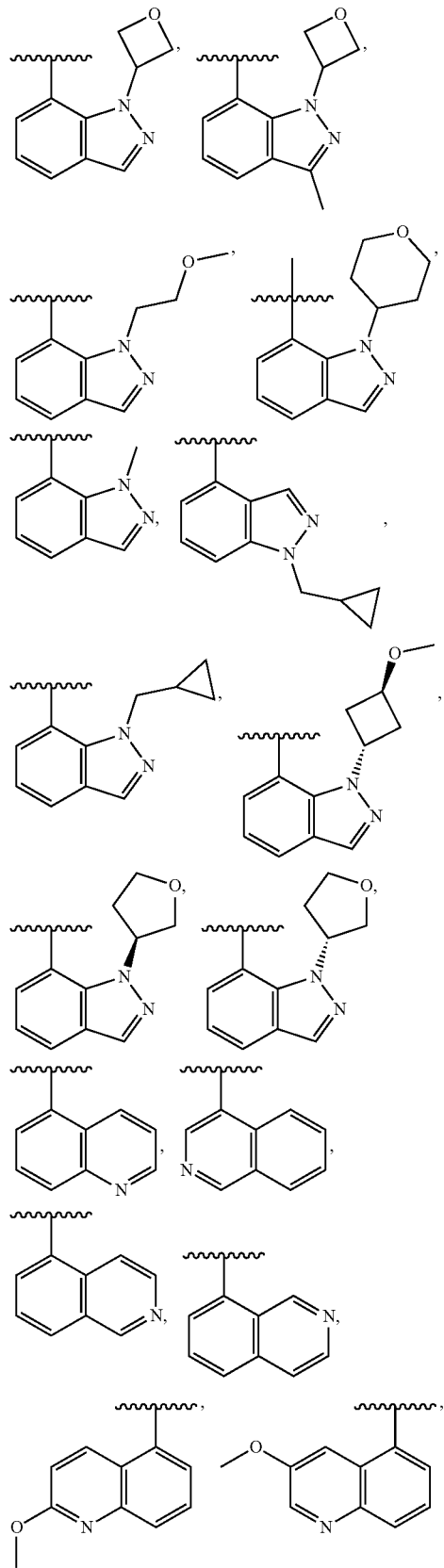

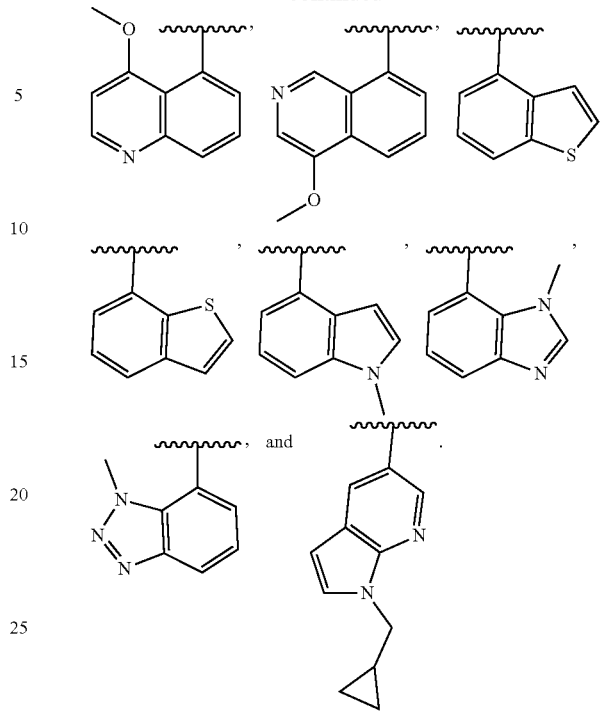

In certain embodiments, the invention relates to a method of treating a disease or a condition is selected from the group consisting of idiopathic pulmonary fibrosis, diabetic nephropathy, focal segmental glomerulosclerosis, chronic kidney disease, nonalcoholic steatohepatitis, primary biliary cholangitis, primary sclerosing cholangitis, solid tumors, hematological tumors, organ transplant, Alport syndrome, interstitial lung disease radiation-induced fibrosis, bleomycin-induced fibrosis, asbestos-induced fibrosis, flu-induced fibrosis, coagulation-induced fibrosis, vascular injury-induced fibrosis, aortic stenosis, and cardiac fibrosis comprising the step of: administering to a subject in need thereof a therapeutically effective amount of any one of the compounds described herein.

BRIEF DESCRIPTION OF THE FIGURES

FIG. 1 depicts a table summarizing inhibition of αvβ6 integrin by exemplary compounds measured in a fluorescence polarization assay.

FIG. 2 depicts a table summarizing permeability properties of exemplary compounds measured in a MDCK in vitro assay of Example 8.

DETAILED DESCRIPTION

In certain embodiments, the invention relates to compounds that inhibit αvβ6 integrin. In certain embodiments, the compounds are selective for αvβ6 integrin.

The compounds will be useful for the treatment of idiopathic pulmonary fibrosis, diabetic nephropathy, focal segmental glomerulosclerosis, chronic kidney disease, nonalcoholic steatohepatitis, primary biliary cholangitis, primary sclerosing cholangitis, solid tumors, hematological tumors, organ transplant, Alport syndrome, interstitial lung disease, radiation-induced fibrosis, bleomycin-induced fibrosis, asbestos-induced fibrosis, flu-induced fibrosis, coagulation-induced fibrosis, vascular injury-induced fibrosis, aortic stenosis, or cardiac fibrosis.

Definitions

For convenience, before further description of the present invention, certain terms employed in the specification, examples and appended claims are collected here. These definitions should be read in light of the remainder of the disclosure and understood as by a person of skill in the art. Unless defined otherwise, all technical and scientific terms used herein have the same meaning as commonly understood by a person of ordinary skill in the art.

In order for the present invention to be more readily understood, certain terms and phrases are defined below and throughout the specification.

The articles "a" and "an" are used herein to refer to one or to more than one (i.e., to at least one) of the grammatical object of the article. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element is selected from any one or more of the elements in the list of elements, but not necessarily including at least one of each and every element specifically listed within the list of elements and not excluding any combinations of elements in the list of elements.

This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Certain compounds contained in compositions of the present invention may exist in particular geometric or stereoisomeric forms. In addition, polymers of the present invention may also be optically active. The present invention contemplates all such compounds, including cis- and trans-isomers, R- and S-enantiomers, diastereomers, (D)-isomers, (L)-isomers, the racemic mixtures thereof, and other mixtures thereof, as falling within the scope of the invention. Additional asymmetric carbon atoms may be present in a substituent such as an alkyl group. All such isomers, as well as mixtures thereof, are intended to be included in this invention.

If, for instance, a particular enantiomer of compound of the present invention is desired, it may be prepared by asymmetric synthesis, or by derivation with a chiral auxiliary, where the resulting diastereomeric mixture is separated and the auxiliary group cleaved to provide the pure desired enantiomers. Alternatively, where the molecule contains a basic functional group, such as amino, or an acidic functional group, such as carboxyl, diastereomeric salts are formed with an appropriate optically-active acid or base, followed by resolution of the diastereomers thus formed by fractional crystallization or chromatographic means well known in the art, and subsequent recovery of the pure enantiomers.

Structures depicted herein are also meant to include compounds that differ only in the presence of one or more isotopically enriched atoms. For example, compounds produced by the replacement of a hydrogen with deuterium or tritium, or of a carbon with a $^{13}C$- or $^{14}C$-enriched carbon are within the scope of this invention.

The term "prodrug" as used herein encompasses compounds that, under physiological conditions, are converted into therapeutically active agents. A common method for making a prodrug is to include selected moieties that are hydrolyzed under physiological conditions to reveal the desired molecule. In other embodiments, the prodrug is converted by an enzymatic activity of the host animal.

The phrase "pharmaceutically acceptable excipient" or "pharmaceutically acceptable carrier" as used herein means a pharmaceutically acceptable material, composition or vehicle, such as a liquid or solid filler, diluent, excipient, solvent or encapsulating material, involved in carrying or transporting the subject chemical from one organ or portion of the body, to another organ or portion of the body. Each carrier must be "acceptable" in the sense of being compatible with the other ingredients of the formulation, not injurious to the patient, and substantially non-pyrogenic. Some examples of materials which can serve as pharmaceutically acceptable carriers include: (1) sugars, such as lactose, glucose, and sucrose; (2) starches, such as corn starch and potato starch; (3) cellulose, and its derivatives, such as sodium carboxymethyl cellulose, ethyl cellulose, and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil, and soybean oil; (10) glycols, such as propylene glycol; (11) polyols, such as glycerin, sorbitol, mannitol, and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) phosphate buffer solutions; and (21) other non-toxic compatible substances employed in pharmaceutical formulations. In certain embodiments, pharmaceutical compositions of the present invention are non-pyrogenic, i.e., do not induce significant temperature elevations when administered to a patient.

The term "pharmaceutically acceptable salts" refers to the relatively non-toxic, inorganic and organic acid addition salts of the compound(s). These salts can be prepared in situ during the final isolation and purification of the compound(s), or by separately reacting a purified compound(s) in its free base form with a suitable organic or inorganic acid, and isolating the salt thus formed. Representative salts include the hydrobromide, hydrochloride, sulfate, bisulfate, phosphate, nitrate, acetate, valerate, oleate, palmitate, stearate, laurate, benzoate, lactate, phosphate, tosylate, citrate, maleate, fumarate, succinate, tartrate, naphthylate, mesylate, glucoheptonate, lactobionate, and laurylsulphonate salts, and the like. (See, for example, Berge et al. (1977) "Pharmaceutical Salts", *J. Pharm. Sci.* 66:1-19.)

In other cases, the compounds useful in the methods of the present invention may contain one or more acidic functional groups and, thus, are capable of forming pharmaceutically acceptable salts with pharmaceutically acceptable bases. The term "pharmaceutically acceptable salts" in these instances refers to the relatively non-toxic inorganic and organic base addition salts of a compound(s). These salts can likewise be prepared in situ during the final isolation and purification of the compound(s), or by separately reacting the purified compound(s) in its free acid form with a suitable base, such as the hydroxide, carbonate, or bicarbonate of a pharmaceutically acceptable metal cation, with ammonia, or with a pharmaceutically acceptable organic primary, secondary, or tertiary amine. Representative alkali or alkaline earth salts include the lithium, sodium, potassium, calcium, magnesium, and aluminum salts, and the like. Representative organic amines useful for the formation of base addition salts include ethylamine, diethylamine, ethylenediamine, ethanolamine, diethanolamine, piperazine, and the like (see, for example, Berge et al., supra).

A "therapeutically effective amount" (or "effective amount") of a compound with respect to use in treatment, refers to an amount of the compound in a preparation which, when administered as part of a desired dosage regimen (to a mammal, preferably a human) alleviates a symptom, ameliorates a condition, or slows the onset of disease conditions according to clinically acceptable standards for the disorder or condition to be treated or the cosmetic purpose, e.g., at a reasonable benefit/risk ratio applicable to any medical treatment.

The term "prophylactic or therapeutic" treatment is art-recognized and includes administration to the host of one or more of the subject compositions. If it is administered prior to clinical manifestation of the unwanted condition (e.g., disease or other unwanted state of the host animal) then the treatment is prophylactic, (i.e., it protects the host against developing the unwanted condition), whereas if it is administered after manifestation of the unwanted condition, the treatment is therapeutic, (i.e., it is intended to diminish, ameliorate, or stabilize the existing unwanted condition or side effects thereof).

The term "patient" refers to a mammal in need of a particular treatment. In certain embodiments, a patient is a primate, canine, feline, or equine. In certain embodiments, a patient is a human.

An aliphatic chain comprises the classes of alkyl, alkenyl and alkynyl defined below. A straight aliphatic chain is limited to unbranched carbon chain moieties. As used herein, the term "aliphatic group" refers to a straight chain, branched-chain, or cyclic aliphatic hydrocarbon group and includes saturated and unsaturated aliphatic groups, such as an alkyl group, an alkenyl group, or an alkynyl group.

"Alkyl" refers to a fully saturated cyclic or acyclic, branched or unbranched carbon chain moiety having the number of carbon atoms specified, or up to 30 carbon atoms if no specification is made. For example, alkyl of 1 to 8 carbon atoms refers to moieties such as methyl, ethyl, propyl, butyl, pentyl, hexyl, heptyl, and octyl, and those moieties which are positional isomers of these moieties. Alkyl of 10 to 30 carbon atoms includes decyl, undecyl, dodecyl, tridecyl, tetradecyl, pentadecyl, hexadecyl, heptadecyl, octadecyl, nonadecyl, eicosyl, heneicosyl, docosyl, tricosyl and tetracosyl. In certain embodiments, a straight chain or branched chain alkyl has 30 or fewer carbon atoms in its backbone (e.g., $C_1$-$C_{30}$ for straight chains, $C_3$-$C_{30}$ for branched chains), and more preferably 20 or fewer. Alkyl groups may be substituted or unsubstituted.

As used herein, the term "alkylene" refers to an alkyl group having the specified number of carbons, for example from 2 to 12 carbon atoms, that contains two points of attachment to the rest of the compound on its longest carbon chain. Non-limiting examples of alkylene groups include methylene —($CH_2$)—, ethylene —($CH_2CH_2$)—, n-propylene —($CH_2CH_2CH_2$)—, isopropylene —($CH_2CH(CH_3)$)—, and the like. Alkylene groups can be cyclic or acyclic, branched or unbranched carbon chain moiety, and may be optionally substituted with one or more substituents.

"Cycloalkyl" means mono- or bicyclic or bridged or spirocyclic, or polycyclic saturated carbocyclic rings, each having from 3 to 12 carbon atoms. Likewise, preferred cycloalkyls have from 3-10 carbon atoms in their ring structure, and more preferably have 3-6 carbons in the ring structure. Cycloalkyl groups may be substituted or unsubstituted.

Unless the number of carbons is otherwise specified, "lower alkyl," as used herein, means an alkyl group, as defined above, but having from one to ten carbons, more preferably from one to six carbon atoms in its backbone structure such as methyl, ethyl, n-propyl, isopropyl, n-butyl, isobutyl, sec-butyl, and tert-butyl. Likewise, "lower alkenyl" and "lower alkynyl" have similar chain lengths. Throughout the application, preferred alkyl groups are lower alkyls. In certain embodiments, a substituent designated herein as alkyl is a lower alkyl.

"Alkenyl" refers to any cyclic or acyclic, branched or unbranched unsaturated carbon chain moiety having the number of carbon atoms specified, or up to 26 carbon atoms if no limitation on the number of carbon atoms is specified; and having one or more double bonds in the moiety. Alkenyl of 6 to 26 carbon atoms is exemplified by hexenyl, heptenyl, octenyl, nonenyl, decenyl, undecenyl, dodenyl, tridecenyl, tetradecenyl, pentadecenyl, hexadecenyl, heptadecenyl, octadecenyl, nonadecenyl, eicosenyl, heneicosoenyl, docosenyl, tricosenyl, and tetracosenyl, in their various isomeric forms, where the unsaturated bond(s) can be located anywhere in the moiety and can have either the (Z) or the (E) configuration about the double bond(s).

"Alkynyl" refers to hydrocarbyl moieties of the scope of alkenyl, but having one or more triple bonds in the moiety.

The term "alkylthio" refers to an alkyl group, as defined above, having a sulfur moiety attached thereto. In certain embodiments, the "alkylthio" moiety is represented by one of —(S)-alkyl, —(S)-alkenyl, —(S)-alkynyl, and —(S)—$(CH_2)_m$—$R^1$, wherein m and $R^1$ are defined below. Representative alkylthio groups include methylthio, ethylthio, and the like. The terms "alkoxyl" or "alkoxy" as used herein refers to an alkyl group, as defined below, having an oxygen moiety attached thereto. Representative alkoxyl groups include methoxy, ethoxy, propoxy, tert-butoxy, and the like. An "ether" is two hydrocarbons covalently linked by an oxygen. Accordingly, the substituent of an alkyl that renders that alkyl an ether is or resembles an alkoxyl, such as can be represented by one of —O-alkyl, —O-alkenyl, —O-alkynyl, —O—$(CH_2)_m$—$R_{10}$, where m and $R_{10}$ are described below.

The terms "amine" and "amino" are art-recognized and refer to both unsubstituted and substituted amines, e.g., a moiety that can be represented by the formulae:

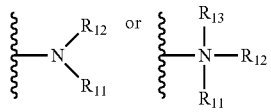

wherein $R_{11}$, $R_{12}$ and $R_{13}$ each independently represent a hydrogen, an alkyl, an alkenyl, —$(CH_2)_m$—$R_{10}$, or $R_{11}$ and $R_{12}$ taken together with the N atom to which they are attached complete a heterocycle having from 4 to 8 atoms in the ring structure; $R_{10}$ represents an alkenyl, aryl, cycloalkyl, a cycloalkenyl, a heterocyclyl, or a polycyclyl; and m is zero or an integer in the range of 1 to 8. In certain embodiments, only one of $R_{11}$ or $R_{12}$ can be a carbonyl, e.g., $R_{11}$, $R_{12}$, and the nitrogen together do not form an imide. In even more certain embodiments, $R_{11}$ and $R_{12}$ (and optionally $R_{13}$) each independently represent a hydrogen, an alkyl, an alkenyl, or —$(CH_2)_m$—$R_{10}$. Thus, the term "alkylamine" as used herein means an amine group, as defined above, having a substituted or unsubstituted alkyl attached thereto, i.e., at least one of $R_{11}$ and $R_{12}$ is an alkyl group. In certain embodiments, an amino group or an alkylamine is basic, meaning it has a conjugate acid with a $pK_a$>7.00, i.e., the protonated forms of these functional groups have $pK_a$s relative to water above about 7.00.

The term "amide", as used herein, refers to a group

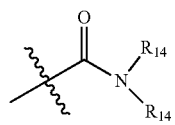

wherein each $R_{14}$ independently represent a hydrogen or hydrocarbyl group, or two $R_{14}$ are taken together with the N atom to which they are attached complete a heterocycle having from 4 to 8 atoms in the ring structure.

The term "aryl" as used herein includes 3- to 12-membered substituted or unsubstituted single-ring aromatic groups in which each atom of the ring is carbon (i.e., carbocyclic aryl) or where one or more atoms are heteroatoms (i.e., heteroaryl).

Preferably, aryl groups include 5- to 12-membered rings, more preferably 6- to 10-membered rings The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls.

Carboycyclic aryl groups include benzene, naphthalene, phenanthrene, phenol, aniline, and the like. Heteroaryl groups include substituted or unsubstituted aromatic 3- to 12-membered ring structures, more preferably 5- to 12-membered rings, more preferably 5- to 10-membered rings, whose ring structures include one to four heteroatoms. Heteroaryl groups include, for example, pyrrole, furan, thiophene, imidazole, oxazole, thiazole, triazole, pyrazole, pyridine, pyrazine, pyridazine and pyrimidine, and the like. Aryl and heteroaryl can be monocyclic, bicyclic, or polycyclic. Each instance of an aryl group may be independently optionally substituted, i.e., unsubstituted (an "unsubstituted aryl") or substituted (a "substituted aryl") with one or more substituents; e.g., for instance from 1 to 5 substituents, 1 to 4 substituents, 1 to 3 substituents, 1 to 2 substituents or just 1 substituent. The aromatic ring may be substituted at one or more ring positions with one or more substituents, such as halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, fluoroalkyl (such as trifluromethyl), cyano, or the like. For example, in certain embodiments, the aryl group can be an unsubstituted $C_5$-$C_{12}$ aryl and in certain embodiments, the aryl group can be a substituted $C_5$-$C_{10}$ aryl.

The term "halo", "halide", or "halogen" as used herein means halogen and includes, for example, and without being limited thereto, fluoro, chloro, bromo, iodo and the like, in both radioactive and non-radioactive forms. In a preferred embodiment, halo is selected from the group consisting of fluoro, chloro and bromo.

The terms "heterocyclyl" or "heterocyclic group" refer to 3- to 12-membered ring structures, more preferably 5- to 12-membered rings, more preferably 5- to 10-membered rings, whose ring structures include one to four heteroatoms. Heterocycles can be monocyclic, bicyclic, spirocyclic, or polycyclic. Heterocyclyl groups include, for example, thiophene, thianthrene, furan, pyran, isobenzofuran, chromene, xanthene, phenoxathiin, pyrrole, imidazole, pyrazole, isothiazole, isoxazole, pyridine, pyrazine, pyrimidine, pyridazine, indolizine, isoindole, indole, indazole, purine, quinolizine, isoquinoline, quinoline, phthalazine, naphthyridine, quinoxaline, quinazoline, cinnoline, pteridine, carbazole, carboline, phenanthridine, acridine, pyrimidine, phenanthroline, phenazine, phenarsazine, phenothiazine, furazan, phenoxazine, pyrrolidine, oxolane, thiolane, oxazole, piperidine, piperazine, morpholine, lactones, lactams such as azetidinones and pyrrolidinones, sultams, sultones, and the like. The heterocyclic ring can be substituted at one or more positions with such substituents as described above, as for example, halogen, alkyl, aralkyl, alkenyl, alkynyl, cycloalkyl, hydroxyl, amino, nitro, sulfhydryl, imino, amido, phosphate, phosphonate, phosphinate, carbonyl, carboxyl, silyl, sulfamoyl, sulfinyl, ether, alkylthio, sulfonyl, ketone, aldehyde, ester, a heterocyclyl, an aromatic or heteroaromatic moiety, —CF$_3$, —CN, and the like.

The term "carbonyl" is art-recognized and includes such moieties as can be represented by the formula:

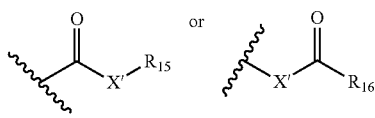

wherein X' is a bond or represents an oxygen or a sulfur, and R$_{15}$ represents a hydrogen, an alkyl, an alkenyl, —(CH$_2$)$_m$—R$_{10}$ or a pharmaceutically acceptable salt, R$_{16}$ represents a hydrogen, an alkyl, an alkenyl or —(CH$_2$)$_m$—R$_{10}$, where m and R$_{10}$ are as defined above. Where X' is an oxygen and R$_{15}$ or R$_{16}$ is not hydrogen, the formula represents an "ester." Where X' is an oxygen, and R$_{15}$ is as defined above, the moiety is referred to herein as a carboxyl group, and particularly when R$_{15}$ is a hydrogen, the formula represents a "carboxylic acid". Where X' is an oxygen, and R$_{16}$ is a hydrogen, the formula represents a "formate." In general, where the oxygen atom of the above formula is replaced by a sulfur, the formula represents a "thiocarbonyl" group. Where X' is a sulfur and R$_{15}$ or R$_{16}$ is not hydrogen, the formula represents a "thioester" group. Where X' is a sulfur and R$_{15}$ is a hydrogen, the formula represents a "thiocarboxylic acid" group. Where X' is a sulfur and R$_{16}$ is a hydrogen, the formula represents a "thioformate" group. On the other hand, where X' is a bond, and R$_{15}$ is not hydrogen, the above formula represents a "ketone" group. Where X' is a bond, and R$_{15}$ is a hydrogen, the above formula represents an "aldehyde" group.

As used herein, the term "substituted" is contemplated to include all permissible substituents of organic compounds. In a broad aspect, the permissible substituents include acyclic and cyclic, branched and unbranched, carbocyclic and heterocyclic, aromatic and nonaromatic substituents of organic compounds. Illustrative substituents include, for example, those described herein above. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. This invention is not intended to be limited in any manner by the permissible substituents of organic compounds. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc.

As used herein, the term "nitro" means —NO$_2$; the term "halogen" designates —F, —Cl, —Br, or —I; the term "sulfhydryl" means —SH; the term "hydroxyl" means —OH; the term "sulfonyl" means —SO$_2$—; the term "azido" means —N$_3$; the term "cyano" means —CN; the term "isocyanato" means —NCO; the term "thiocyanato" means —SCN; the term "isothiocyanato" means —NCS; and the term "cyanato" means —OCN.

The term "sulfamoyl" is art-recognized and includes a moiety that can be represented by the formula:

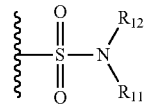

in which R$_{11}$ and R$_{12}$ are as defined above.

The term "sulfate" is art recognized and includes a moiety that can be represented by the formula:

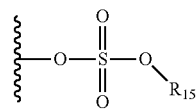

in which R$_{15}$ is as defined above.

The term "sulfonamide" is art recognized and includes a moiety that can be represented by the formula:

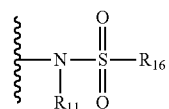

in which R$_{11}$ and R$_{16}$ are as defined above.

The term "sulfonate" is art-recognized and includes a moiety that can be represented by the formula:

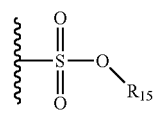

in which R$_{54}$ is an electron pair, hydrogen, alkyl, cycloalkyl, or aryl.

The terms "sulfoxido" or "sulfinyl", as used herein, refers to a moiety that can be represented by the formula:

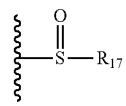

in which R$_{17}$ is selected from the group consisting of hydrogen, alkyl, alkenyl, alkynyl, cycloalkyl, heterocyclyl, aralkyl, or aryl.

The term "urea" is art-recognized and may be represented by the general formula

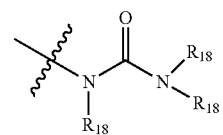

wherein each $R_{18}$ independently represents hydrogen or a hydrocarbyl, such as alkyl, or any occurrence of $R_{18}$ taken together with another and the intervening atom(s) complete a heterocycle having from 4 to 8 atoms in the ring structure.

As used herein, the definition of each expression, e.g., alkyl, m, n, etc., when it occurs more than once in any structure, is intended to be independent of its definition elsewhere in the same structure.

The term "substituted" refers to moieties having substituents replacing a hydrogen on one or more carbons of the backbone. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxy, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. In preferred embodiments, the substituents on substituted alkyls are is selected from $C_{1-6}$ alkyl, $C_{3-6}$ cycloalkyl, halogen, carbonyl, cyano, or hydroxyl. In more preferred embodiments, the substituents on substituted alkyls are is selected from fluoro, carbonyl, cyano, or hydroxyl. It will be understood by those skilled in the art that substituents can themselves be substituted, if appropriate. Unless specifically stated as "unsubstituted," references to chemical moieties herein are understood to include substituted variants. For example, reference to an "aryl" group or moiety implicitly includes both substituted and unsubstituted variants.

For purposes of this invention, the chemical elements are identified in accordance with the Periodic Table of the Elements, CAS version, Handbook of Chemistry and Physics, 67th Ed., 1986-87, inside cover.

Exemplary Compounds of the Invention

In certain embodiments, the invention relates to a compound of Formula I:

A-B—C    (I)

wherein:
A is

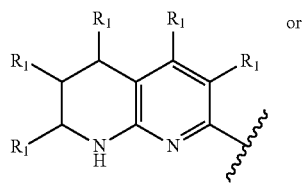

-continued

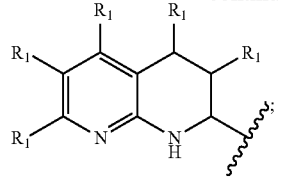

B is alkylene, -alkylene-(O); -alkylene-N(R)C(O)—, -alkylene-(heterocyclyl)-C(O)—, -alkylene-C(O)N(R)—, -alkylene-C(O)—, -alkylene-N(R)—, -alkylene-N(R)C(O)N(R)—, -alkylene-N(R)SO$_2$—, -alkylene-(aryl)-, -alkylene-(heterocyclyl)-, -alkylene-(heterocyclyl)-alkylene-, -aryl-alkylene-N(R)C(O)—; -aryl-C(O)N(R)—, -aryl-N(R)C(O)—, -(heterocyclyl)-alkylene-, -heterocyclyl-alkylene-N(R)C(O)—; -heterocyclyl-C(O)N(R)—, —O-heterocyclyl-; -alkylene-O—; -heterocyclyl-C(O)—; cycloalkylene; -cycloalkylene-O-alkylene-C*(H)(F)—, -alkylene-C*(F)$_2$—, -alkylene-C(H)(F)C*H$_2$—, or -alkylene-C(F)$_2$C*H$_2$—;

C is

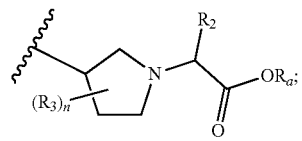

R is H, alkyl, or aryl;
$R_1$ is independently H, alkyl, halide, alkoxy, $CF_3$, OH, alkylene-OH, $NO_2$, —N(H)R, or $NH_2$;
$R_2$ is substituted or unsubstituted bicyclic aromatic heterocyclyl;
$R_3$ is independently is selected from H, halide, $CF_3$, alkyl, alkylene-alkoxy, aryl, hydroxyl, and alkoxy;
$R_a$ is H, $(C_1$-$C_6)$alkyl, —$C_1$-$C_6$)alkylene-O—$(C_1$-$C_6)$ alkyl, or —$(C_1$-$C_6)$alkylene-O—C(O)O$(C_1$-$C_6)$alkyl;
n is 0, 1, 2, 3, or 4;
* denotes the point of attachment of B to C; and
the absolute configuration at any stereocenter is R, S, or a mixture thereof;
or a pharmaceutically acceptable salt thereof.

In certain embodiments, the invention relates to a compound of Formula I:

A-B—C    (I)

wherein:
A is

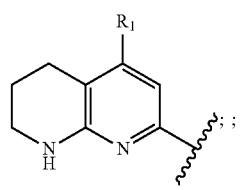

B is alkylene, -alkylene-(O), -alkylene-N(R)C(O)—, -alkylene-(heterocyclyl)-C(O)—, -alkylene-C(O)N(R)—, -alkylene-C(O)—, -alkylene-N(R)—, -alkylene-N(R)C(O)N(R)—, -alkylene-N(R)SO$_2$—, -alkylene-(aryl)-, -alkylene-(heterocyclyl)-, -alkylene-(heterocyclyl)-alkylene-, -aryl-alkylene-N(R)C(O)—, -aryl-C(O)N(R)—, -aryl-N(R)C(O)—, -(heterocyclyl)-alkylene-, -heterocyclyl-alkylene-N(R)C(O)—, -heterocyclyl-C(O)N(R)—, —O-heterocyclyl-, -alkylene-O—, -heterocyclyl-C(O)—, cycloalkylene, -cycloalkylene-O-alkylene-C*(H)(F)—, -alkylene-C*(H)(F)—, -alkylene-C*(F)$_2$—, -alkylene-C(H)(F)C*H$_2$—, or -alkylene-C(F)$_2$C*H$_2$—;

C is

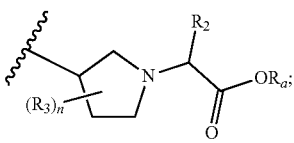

R is H, alkyl, or aryl;
R$_1$ is independently H, alkyl, halide, alkoxy, CF$_3$, OH, alkylene-OH, NO$_2$, —N(H)R, or NH$_2$;
R$_2$ is substituted or unsubstituted bicyclic aromatic heterocyclyl;
R$_3$ is independently is selected from H, halide, CF$_3$, alkyl, alkylene-alkoxy, aryl, hydroxyl, and alkoxy;
R$_a$ is H, (C$_1$-C$_6$)alkyl, —C$_1$-C$_6$)alkylene-O—(C$_1$-C$_6$)alkyl, or —(C$_1$-C$_6$)alkylene-O—C(O)O(C$_1$-C$_6$)alkyl;
n is 0, 1, 2, 3, or 4;
* denotes the point of attachment of B to C; and
the absolute configuration at any stereocenter is R, S, or a mixture thereof;
or a pharmaceutically acceptable salt thereof.

In certain embodiments, the invention relates to a compound of Formula I:

A-B—C    (I)

wherein:
A is

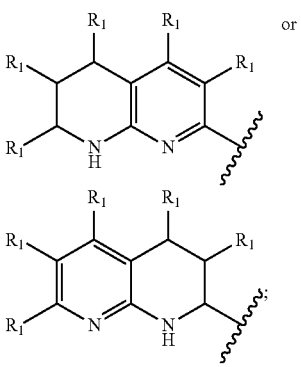

B is -alkylene-(O);
C is

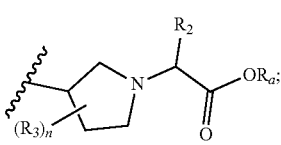

R is H, alkyl, or aryl;
R$_1$ is independently H, alkyl, halide, alkoxy, CF$_3$, OH, alkylene-OH, NO$_2$, —N(H)R, or NH$_2$;
R$_2$ is substituted or unsubstituted bicyclic aromatic heterocyclyl;
R$_3$ is independently is selected from H, halide, CF$_3$, alkyl, alkylene-alkoxy, aryl, hydroxyl, and alkoxy;
R$_a$ is H, (C$_1$-C$_6$)alkyl, —C$_1$-C$_6$)alkylene-O—(C$_1$-C$_6$)alkyl, or —(C$_1$-C$_6$)alkylene-O—C(O)O(C$_1$-C$_6$)alkyl;
n is 0, 1, 2, 3, or 4;
* denotes the point of attachment of B to C; and
the absolute configuration at any stereocenter is R, S, or a mixture thereof;
or a pharmaceutically acceptable salt thereof.

In certain embodiments, the invention relates to a compound of Formula I:

A-B—C    (I)

wherein:
A is

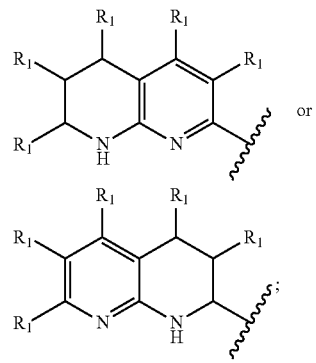

B is alkylene, -alkylene-(O); -alkylene-N(R)C(O)—, -alkylene-(heterocyclyl)-C(O)—, -alkylene-C(O)N(R)—, -alkylene-C(O)—, -alkylene-N(R)—, -alkylene-N(R)C(O)N(R)—, -alkylene-N(R)SO$_2$—, -alkylene-(aryl)-, -alkylene-(heterocyclyl)-, -alkylene-(heterocyclyl)-alkylene-, -aryl-alkylene-N(R)C(O)—; -aryl-C(O)N(R)—, -aryl-N(R)C(O)—, -(heterocyclyl)-alkylene-, -heterocyclyl-alkylene-N(R)C(O)—; -heterocyclyl-C(O)N(R)—, —O-heterocyclyl-; -alkylene-O—; -heterocyclyl-C(O)—; cycloalkylene; -cycloalkylene-O-alkylene-C*(H)(F)—, -alkylene-C*(F)$_2$—, -alkylene-C(H)(F)C*H$_2$—, or -alkylene-C(F)$_2$C*H$_2$—;

C is

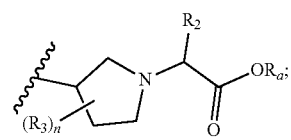

R is H, alkyl, or aryl;
R$_1$ is independently H, alkyl, halide, alkoxy, CF$_3$, OH, alkylene-OH, NO$_2$, —N(H)R, or NH$_2$;
R$_2$ is substituted or unsubstituted bicyclic aromatic heterocyclyl;
R$_3$ is independently is selected from H, halide, CF$_3$, alkyl, alkylene-alkoxy, aryl, hydroxyl, and alkoxy;

$R_a$ is H;

n is 0, 1, 2, 3, or 4;

* denotes the point of attachment of B to C; and the absolute configuration at any stereocenter is R, S, or a mixture thereof; or a pharmaceutically acceptable salt thereof.

In certain embodiments, the invention relates to a compound of Formula I:

A-B—C  (I)

wherein:

A is

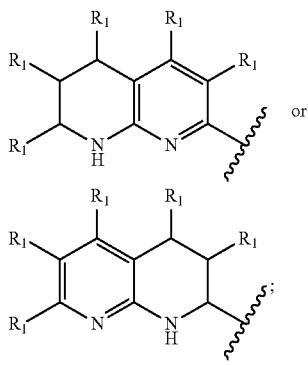

B is alkylene, -alkylene-(O); -alkylene-N(R)C(O)—, -alkylene-(heterocyclyl)-C(O)—, -alkylene-C(O)N(R)—, -alkylene-C(O)—, -alkylene-N(R)—, -alkylene-N(R)C(O)N(R)—, -alkylene-N(R)SO$_2$—, -alkylene-(aryl)-, -alkylene-(heterocyclyl)-, -alkylene-(heterocyclyl)-alkylene-, -aryl-alkylene-N(R)C(O)—; -aryl-C(O)N(R)—, -aryl-N(R)C(O)—, -(heterocyclyl)-alkylene-, -heterocyclyl-alkylene-N(R)C(O)—; -heterocyclyl-C(O)N(R)—, —O-heterocyclyl-; -alkylene-O—; -heterocyclyl-C(O)—; cycloalkylene; -cycloalkylene-O-alkylene-C*(H)(F)—, -alkylene-C*(F)$_2$—, -alkylene-C(H)(F)C*H$_2$—, or -alkylene-C(F)$_2$C*H$_2$—;

C is

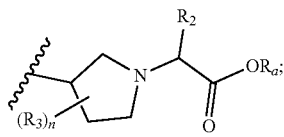

R is H, alkyl, or aryl;

$R_1$ is independently H, alkyl, halide, alkoxy, CF$_3$, OH, alkylene-OH, NO$_2$, —N(H)R, or NH$_2$;

$R_2$ is substituted or unsubstituted bicyclic aromatic heterocyclyl; $R_a$ is H, (C$_1$-C$_6$)alkyl, —C$_1$-C$_6$)alkylene-O—(C$_1$-C$_6$)alkyl, or —(C$_1$-C$_6$)alkylene-O—C(O)O(C$_1$-C$_6$)alkyl;

n is 0;

* denotes the point of attachment of B to C; and the absolute configuration at any stereocenter is R, S, or a mixture thereof; or a pharmaceutically acceptable salt thereof.

In certain embodiments, the invention relates to any one of the aforementioned compounds, wherein A is

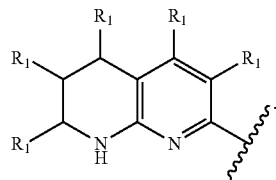

In certain embodiments, the invention relates to any one of the aforementioned compounds, wherein A is

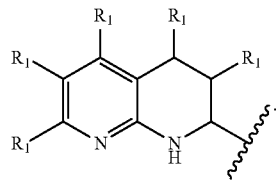

In certain embodiments, the invention relates to any one of the aforementioned compounds, wherein B is alkylene. In some embodiments, B is alkylene is —(CH$_2$)$_5$—. In certain embodiments, the invention relates to any one of the aforementioned compounds, wherein B is -alkylene-(O). In some embodiments, -alkylene-(O)— is —(CH$_2$)$_4$—O—. In certain embodiments, the invention relates to any one of the aforementioned compounds, wherein B is -alkylene-N(R)C(O)—. In certain embodiments, the invention relates to any one of the aforementioned compounds, wherein B is -alkylene-(heterocyclyl)-C(O)—. In certain embodiments, the invention relates to any one of the aforementioned compounds, wherein B is -alkylene-C(O)N(R)—. In certain embodiments, the invention relates to any one of the aforementioned compounds, wherein B is -alkylene-C(O)—. In certain embodiments, the invention relates to any one of the aforementioned compounds, wherein B is -alkylene-N(R)—. In certain embodiments, the invention relates to any one of the aforementioned compounds, wherein B is -alkylene-N(R)C(O)N(R)—. In certain embodiments, the invention relates to any one of the aforementioned compounds, wherein B is -alkylene-N(R)SO$_2$—. In certain embodiments, the invention relates to any one of the aforementioned compounds, wherein B is -alkylene-(aryl)-. In certain embodiments, the invention relates to any one of the aforementioned compounds, wherein B is -alkylene-(heterocyclyl)-. In certain embodiments, the invention relates to any one of the aforementioned compounds, wherein B is -alkylene-(heterocyclyl)-alkylene-. In certain embodiments, the invention relates to any one of the aforementioned compounds, wherein B is -aryl-alkylene-N(R)C(O)—. In certain embodiments, the invention relates to any one of the aforementioned compounds, wherein B is -aryl-C(O)N(R)—. In certain embodiments, the invention relates to any one of the aforementioned compounds, wherein B is -aryl-N(R)C(O)—. In certain embodiments, the invention relates to any one of the aforementioned compounds, wherein B is -(heterocyclyl)-alkylene-. In certain embodiments, the invention relates to any one of the aforementioned compounds, wherein B is -heterocyclyl-alkylene-N(R)C(O)—. In certain embodiments, the invention relates to any one of the aforementioned compounds, wherein B is -heterocyclyl-C(O)N(R)—. In certain embodiments, the invention relates to any one of the aforementioned compounds, wherein B is —O-heterocyclyl-. In certain embodiments, the invention relates to any one of the aforementioned compounds, wherein B is -alkylene-O—. In certain embodiments, the invention relates to any one of the aforementioned compounds, wherein B is -heterocyclyl-C(O)—. In certain embodiments, the invention relates to any one of the aforementioned compounds, wherein B is cycloalkylene. In certain embodiments, the invention relates to any one of the aforementioned compounds, wherein B is cycloalkylene-O-alkylene-C*(H)(F)—. In certain embodiments, the invention relates to any one of the aforementioned compounds, wherein B is -alkylene-C*(H)(F)—. In some embodiments, -alkylene-C*(H)(F)— is —(CH$_2$)$_4$—C*(H)(F)—. In certain embodiments, the invention relates to any one of the aforementioned compounds, wherein B is -alkylene-C*(F)$_2$—. In some embodiments, -alkylene-C*(F)$_2$— is —(CH$_2$)$_4$—C*(F)$_2$—. In certain embodiments, the invention relates to any one of the aforementioned compounds, wherein B is -alkylene-C(H)(F)C*H$_2$—. In certain embodiments, the invention relates to any one of the aforementioned compounds, wherein B is -alkylene-C(F)$_2$C*H$_2$—.

In certain embodiments, the invention relates to any one of the aforementioned compounds, wherein R is H. In certain embodiments, the invention relates to any one of the aforementioned compounds, wherein R is alkyl. In some embodiments, alkyl is methyl, ethyl, i-propyl, n-propyl, i-butyl, n-butyl, or t-butyl. In certain embodiments, the invention relates to any one of the aforementioned compounds, wherein R is aryl.

In certain embodiments, the invention relates to any one of the aforementioned compounds, wherein In certain embodiments, the invention relates to any one of the aforementioned compounds, wherein R$_1$ is H. In certain embodiments, the invention relates to any one of the aforementioned compounds, wherein R$_1$ is alkyl. In certain embodiments, the invention relates to any one of the aforementioned compounds, wherein R$_1$ is halide. In certain embodiments, the invention relates to any one of the aforementioned compounds, wherein R$_1$ is alkoxy. In certain embodiments, the invention relates to any one of the aforementioned compounds, wherein R$_1$ is CF$_3$. In certain embodiments, the invention relates to any one of the aforementioned compounds, wherein R$_1$ is OH. In certain embodiments, the invention relates to any one of the aforementioned compounds, wherein R$_1$ is alkylene-OH. In certain embodiments, the invention relates to any one of the aforementioned compounds, wherein R$_1$ is NO$_2$. In certain embodiments, the invention relates to any one of the aforementioned compounds, wherein R$_1$ is —N(H)R. In certain embodiments, the invention relates to any one of the aforementioned compounds, wherein R$_1$ is NH$_2$. In certain embodiments, the invention relates to any one of the aforementioned compounds, wherein at least one instance of R$_1$ is alkyl, halide, OMe, OH, alkylene-OH, or NH$_2$. In certain embodiments, the invention relates to any one of the aforementioned compounds, wherein at least one instance of R$_1$ is OMe. In certain embodiments, the invention relates to any one of the aforementioned compounds, wherein all instances of R$_1$ are H.

In certain embodiments, the invention relates to any one of the aforementioned compounds, wherein R$_2$ is substituted bicyclic aromatic heterocyclyl. In certain embodiments, the invention relates to any one of the aforementioned compounds, wherein R$_2$ is unsubstituted bicyclic aromatic heterocyclyl. In certain embodiments, the invention relates to any one of the aforementioned compounds, wherein R$_2$ is benzoxazolyl. In certain embodiments, the invention relates to any one of the aforementioned compounds, wherein R$_2$ is quinolinyl. In certain embodiments, the invention relates to any one of the aforementioned compounds, wherein R$_2$ is benzothiophenyl. In certain embodiments, the invention relates to any one of the aforementioned compounds, wherein R$_2$ is indazolyl. In certain embodiments, the invention relates to any one of the aforementioned compounds, wherein R$_2$ is indolyl. In certain embodiments, the invention relates to any one of the aforementioned compounds, wherein R$_2$ is benzotriazolyl. In certain embodiments, the invention relates to any one of the aforementioned compounds, wherein R$_2$ is benzisoxalolyl. In certain embodiments, the invention relates to any one of the aforementioned compounds, wherein R$_2$ is benzisothiazolyl. In certain embodiments, the invention relates to any one of the aforementioned compounds, wherein R$_2$ is benzthiazolyl. In certain embodiments, the invention relates to any one of the aforementioned compounds, wherein R$_2$ is substituted with one or more substituents independently is selected from alkyl, heterocycloalkyl, alkoxy, —(O)alkyl, -alkylene-O-alkyl, -alkylene-cycloalkyl, -alkylene-O-alkyl, cycloalkyl, aryl, heteroaryl, OH, halide, -alkylene-heteroaryl; -alkylene-O-cycloalkyl, -alkylene-O-heterocyclocycloalkyl, —O—alkylene-cycloalkyl, —O-alkylene-heterocycloalkyl, and each of which can be further substituted with alkyl, halide, or alkoxyl.

In certain embodiments, the invention relates to any one of the aforementioned compounds, wherein R$_2$ is an optionally substituted 6- to 10-membered bicyclic fused heteroaryl. In certain embodiments, the invention relates to any one of the aforementioned compounds, wherein R$_2$ is an optionally substituted 9- or 10-membered fused bicyclic heterocyclyl comprising a 6-member aryl or heteroaryl moiety fused to a 5- or 6-membered heteroaryl moiety. In certain embodiments, the invention relates to any one of the aforementioned compounds, wherein R$_2$ is an optionally substituted 9-membered fused bicyclic heterocyclyl comprising a 6-member aryl moiety fused to a 5-membered heteroaryl moiety. In certain embodiments, the invention relates to any one of the aforementioned compounds, wherein R$_2$ is an optionally substituted 9-membered fused bicyclic heterocyclyl comprising a 6-member heteroaryl moiety fused to a 5-membered heteroaryl moiety. In certain embodiments, the invention relates to any one of the aforementioned compounds, wherein R$_2$ is an optionally substituted 10-membered fused bicyclic heterocyclyl comprising a 6-member aryl moiety fused to a 6-membered heteroaryl moiety. In certain embodiments, the invention relates to any one of the aforementioned compounds, wherein R$_2$ is substituted with one or more R$_3$' where R$_3$' is selected from alkyl including cycloalkyl (e.g., C$_1$-C$_6$ linear, branched or cyclic, including methyl, and cyclopropyl) or alkoxy or O-containing heterocycloalkyl (e.g., 1-6 atom linear, branched or cyclic alkoxy or heterocycloalkyl). In some examples, R$_2$ is selected from

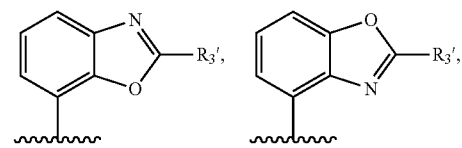

-continued

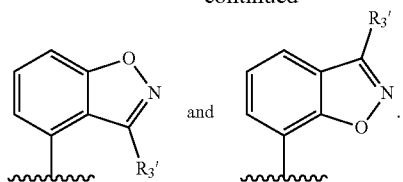

In certain embodiments, the invention relates to any one of the aforementioned compounds, wherein $R_2$ is selected from

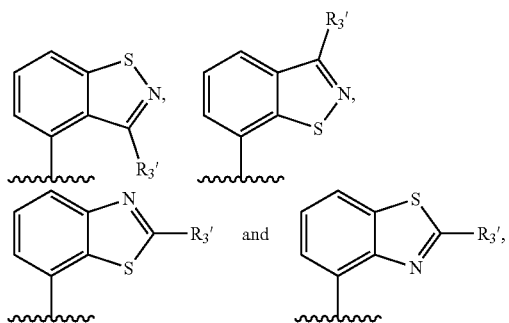

where $R_3'$ is defined above. In certain embodiments, the invention relates to any one of the aforementioned compounds, wherein $R_2$ is selected from

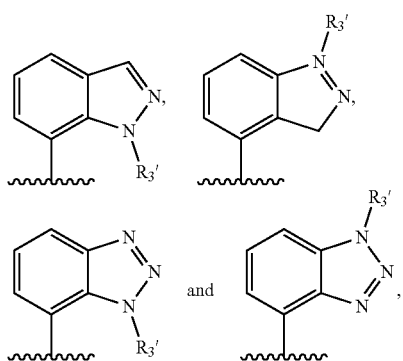

where $R_3'$ is defined above. In certain embodiments, the invention relates to any one of the aforementioned compounds, wherein $R_2$ is selected from

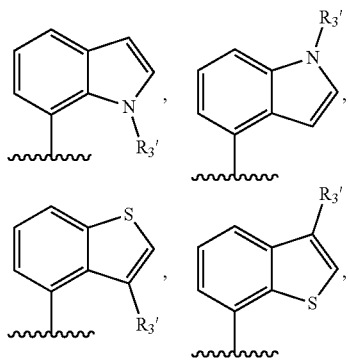

-continued

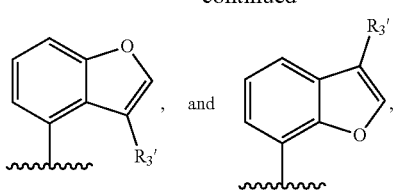

where $R_3'$ is defined above.

In certain embodiments, the invention relates to any one of the aforementioned compounds, wherein $R_2$ is selected from

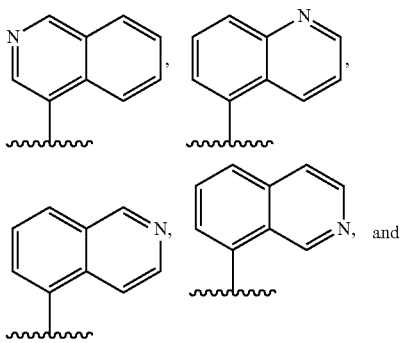

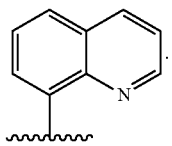

In certain embodiments, the invention relates to any one of the aforementioned compounds, wherein $R_2$ is

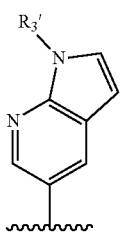

where $R_3'$ is defined above.

In certain embodiments, the invention relates to any one of the aforementioned compounds, wherein $R_2$ is selected from

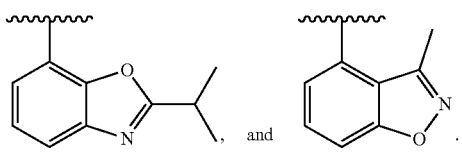 [SMILES: *c1cccc2nc(C(C)C)oc12 ; *c1cccc2onc(C)c12]

In certain embodiments, the invention relates to any one of the aforementioned compounds, R$_2$ is selected from:

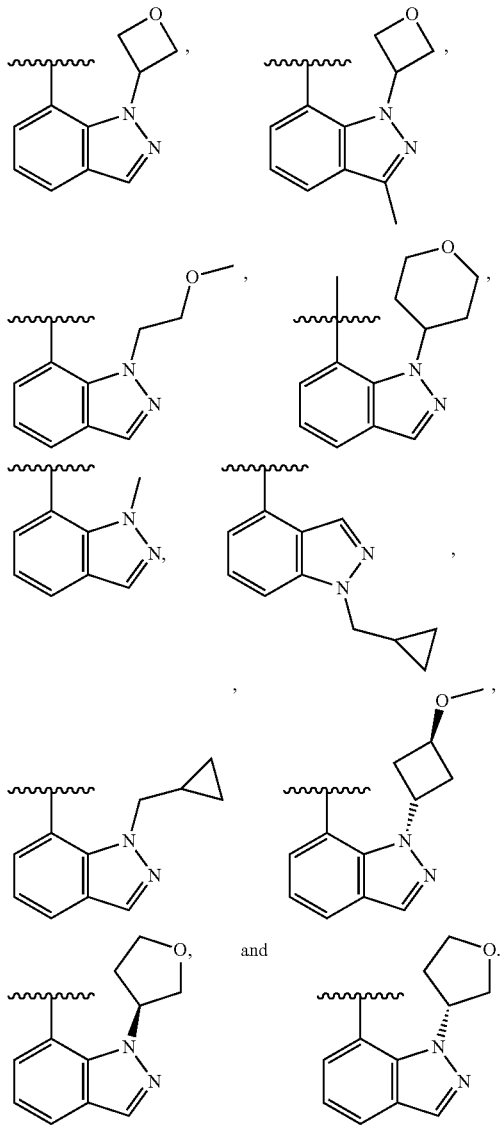

In certain embodiments, the invention relates to any one of the aforementioned compounds, wherein R$_2$ is selected from:

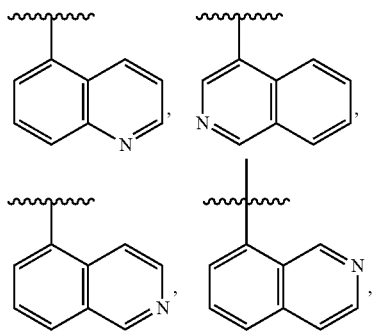

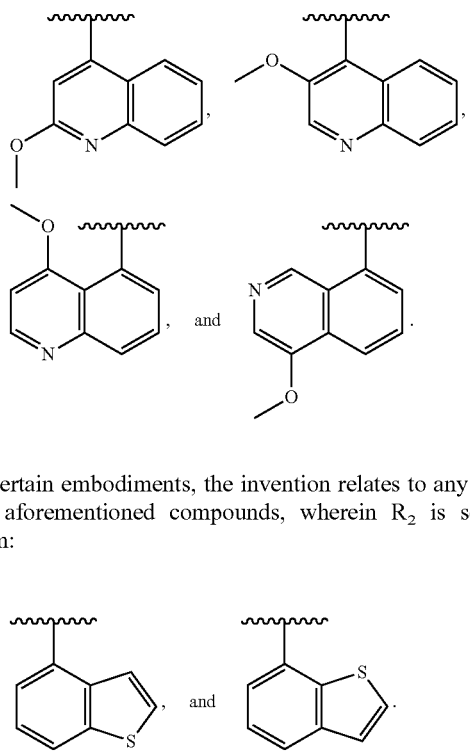

In certain embodiments, the invention relates to any one of the aforementioned compounds, wherein R$_2$ is selected from:

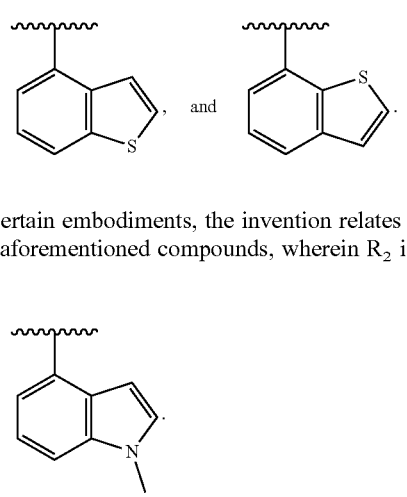

In certain embodiments, the invention relates to any one of the aforementioned compounds, wherein R$_2$ is

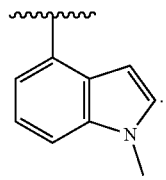

In certain embodiments, the invention relates to any one of the aforementioned compounds, wherein R$_2$ is

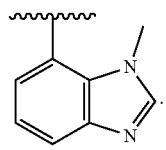

In certain embodiments, the invention relates to any one of the aforementioned compounds, wherein R$_2$ is

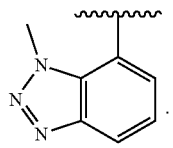

In certain embodiments, the invention relates to any one of the aforementioned compounds, wherein R₂ is

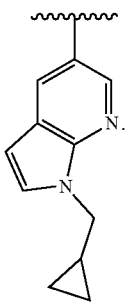 [SMILES: *c1cnc2c(ccn2CC2CC2)c1]

In certain embodiments, the invention relates to any one of the aforementioned compounds, wherein R₃ is H. In certain embodiments, the invention relates to any one of the aforementioned compounds, wherein R₃ is halide. In certain embodiments, the invention relates to any one of the aforementioned compounds, wherein R₃ is CF₃. In certain embodiments, the invention relates to any one of the aforementioned compounds, wherein R₃ is alkyl. In certain embodiments, the invention relates to any one of the aforementioned compounds, wherein R₃ is alkylene-alkoxy. In certain embodiments, the invention relates to any one of the aforementioned compounds, wherein R₃ is aryl. In some embodiments, aryl is phenyl. In certain embodiments, the invention relates to any one of the aforementioned compounds, wherein R₃ is hydroxyl. In certain embodiments, the invention relates to any one of the aforementioned compounds, wherein R₃ is alkoxy. In some embodiments, alkoxy is methoxy, ethoxy, i-propyloxy, or t-butyloxy. In some embodiments, alkoxy is methoxy.

In certain embodiments, the invention relates to any one of the aforementioned compounds, wherein $R_a$ is H. In certain embodiments, the invention relates to any one of the aforementioned compounds, wherein $R_a$ is (C₁-C₆)alkyl. In some embodiments, (C₁-C₆)alkyl is methyl, ethyl, i-propyl, n-propyl, i-butyl, n-butyl, or t-butyl. In certain embodiments, the invention relates to any one of the aforementioned compounds, wherein $R_a$ is —(C₁-C₆)alkylene-O—(C₁-C₆)alkyl. In certain embodiments, the invention relates to any one of the aforementioned compounds, wherein $R_a$ is —(C₁-C₆)alkylene-O—C(O)O(C₁-C₆)alkyl.

In certain embodiments, the invention relates to any one of the aforementioned compounds, wherein n is 0. In certain embodiments, the invention relates to any one of the aforementioned compounds, wherein n is 1. In certain embodiments, the invention relates to any one of the aforementioned compounds, wherein n is 2. In certain embodiments, the invention relates to any one of the aforementioned compounds, wherein n is 3. In certain embodiments, the invention relates to any one of the aforementioned compounds, wherein n is 4.

In certain embodiments, the invention relates to a compound of Formula I:

A-B—C    (I)

wherein:

A is

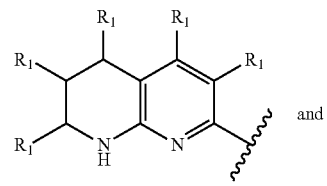

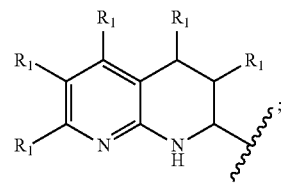

B is -alkylene-(O), -alkylene-C*(H)(F)—, -alkylene-C*(F)₂—, -alkylene-C(H)(F)C*H₂—, or -alkylene-C(F)₂C*H₂—;

C is

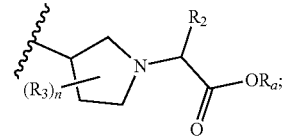

R₁ is independently H, alkyl, halide, alkoxy, CF₃, OH, alkylene-OH, NO₂, —N(H)R, or NH₂;

R₂ is substituted or unsubstituted bicyclic aromatic heterocyclyl;

$R_a$ is H;

n is 0;

* denotes the point of attachment of B to C; and the absolute configuration at any stereocenter is R, S, or a mixture thereof;

or a pharmaceutically acceptable salt thereof.

In certain embodiments, the invention relates to a compound of Formula I:

A-B—C    (I)

wherein:

A is

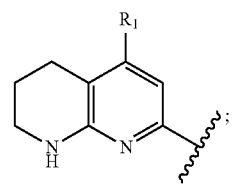

B is -alkylene-(O), -alkylene-C*(H)(F)—, -alkylene-C*(F)₂—, -alkylene-C(H)(F)C*H₂—, or -alkylene-C(F)₂C*H₂—;

C is

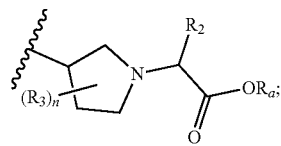

R₁ is independently H, alkyl, halide, alkoxy, CF₃, OH, alkylene-OH, NO₂, —N(H)R, or NH₂;

R₂ is substituted or unsubstituted bicyclic aromatic heterocyclyl;

R_a is H;

n is 0;

* denotes the point of attachment of B to C; and the absolute configuration at any stereocenter is R, S, or a mixture thereof;

or a pharmaceutically acceptable salt thereof.

In certain embodiments, the invention relates to any one of the aforementioned compounds, wherein the absolute configuration at any stereocenter is R. In certain embodiments, the invention relates to any one of the aforementioned compounds, wherein the absolute configuration at any stereocenter is S. In certain embodiments, the invention relates to any one of the aforementioned compounds, wherein the absolute configuration at any stereocenter is a mixture of R and S.

In certain embodiments, the invention relates to any one of the aforementioned compounds, wherein the compound is a pharmaceutically acceptable salt.

In certain embodiments, the invention relates to a compound is selected from the group consisting of:

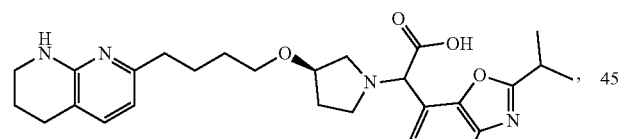

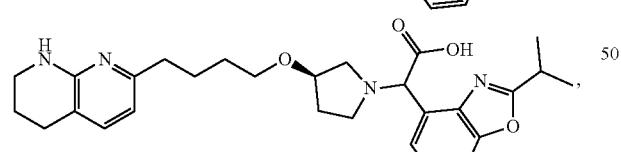

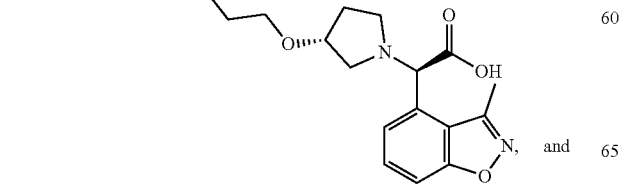

and

In certain embodiments, the invention relates to a compound is selected from the group consisting of:

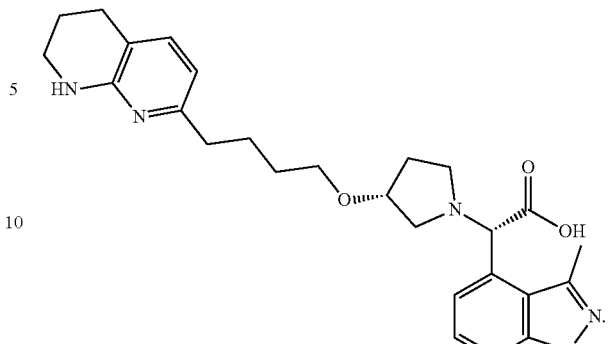

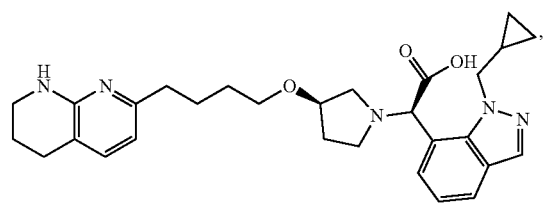

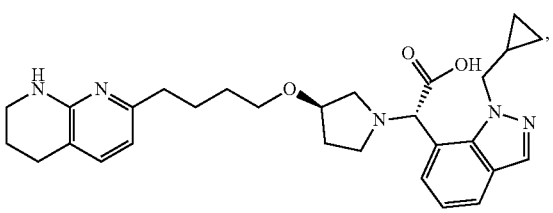

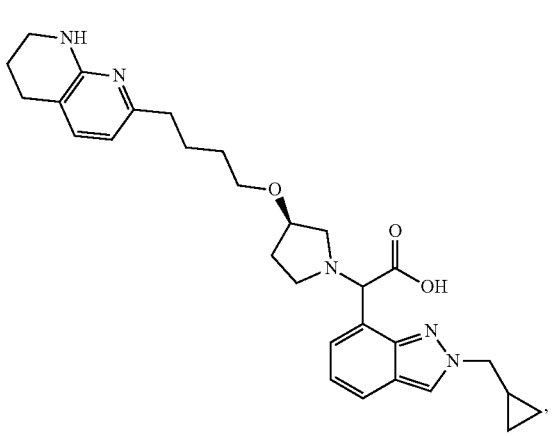

31
-continued
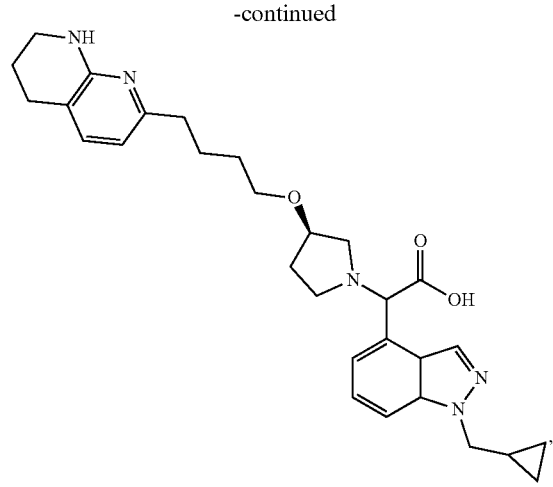
32
-continued
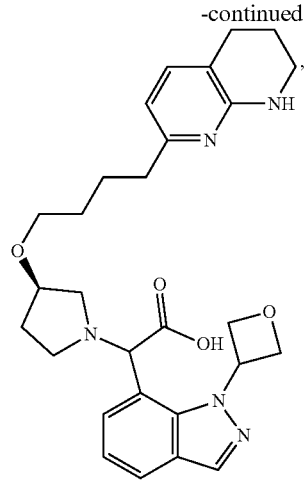
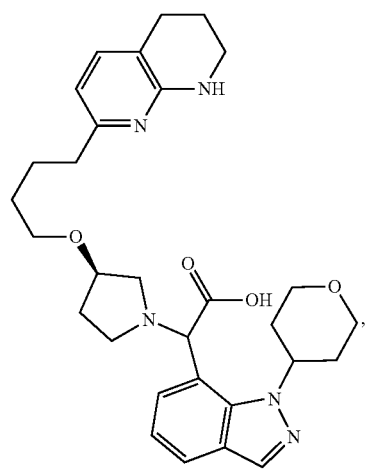
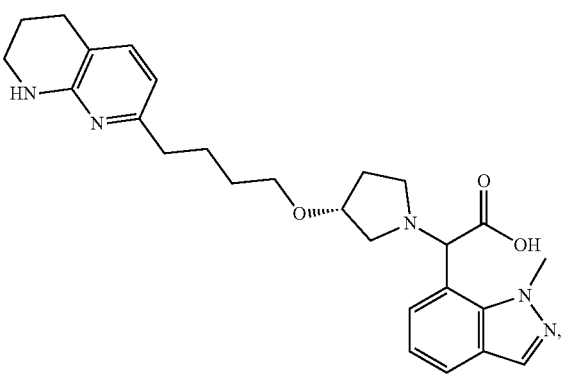
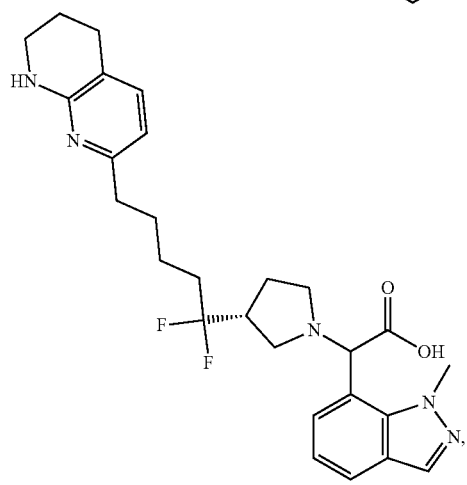
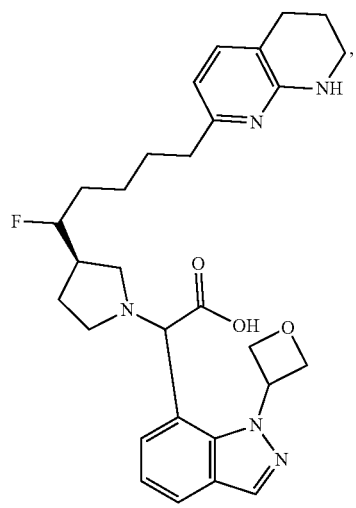

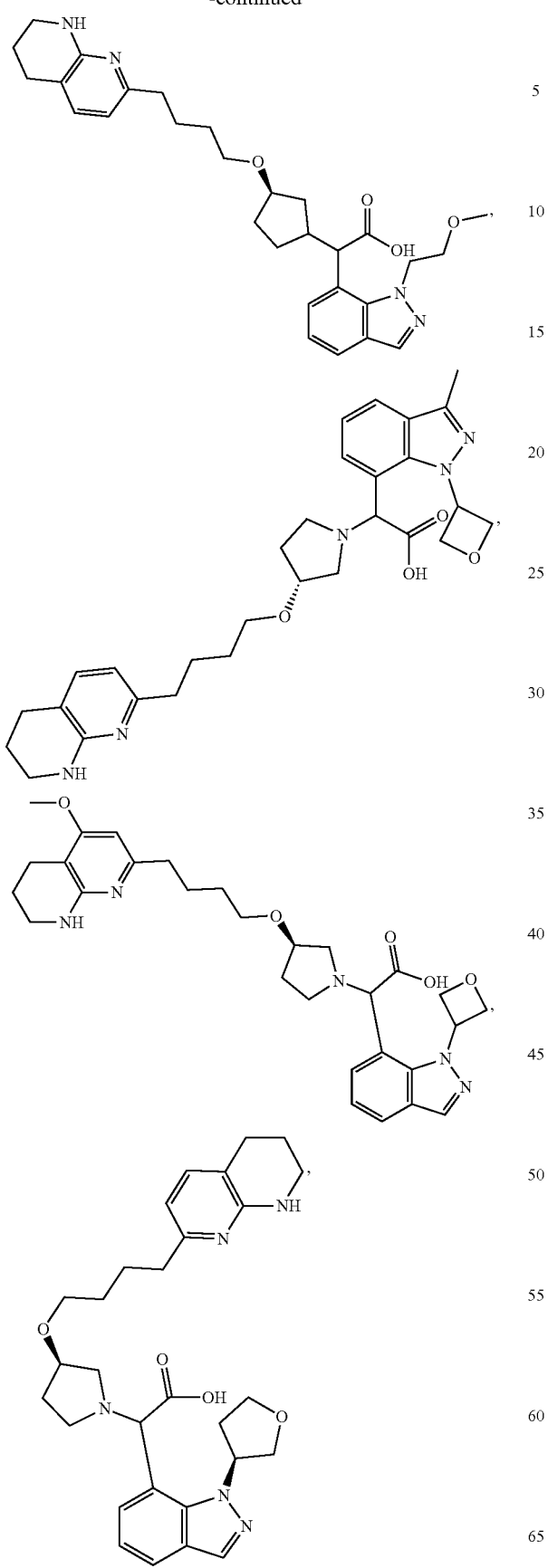

35
-continued
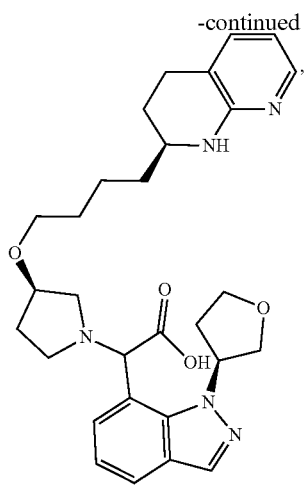
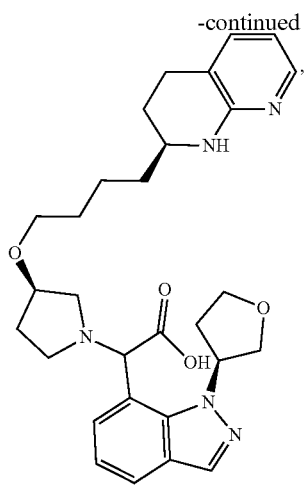
36
-continued
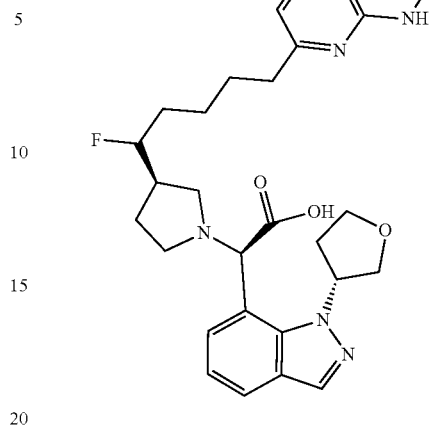
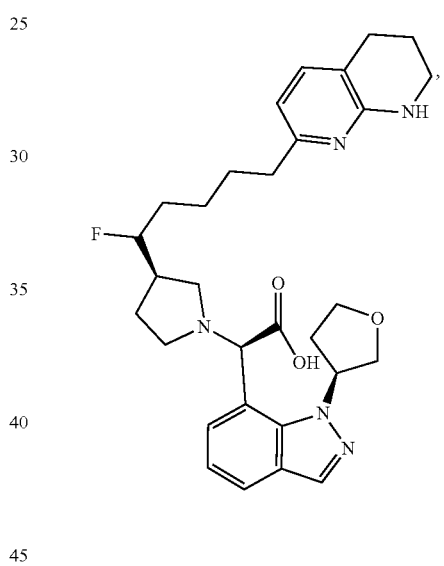
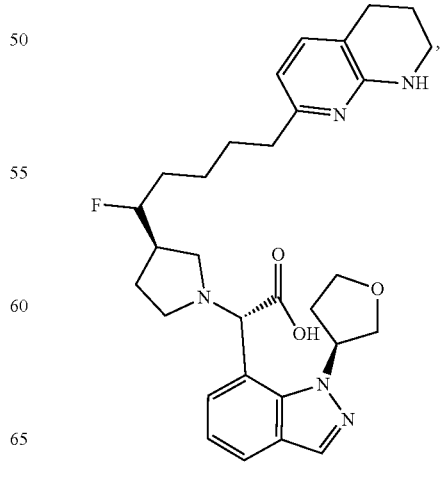

37
-continued
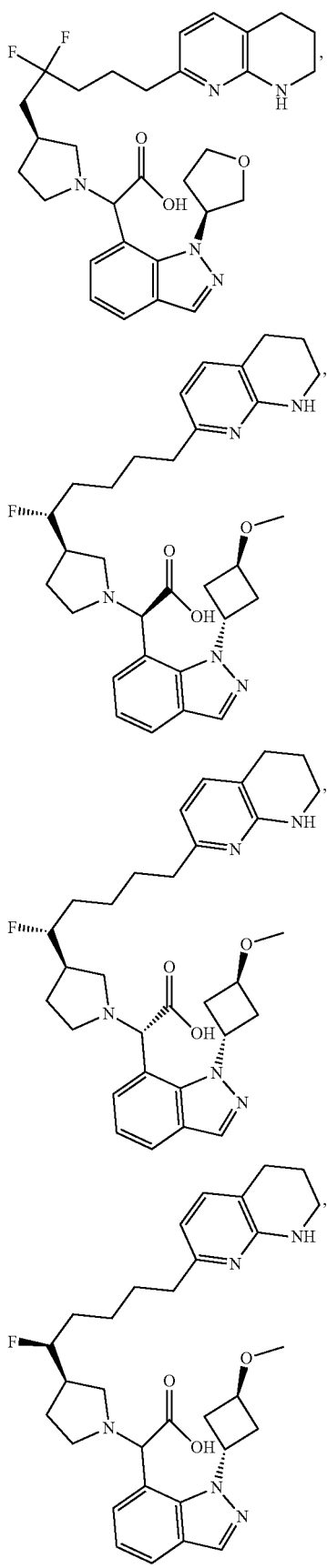 [SMILES: O=C(O)C(c1cccc2cnn([C@H]3CCOC3)c12)N1CC[C@@H](CC(F)(F)CCCc2ccc3c(n2)NCCC3)C1 ; CO[C@H]1C[C@H](n2ncc3cccc([C@H](C(=O)O)N4CC[C@@H]([C@H](F)CCCCc5ccc6c(n5)NCCC6)C4)c32)C1 ; CO[C@H]1C[C@H](n2ncc3cccc([C@@H](C(=O)O)N4CC[C@@H]([C@H](F)CCCCc5ccc6c(n5)NCCC6)C4)c32)C1 ; CO[C@H]1C[C@H](n2ncc3cccc(C(C(=O)O)N4CC[C@@H]([C@@H](F)CCCCc5ccc6c(n5)NCCC6)C4)c32)C1]
38
-continued
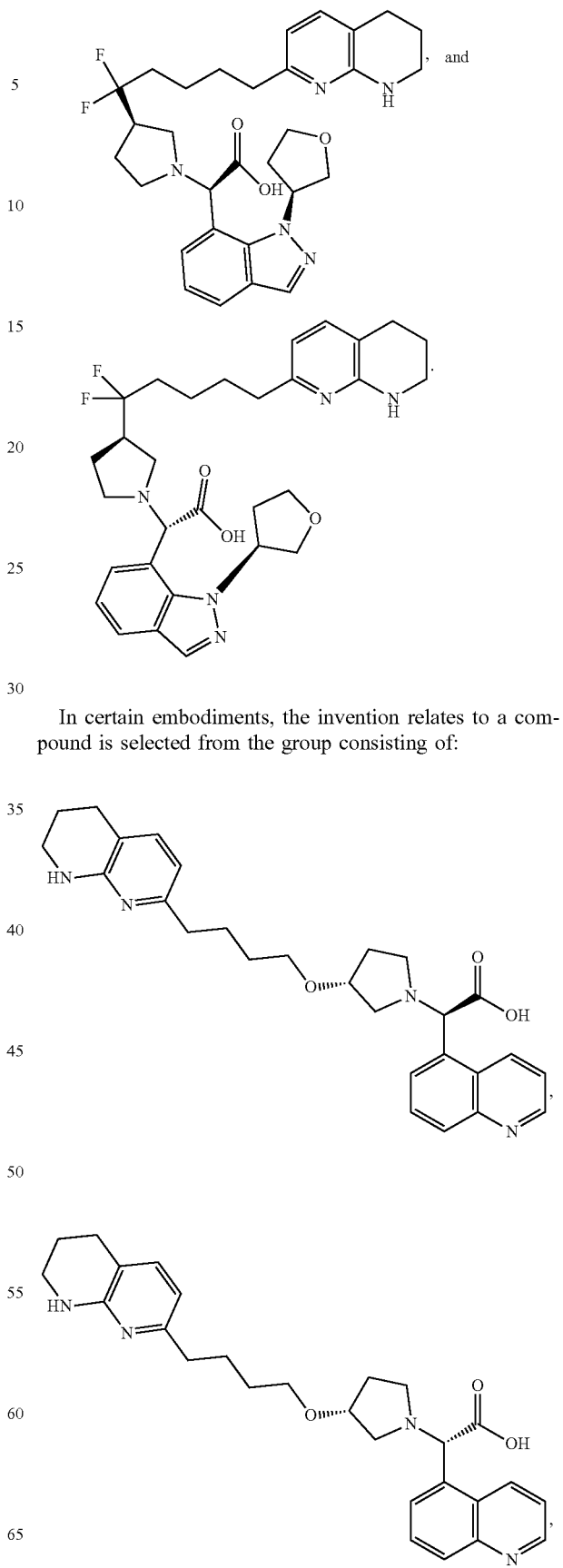
In certain embodiments, the invention relates to a compound is selected from the group consisting of:

39
-continued
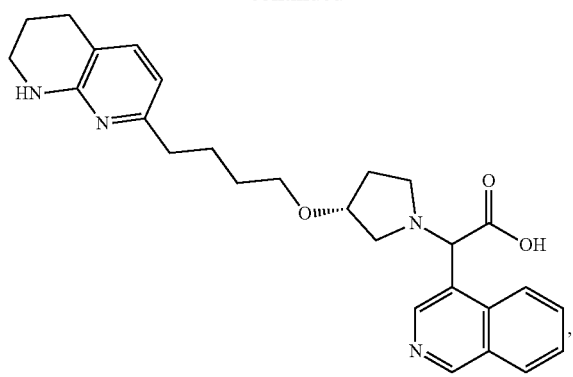
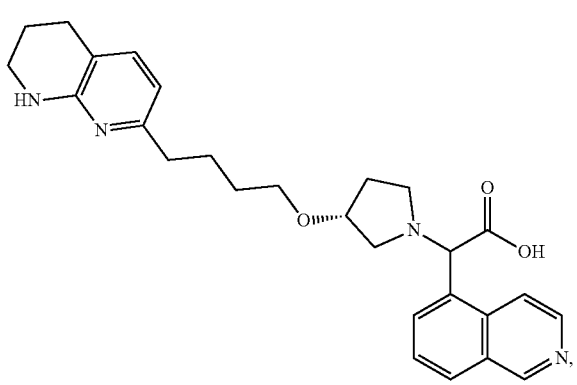
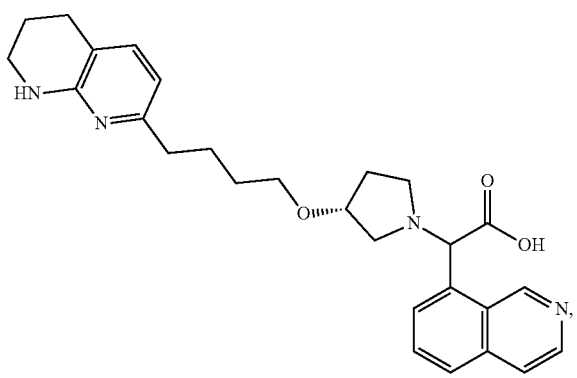
40
-continued
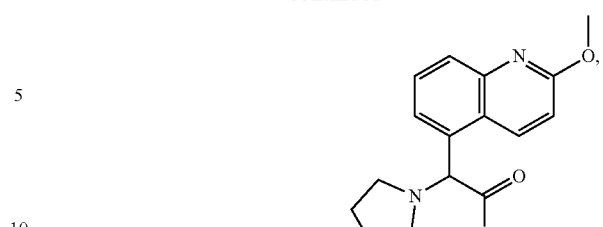
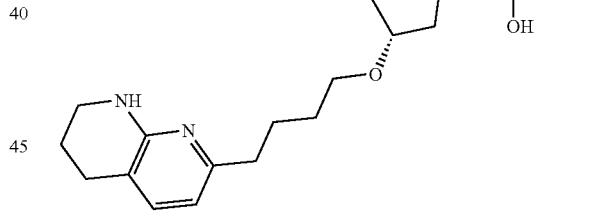
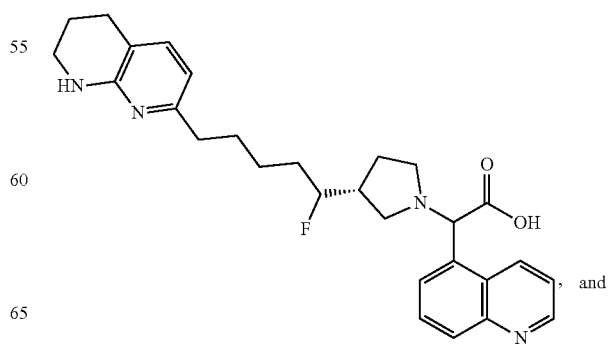

-continued
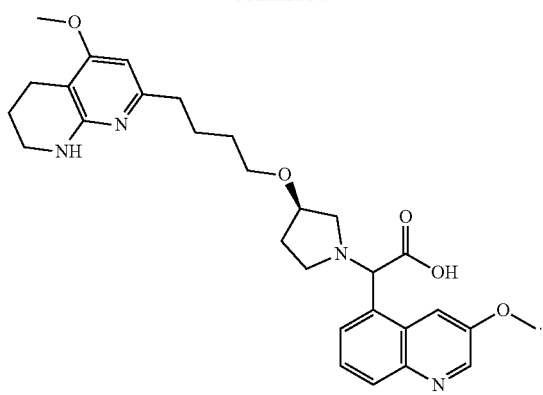
In certain embodiments, the invention relates to a compound is selected from the group consisting of:
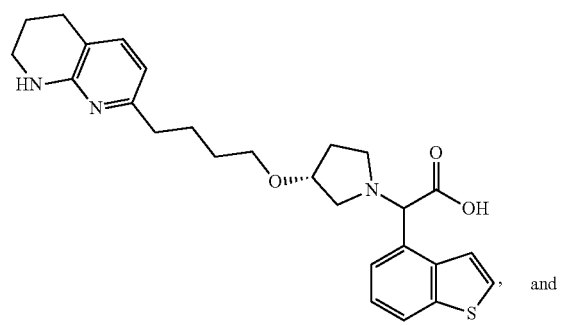, and
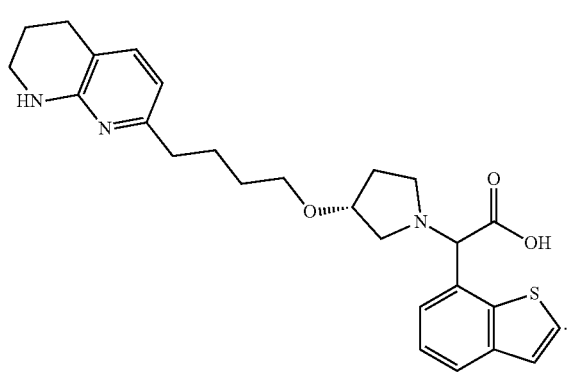
In certain embodiments, the invention relates to a compound of formula:
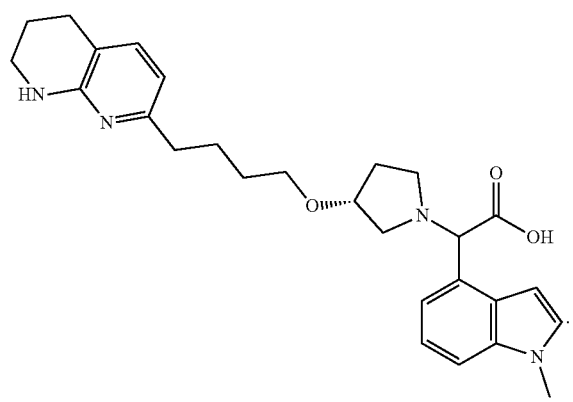 [SMILES: Cn1ccc2c(C(C(=O)O)N3CC[C@@H](OCCCCc4ccc5c(n4)NCCC5)C3)cccc21]
In certain embodiments, the invention relates to a compound of formula:
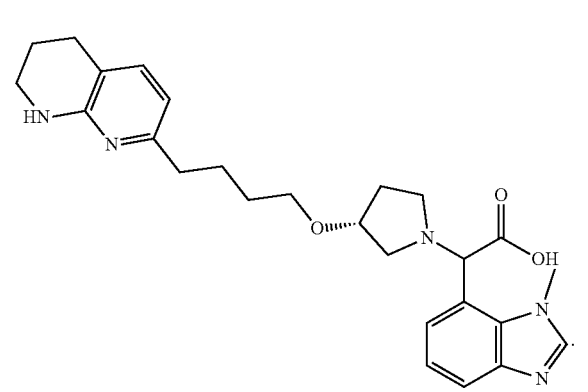 [SMILES: Cn1cnc2cccc(C(C(=O)O)N3CC[C@@H](OCCCCc4ccc5c(n4)NCCC5)C3)c21]
In certain embodiments, the invention relates to a compound of formula:
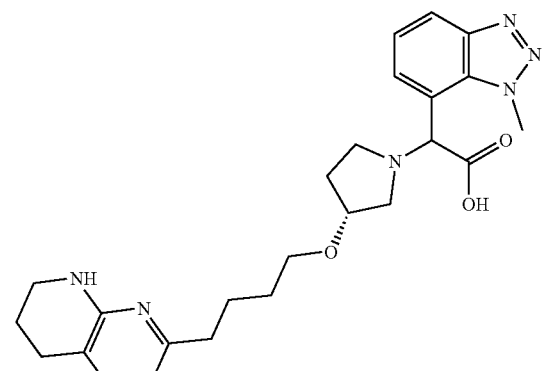

In certain embodiments, the invention relates to a compound of formula:
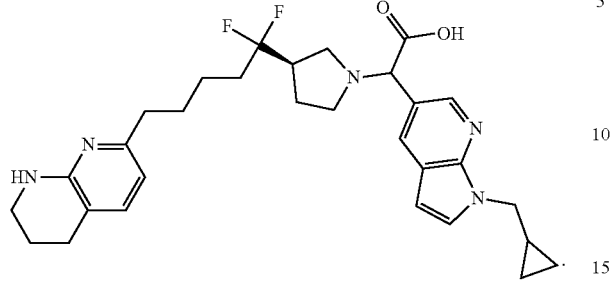
In certain embodiments, the invention relates to a compound is selected from the group consisting of:
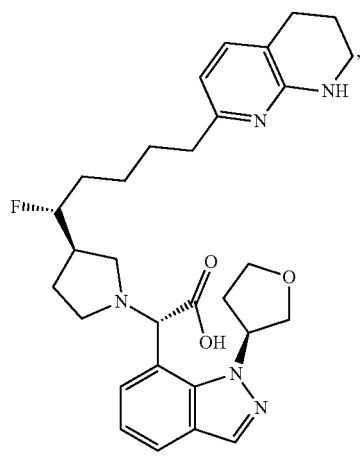
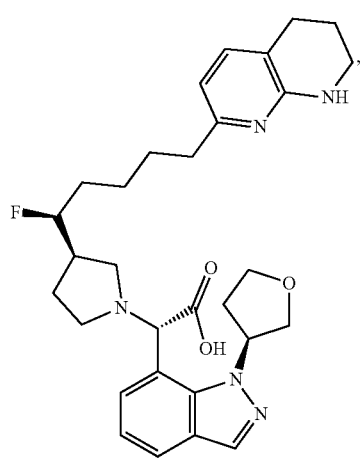
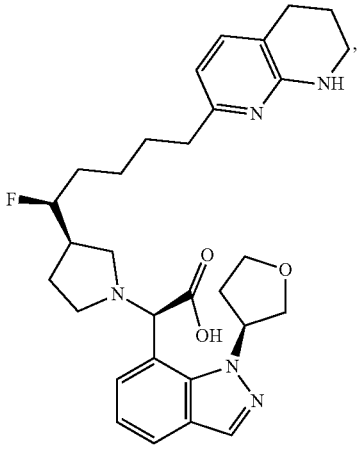
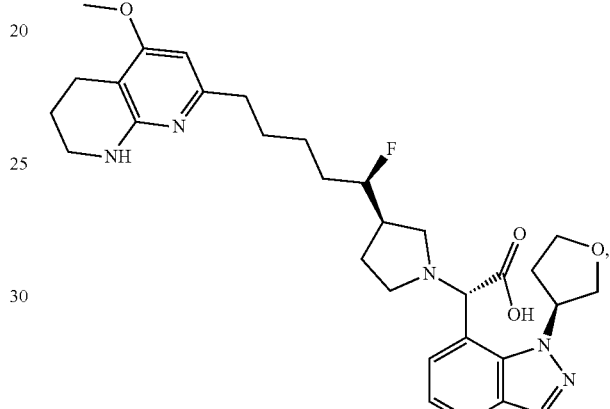
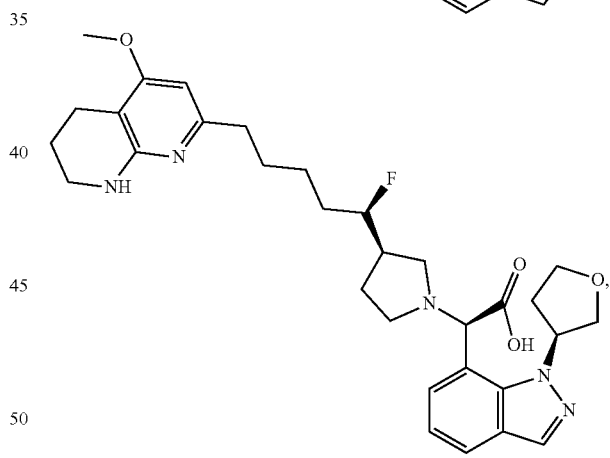
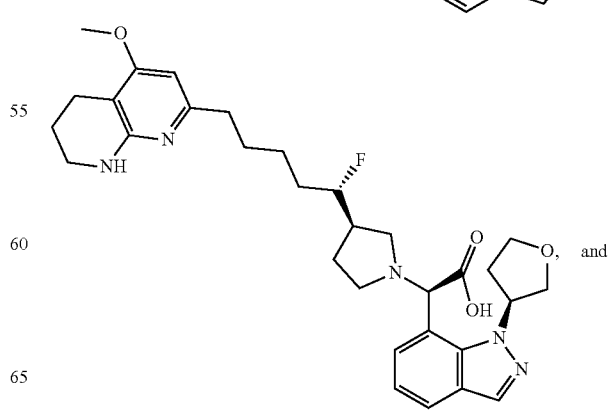

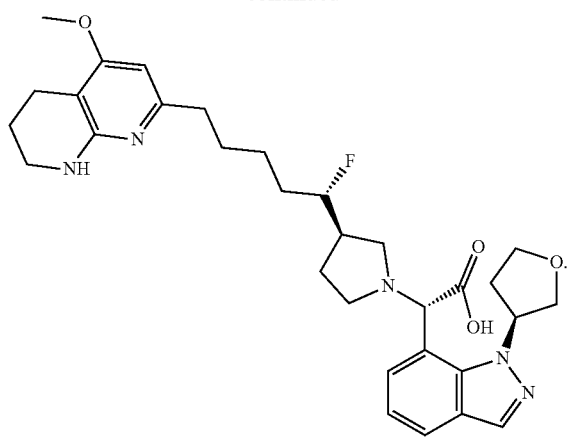

In certain embodiments, the invention relates to a compound of formula

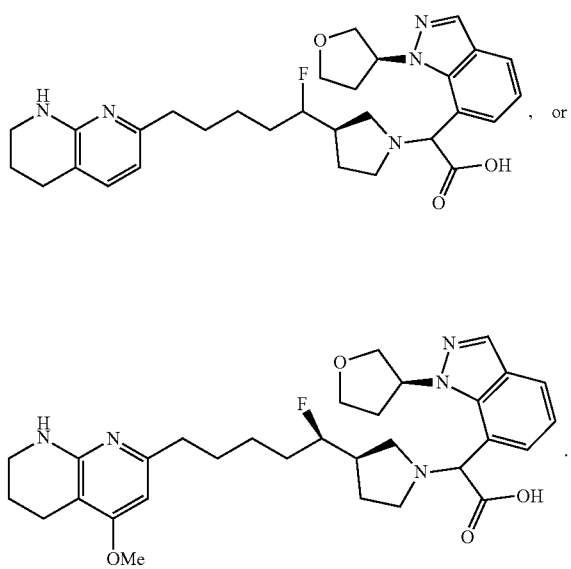

In certain embodiments, the invention relates to a compound of Formula I:

A-B—C  (I)

wherein:

A is

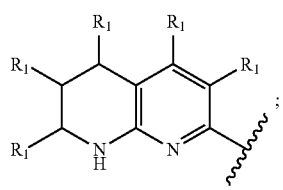

B is -alkylene-(O)-; -cycloalkylene-O-alkylene-C*(H)(F)—, -alkylene-C*(F)$_2$—, -alkylene-C(H)(F)C*H$_2$—, or -alkylene-C(F)$_2$C*H$_2$—;

C is

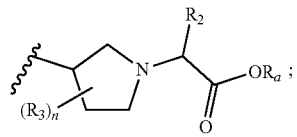

$R_1$ is independently H;
$R_2$ is substituted or unsubstituted bicyclic aromatic heterocyclyl;
$R_a$ is H;
n is 0;
* denotes the point of attachment of B to C; and
the absolute configuration at any stereocenter is R, S, or a mixture thereof;
or a pharmaceutically acceptable salt thereof.

Exemplary Pharmaceutical Compositions

In certain embodiments, the invention relates to a pharmaceutical composition comprising any one of the aforementioned compounds and a pharmaceutically acceptable carrier.

Patients, including but not limited to humans, can be treated by administering to the patient an effective amount of the active compound or a pharmaceutically acceptable prodrug or salt thereof in the presence of a pharmaceutically acceptable carrier or diluent. The active materials can be administered by any appropriate route, for example, orally, parenterally, intravenously, intradermally, subcutaneously, or topically, in liquid or solid form.

The concentration of active compound in the drug composition will depend on absorption, inactivation and excretion rates of the drug as well as other factors known to those of skill in the art. It is to be noted that dosage values will also vary with the severity of the condition to be alleviated. It is to be further understood that for any particular subject, specific dosage regimens should be adjusted over time according to the individual need and the professional judgment of the person administering or supervising the administration of the compositions, and that the concentration ranges set forth herein are exemplary only and are not intended to limit the scope or practice of the claimed composition. The active ingredient can be administered at once, or can be divided into a number of smaller doses to be administered at varying intervals of time.

In certain embodiments, the mode of administration of the active compound is oral. Oral compositions will generally include an inert diluent or an edible carrier. They can be enclosed in gelatin capsules or compressed into tablets. For the purpose of oral therapeutic administration, the active compound can be incorporated with excipients and used in the form of tablets, troches or capsules. Pharmaceutically compatible binding agents, and/or adjuvant materials can be included as part of the composition.

The tablets, pills, capsules, troches and the like can contain any of the following ingredients, or compounds of a similar nature: a binder such as microcrystalline cellulose, gum tragacanth or gelatin; an excipient such as starch or lactose, a disintegrating agent such as alginic acid, Primogel or corn starch; a lubricant such as magnesium stearate or Sterotes; a glidant such as colloidal silicon dioxide; a sweetening agent such as sucrose or saccharin; or a flavoring agent such as peppermint, methyl salicylate, or orange flavoring. When the dosage unit form is a capsule, it can contain, in addition to material of the above type, a liquid carrier such as a fatty oil. In addition, unit dosage forms can contain various other materials that modify the physical form of the dosage unit, for example, coatings of sugar, shellac, or other enteric agents.

The compound can be administered as a component of an elixir, suspension, syrup, wafer, chewing gum or the like. A syrup can contain, in addition to the active compound(s), sucrose or sweetener as a sweetening agent and certain preservatives, dyes and colorings and flavors.

The compound or a pharmaceutically acceptable prodrug or salts thereof can also be mixed with other active materials that do not impair the desired action, or with materials that supplement the desired action, such as antibiotics, antifungals, anti-inflammatories or other antivirals, including but not limited to nucleoside compounds. Solutions or suspensions used for parenteral, intradermal, subcutaneous, or topical application can include the following components: a sterile diluent such as water for injection, saline solution, fixed oils, polyethylene glycols, glycerine, propylene glycol or other synthetic solvents; antibacterial agents such as benzyl alcohol or methyl parabens; antioxidants such as ascorbic acid or sodium bisulfite; chelating agents, such as ethylenediaminetetraacetic acid; buffers, such as acetates, citrates or phosphates, and agents for the adjustment of tonicity, such as sodium chloride or dextrose. The parental preparation can be enclosed in ampoules, disposable syringes or multiple dose vials made of glass or plastic.

If administered intravenously, carriers include physiological saline and phosphate buffered saline (PBS).

In certain embodiments, the active compounds are prepared with carriers that will protect the compound against rapid elimination from the body, such as a controlled release formulation, including but not limited to implants and microencapsulated delivery systems. Biodegradable, biocompatible polymers can be used, such as ethylene vinyl acetate, polyanhydrides, polyglycolic acid, collagen, polyorthoesters and polylactic acid. For example, enterically coated compounds can be used to protect cleavage by stomach acid. Methods for preparation of such formulations will be apparent to those skilled in the art. Suitable materials can also be obtained commercially.

Liposomal suspensions (including but not limited to liposomes targeted to infected cells with monoclonal antibodies to viral antigens) are also preferred as pharmaceutically acceptable carriers. These can be prepared according to methods known to those skilled in the art, for example, as described in U.S. Pat. No. 4,522,811 (incorporated by reference). For example, liposome formulations can be prepared by dissolving appropriate lipid(s) (such as stearoyl phosphatidyl ethanolamine, stearoyl phosphatidyl choline, arachadoyl phosphatidyl choline, and cholesterol) in an inorganic solvent that is then evaporated, leaving behind a thin film of dried lipid on the surface of the container. An aqueous solution of the active compound is then introduced into the container. The container is then swirled by hand to free lipid material from the sides of the container and to disperse lipid aggregates, thereby forming the liposomal suspension.

Exemplary Methods of the Invention

In certain embodiments, the invention relates to a method of treating a disease or a condition is selected from the group consisting of idiopathic pulmonary fibrosis, diabetic nephropathy, focal segmental glomerulosclerosis, chronic kidney disease, nonalcoholic steatohepatitis, primary biliary cholangitis, primary sclerosing cholangitis, solid tumors, hematological tumors, organ transplant, Alport syndrome, interstitial lung disease, radiation-induced fibrosis, bleomycin-induced fibrosis, asbestos-induced fibrosis, flu-induced fibrosis, coagulation-induced fibrosis, vascular injury-induced fibrosis, aortic stenosis, and cardiac fibrosis comprising the step of: administering to a subject in need thereof a therapeutically effective amount of any one of the aforementioned compounds.

In certain embodiments, the invention relates to any one of the aforementioned methods, wherein the disease or condition is a solid tumor (sarcomas, carcinomas, and lymphomas). Exemplary tumors that may be treated in accordance with the invention include e.g., Ewing's sarcoma, rhabdomyosarcoma, osteosarcoma, myelosarcoma, chondrosarcoma, liposarcoma, leiomyosarcoma, soft tissue sarcoma, non-small cell lung cancer, small cell lung cancer, bronchus cancer, prostate cancer, breast cancer, pancreatic cancer, gastrointestinal cancer, colon cancer, rectum cancer, colon carcinoma, colorectal adenoma, thyroid cancer, liver cancer, intrahepatic bile duct cancer, hepatocellular cancer, adrenal gland cancer, stomach cancer, gastric cancer, glioma (e.g., adult, childhood brain stem, childhood cerebral astrocytoma, childhood visual pathway and hypothalamic), glioblastoma, endometrial cancer, melanoma, kidney cancer, renal pelvis cancer, urinary bladder cancer, uterine corpus, uterine cervical cancer, vaginal cancer, ovarian cancer, multiple myeloma, esophageal cancer, brain cancer (e.g., brain stem glioma, cerebellar astrocytoma, cerebral astrocytoma/malignant glioma, ependymoma, medulloblastoma, supratentorial primitive neuroectodermal tumors, visual pathway and hypothalamic glioma), lip and oral cavity and pharynx, larynx, small intestine, melanoma, villous colon adenoma, a neoplasia, a neoplasia of epithelial character, lymphomas (e.g., AIDS-related, Burkitt's, cutaneous T-cell, Hodgkin, non-Hodgkin, and primary central nervous system), a mammary carcinoma, basal cell carcinoma, squamous cell carcinoma, actinic keratosis, tumor diseases, including solid tumors, a tumor of the neck or head, polycythemia vera, essential thrombocythemia, myelofibrosis with myeloid metaplasia, Waldenstrom's macroglobulinemia, adrenocortical carcinoma, AIDS-related cancers, childhood cerebellar astrocytoma, childhood cerebellar astrocytoma, basal cell carcinoma, extrahepatic bile duct cancer, malignant fibrous histiocytoma bone cancer, bronchial adenomas/carcinoids, carcinoid tumor, gastrointestinal carcinoid tumor, primary central nervous system, cerebellar astrocytoma, childhood cancers, ependymoma, extracranial germ cell tumor, extragonadal germ cell tumor, extrahepatic bile duct cancer, intraocular melanoma eye cancer, retinoblastoma eye cancer, gallbladder cancer, gastrointestinal carcinoid tumor, germ cell tumors (e.g., extracranial, extragonadal, and ovarian), gestational trophoblastic tumor, hepatocellular cancer, hypopharyngeal cancer, hypothalamic and visual pathway glioma, islet cell carcinoma (endocrine pancreas), laryngeal cancer, malignant fibroushistiocytoma of bone/osteosarcoma, medulloblastoma, mesothelioma, metastatic squamous neck cancer with occult primary, multiple endocrine neoplasia syndrome, multiple myeloma/plasma cell neoplasm, mycosis fungoides, nasal cavity and paranasal sinus cancer, nasopharyngeal cancer, neuroblastoma, oral cancer, oropharyngeal cancer, ovarian epithelial cancer, ovarian germ cell tumor, ovarian low malignant potential tumor, islet cell pancreatic cancer, parathyroid cancer, pheochromocytoma, pineoblastoma, pituitary tumor, pleuropulmonary blastoma, ureter transitional cell cancer, retinoblastoma, rhabdomyosarcoma, salivary gland cancer, Sezary syndrome, non-melanoma skin cancer, Merkel cell carcinoma, squamous cell carcinoma, testicular cancer, thymoma, gestational trophoblastic tumor, and Wilms' tumor.

In certain embodiments, the invention relates to any one of the aforementioned methods, wherein the disease is disease or condition is a hematological tumor. Exemplary homatological tumors that may be treated in accordance with the invention include e.g., acute lymphocytic leukemia, acute myelogenous leukemia, chronic lymphocytic leukemia, chronic myelogenous leukemia, Hodgkin lymphoma, non-Hodgkin lymphoma, and multiple myeloma.

In certain embodiments, the invention relates to any one of the aforementioned methods, wherein the disease or condition is selected from the group consisting of idiopathic pulmonary fibrosis, systemic sclerosis associated interstitial lung disease, myositis associated interstitial lung disease, systemic lupus erythematosus associated interstitial lung disease, rheumatoid arthritis, and associated interstitial lung disease.

In certain embodiments, the invention relates to any one of the aforementioned methods, wherein the disease or condition is selected from the group consisting of diabetic nephropathy, focal segmental glomerulosclerosis, and chronic kidney disease.

In certain embodiments, the invention relates to any one of the aforementioned methods, wherein the disease or condition is selected from the group consisting of nonalcoholic steatohepatitis, primary biliary cholangitis, and primary sclerosing cholangitis.

In certain embodiments, the invention relates to any one of the aforementioned methods, wherein the subject is a mammal. In certain embodiments, the invention relates to any one of the aforementioned methods, wherein the subject is human.

EXEMPLIFICATION

The invention now being generally described, it will be more readily understood by reference to the following examples, which are included merely for purposes of illustration of certain aspects and embodiments of the present invention, and are not intended to limit the invention.

General Schemes and Procedures for the Preparation of Compounds of the Invention The moieties $R_1$ and $R_2$ represent appropriate substituents; L represents an appropriate linker, and X represents an appropriate halogen, such as Br, Cl or I, or another leaving group, such as mesylate or tosylate.

represents an appropriate optionally substituted pyrrolidine.

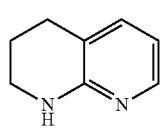

represents an appropriate optionally substituted tetrahydronaphthyridine.

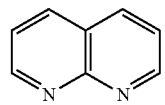

represents an appropriate optionally substituted naphthyridine.

General Schemes for the Synthesis of αvβ6 Inhibitors

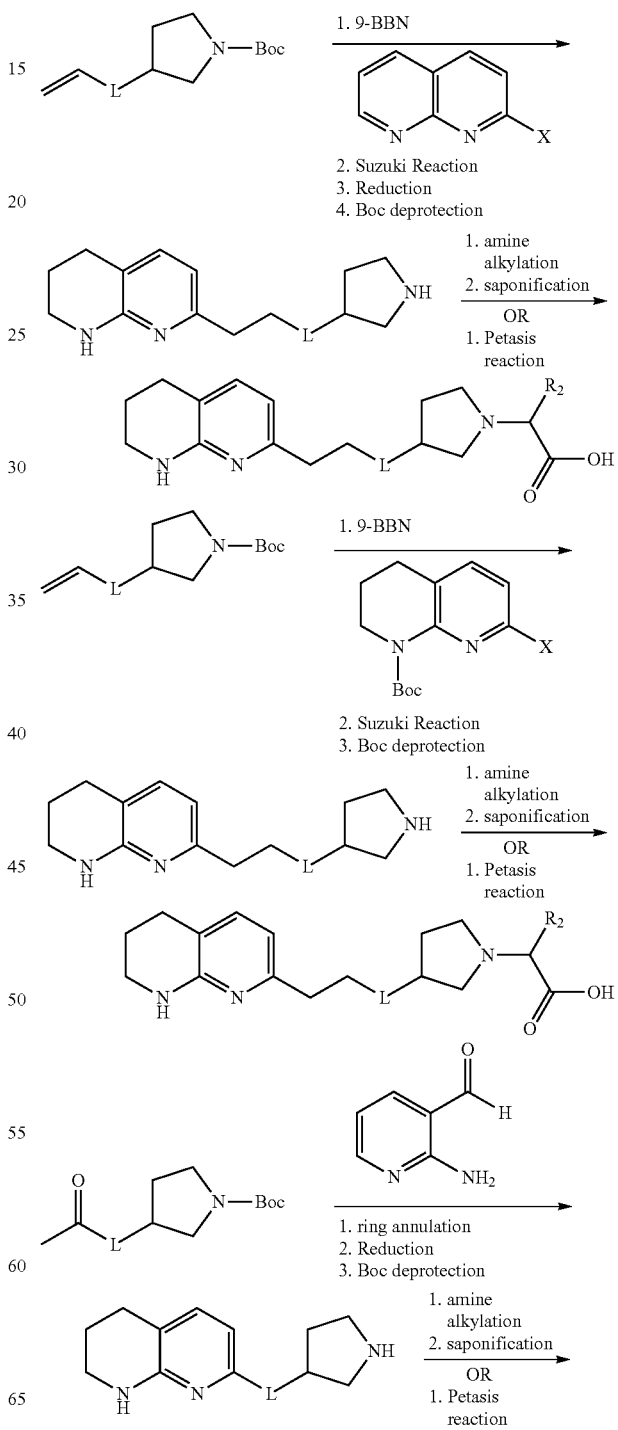

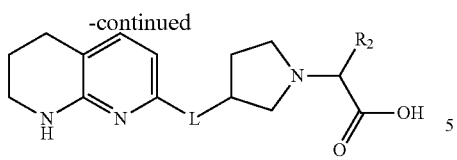

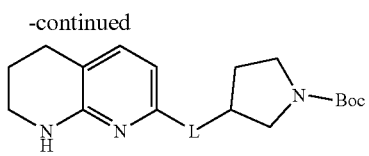

General Procedures
9-BBN and Suzuki Reactions

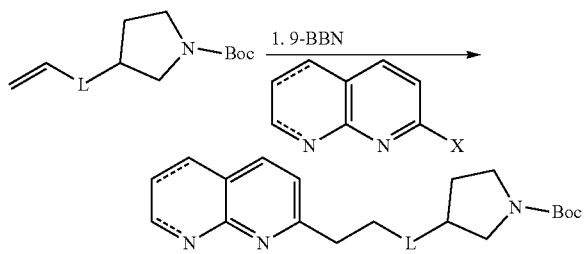

Alkene intermediates may be cross coupled to 2-halo naphthyridines or tetrahydronaphthyridines by the following procedure. To a solution of alkene (1 equiv.) in dry THF (2-10 mL/mmol) under Ar was added 9-BBN (0.5M solution in THF, 1-2 equiv.). The reaction was stirred at 40-80° C. for 1-4 hours, then cooled to room temperature. This solution was added to a mixture of 2-halonaphthyridine or Boc-protected 2-halotetrahydronaphthyridine (1-1.5 equiv.), cesium carbonate (2-5 equiv.) and Pd(PPh3)4 or another appropriate Pd/ligand combination (0.05 to 0.1 equiv.) in 1,4-Dioxane (2-10 mL/mmol). The reaction was stirred at 80-100° C. for 12-24 hours. Solvent was removed in vacuo, and the residue was purified by silica gel column to give the alkyl linked naphthyridine product.

Ring Annulations

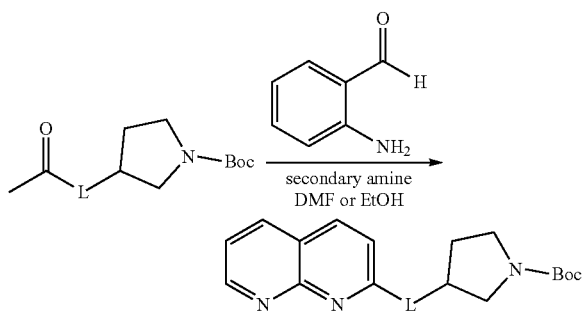

Naphthyridines may also be made from methyl ketones by the following procedure. A mixture of methyl ketone (1 equiv.), 2-aminonicotinaldehyde (1-2 equiv.) and secondary amine such as pyrrolidine or L-proline (1-2 equiv.) in DMF or EtOH (1-10 mL/mmol) was stirred at 70-100° C. for 2-10 hours. Solvent was removed in vacuo, and the residue was purified by silica gel column to give the desired naphthyridine product.

Naphthyridine Reduction

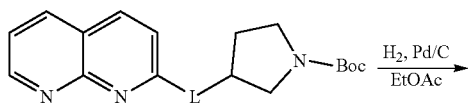

Naphthyridines may be reduced to tetrahydronaphthyridines by the following procedure. A mixture of an appropriate naphthyridine (1 equiv.) and Pd/C (5-20 weight percent Pd, 0.05 to 0.2 equiv.) in ethyl acetate or another appropriate solvent (2-10 mL/mmol) was stirred under $H_2$ balloon at room temperature to 50° C. for 2-20 hours. The reaction was filtered and concentrated in vacuo to give the desired tetrahydronaphthyridine product.

Boc Deprotection

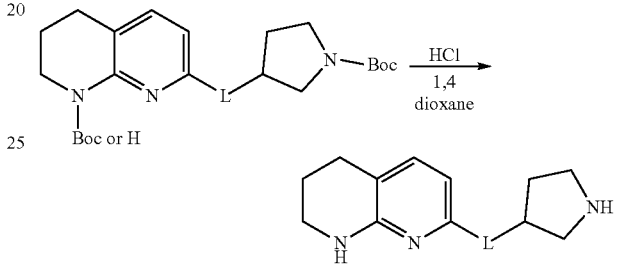

Boc-protected amine (1 equiv.) was treated with HCl (4-100 equiv.) in 1,4-dioxane (1-50 mL/mmol amine) at room temperature to 50° C. for 1-4 hours. The reaction was concentrated in vacuo, and the amine product was used crude or after purification by silica gel column. The amine could be used crude as a dihydrochloride salt or converted to the free base by dissolving in an appropriate solvent and washing with aqueous $NaHCO_3$.

Amine Alkylation:

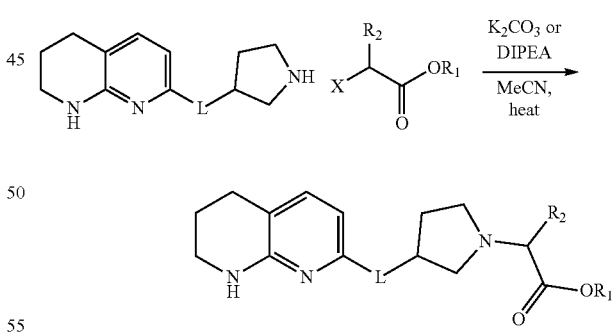

A mixture of amine (1 equiv.), alkylating agent (1-1.5 equiv.) and $K_2CO_3$ or N,N-diisopropylethylamine (2-10 equiv.) in MeCN or DMF (3-10 mL/mmole amine) was stirred at room temperature to 80° C. for 4-16 hours. The reaction was concentrated in vacuo, and the residue was purified by silica gel column to give the desired amino acetic acid ester. The amine used may be the free base or a salt such hydrochloride or dihydrochloride. If the reaction is done with a salt of the amine, additional equivalents of base may be needed.

Saponification:

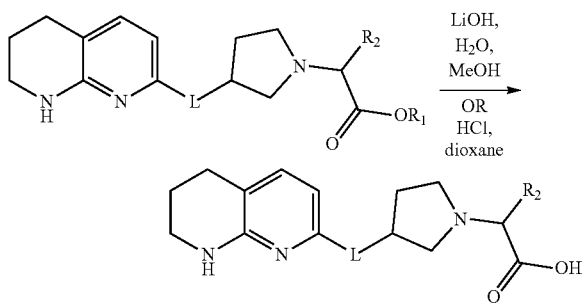

For certain esters such as R₁=Me or ethyl, the ester may be saponified under basic conditions. The ester (1 equiv.) was treated with LiOH—H₂O (3-5 equiv.) in MeOH (3-10 mL/mmol ester) and water (3-10 mL/mmol ester) at room temperature to 50° C. for 1-16 hours. The reaction was concentrated in vacuo, and the residue was purified by prep HPLC to give the desired carboxylic acid product.

For certain esters such as R₁=tert-butyl, the ester may be saponified under acidic conditions. The ester (1 equiv.) was treated with 4 N HCl (4-100 equiv.) in 1,4-dioxane (1-25 mL/mmol ester) at room temperature to 50° C. for 1-16 hours. The reaction was concentrated in vacuo, and the residue was purified by prep HPLC to give the desired carboxylic acid product.

Petasis Reaction:

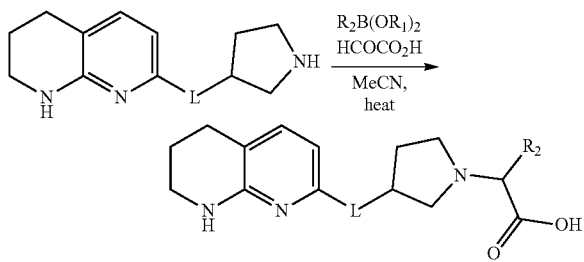

As an alternative to the amine alkylation/saponification sequence, a Petasis reaction can be used to prepare certain aryl analogs: A mixture of amine (1 equiv.) aryl boronic acid or aryl boronate ester (1-1.5 equiv.) and 2-oxoacetic acid (1.5-2 equiv.) in MeCN or DMF (2-10 mL/mmole amine) was stirred at 50-80° C. for 2-16 hours. The reaction was concentrated in vacuo, and the residue was purified by prep HPLC to give the desired amino acetic acid.

Analytical Methods

Prep-HPLC Methods

Crude samples were dissolved in MeOH and purified by prep HPLC using a Gilson 215 instrument, detection wavelength 214 nm:

Prep HPLC A: column: XBridge C18, 21.2*250 mm, 10 μm; mobile phase: A water (10 mM ammonium hydrogen carbonate), B CH₃CN; gradient elution as in text; flow rate: 20 mL/min.

Prep HPLC B: column: XBridge C18, 21.2*250 mm, 10 μm; mobile phase: A water (10 mM formic acid), B CH₃CN; gradient elution as in text; flow rate: 20 mL/min.

Prep HPLC C: column: XBridge OBD C18, 19*100 mm, 5 μm; mobile phase: A water, B CH₃CN; gradient elution as in text; flow rate: 20 mL/min.

Prep Chiral SFC Methods

Racemic products were separated to individual enantiomers by chiral Prep SFC using an SFC-80 (Thar, Waters) instrument, detection wavelength 214 nm:

Prep chiral SFC A: column: (R,R)-Whelk-O1, 20*250 mm, 5 μm (Decial), column temperature: 35° C., mobile phase: CO₂/methanol (0.2% methanol ammonia)=60/40, flow rate: 80 g/min, back pressure: 100 bar.

Prep chiral SFC B: column: AD 20*250 mm, 10 μm (Daicel), column temperature: 35° C., mobile phase: CO₂/methanol (0.2% methanol ammonia)=60/40, flow rate: 80 g/min, back pressure: 100 bar.

Prep chiral SFC C: column: AS 20*250 mm, 10 μm (Daicel), column temperature: 35° C., mobile phase: CO₂/methanol (0.2% methanol ammonia)=60/40, flow rate: 80 g/min, back pressure: 100 bar.

Prep chiral SFC D: column: OD 20*250 mm, 10 μm (Daicel), column temperature: 35° C., mobile phase: CO₂/methanol (0.2% methanol ammonia)=60/40, flow rate: 80 g/min, back pressure: 100 bar.

Prep chiral SFC E: column: Cellulose-SC 20*250 mm, 10 m (Daicel), column temperature: 35° C., mobile phase: CO₂/methanol (0.2% methanol ammonia)=60/40, flow rate: 80 g/min, back pressure: 100 bar.

Prep chiral SFC F: column: OZ 20*250 mm, 10 μm (Daicel), column temperature: 35° C., mobile phase: CO₂/methanol (0.2% methanol ammonia)=60/40, flow rate: 80 g/min, back pressure: 100 bar.

Prep chiral SFC G: column: IC 20*250 mm, 10 m (Daicel), column temperature: 35° C., mobile phase: CO₂/methanol (0.2% methanol ammonia)=60/40, flow rate: 80 g/min, back pressure: 100 bar.

Prep chiral SFC H: column: (S,S)-Whelk-O1, 20*250 mm, 5 μm (Decial), column temperature: 35° C., mobile phase: CO₂/methanol (0.2% methanol ammonia)=60/40, flow rate: 80 g/min, back pressure: 100 bar.

Analytical Chiral SFC Methods

Chiral products were analyzed by chiral SFC using an SFC-80 (Thar, Waters) instrument, detection wavelength 214 nm:

Chiral SFC A: column: (R,R)-Whelk-O1, 4.6*100 mm, 5 m (Decial), column temperature: 40° C., mobile phase: CO₂/methanol (0.2% methanol ammonia), isocratic elution as in text, flow rate: 4 g/min, back pressure: 120 bar.

Chiral SFC B: column: AD 4.6*100 mm, 5 μm (Daicel), column temperature: 40° C., mobile phase: CO₂/methanol (0.2% methanol ammonia), isocratic elution as in text, flow rate: 4 g/min, back pressure: 120 bar.

Chiral SFC C: column: AS 4.6*100 mm, 5 μm (Daicel), column temperature: 40° C., mobile phase: CO₂/methanol (0.2% methanol ammonia), isocratic elution as in text, flow rate: 4 g/min, back pressure: 120 bar.

Chiral SFC D: column: OD 4.6*100 mm, 5 μm (Daicel), column temperature: 40° C., mobile phase: CO₂/methanol (0.2% methanol ammonia), isocratic elution as in text, flow rate: 4 g/min, back pressure: 120 bar.

Chiral SFC E: column: Cellulose-SC 4.6*100 mm, 5 m (Daicel), column temperature: 40° C., mobile phase: CO2/methanol (0.2% methanol ammonia), isocratic elution as in text, flow rate: 4 g/min, back pressure: 120 bar.

Chiral SFC F: column: OZ 4.6*100 mm, 5 m (Daicel), column temperature: 40° C., mobile phase: CO₂/methanol (0.2% methanol ammonia), isocratic elution as in text, flow rate: 4 g/min, back pressure: 120 bar.

Chiral SFC G: column: IC 4.6*100 mm, 5 μm (Daicel), column temperature: 40° C., mobile phase: CO₂/methanol (0.2% methanol ammonia), isocratic elution as in text, flow rate: 4 g/min, back pressure: 120 bar.

Chiral SFC H: column: (S,S)-Whelk-O1, 4.6*100 mm, 5 m (Decial), column temperature: 40° C., mobile phase: CO$_2$/methanol (0.2% methanol ammonia), isocratic elution as in text, flow rate: 4 g/min, back pressure: 120 bar.

Chiral SFC I: column: IC 4.6*250 mm, 5 μm (SHIMADZU), column temperature: 40° C., mobile phase: n-Hexane (0.1% DEA):EtOH (0.1% DEA), isocratic elution as in text, flow rate: 1 mL/min.

Chiral SFC J: column: (S,S)-Whelk-O1 4.6*250 mm, 5 μm (SHIMADZU), column temperature: 40° C., mobile phase: n-Hexane(0.1% DEA):EtOH(0.1% DEA), isocratic elution as in text, flow rate: 1 mL/min.

Chiral SFC K: column: OZ—H 4.6*250 mm, 5 m (SHIMADZU), column temperature: 40° C., mobile phase: n-Hexane(0.1% DEA):EtOH(0.1% DEA), isocratic elution as in text, flow rate: 1 mL/min.

Chiral SFC L: column: chiral PAK IG 4.6*250 mm, 5 μm (SHIMADZU), column temperature: 35° C., mobile phase: n-Hexane(0.1% DEA):EtOH(0.1% DEA), isocratic elution as in text, flow rate: 1 mL/min.

Chiral SFC M: column: EnantioPak OJ 4.6*250 mm, 5 m (Decial), column temperature: 40° C., mobile phase: n-Hexane(0.1% DEA):EtOH(0.1% DEA), isocratic elution as in text, flow rate: 1 mL/min.

Synthesis of Intermediates

The following intermediates were prepared according to the procedures below for use in synthesizing compounds 1-37:

Preparation of (R)-7-(4-(pyrrolidin-3-yloxy)butyl)-1,2,3,4-tetrahydro-1,8-naphthyridine dihydrochloride Step 1: tert-butyl (R)-3-(4-(2-methyl-1,3-dioxolan-2-yl)butoxy)pyrrolidine-1-carboxylate

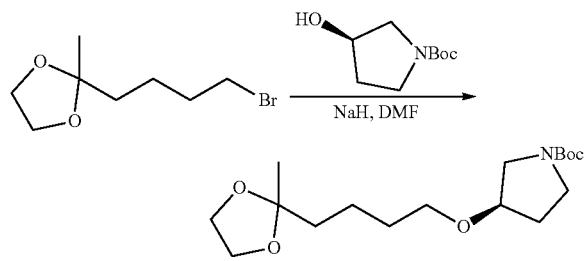

A mixture of (R)-tert-butyl 3-hydroxypyrrolidine-1-carboxylate (1.09 g, 5.41 mmol), 2-(4-bromobutyl)-2-methyl-1,3-dioxolane (1.2 g, 5.41 mmol) and sodium hydride (260 mg, 10.82 mmol) in DMF (5 mL) was stirred at 100° C. for 6 h. Solvent was removed in vacuo, and the residue was purified by silica gel column (pet ether:EtOAc 10:1) to give the desired product (R)-tert-butyl 3-(4-(2-methyl-1,3-dioxolan-2-yl)butoxy)pyrrolidine-1-carboxylate as a colorless oil (380 mg). Yield 21% (ESI 330.2 (M+H)$^+$).

Step 2: (R)-tert-butyl3-(5-oxohexyloxy)pyrrolidine-1-carboxylate

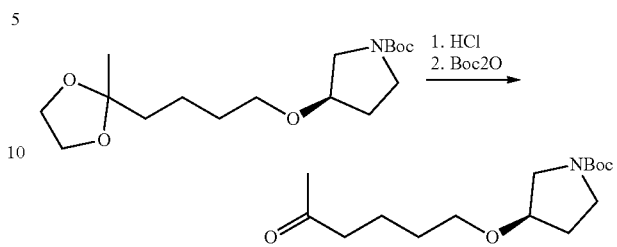

(R)-tert-butyl3-(4-(2-methyl-1,3-dioxolan-2-yl)butoxy)pyrrolidine-1-carboxylate (1.3 g, 3.95 mmol) was treated with a solution of HCl/dioxane (4.0 M, 10 mL) at room temperature for 2 hours. The solvent was removed in vacuo, and the residue was diluted with acetone (10 mL) and H$_2$O (1 mL). Potassium carbonate was added to adjust the pH to 8~9, followed by Boc$_2$O (1.24 g 5.69 mmol). The reaction was stirred at room temperature for 3, then filtered and concentrated under vacuum. The residue was purified by silica gel column (pet ether:EtOAc 15:1) to give the desired product (R)-tert-butyl3-(5-oxohexyloxy)pyrrolidine-1-carboxylate as a colorless oil (820 mg). Yield 73% (ESI 186 (M−100)$^+$, 230 (M−56)$^+$).

Step 3: (R)-tert-butyl 3-(4-(1,8-naphthyridin-2-yl)butoxy)pyrrolidine-1-carboxylate

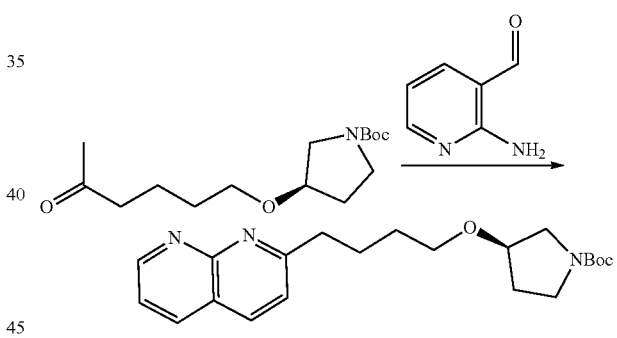

A mixture of (R)-tert-butyl3-(5-oxohexyloxy)pyrrolidine-1-carboxylate (820 mg, 2.88 mmol), 2-aminonicotinaldehyde (456 mg, 3.77 mmol) and pyrrolidine (265 mg, 3.77 mmol) in DMF (5 mL) was stirred at 85° C. for 4 h. Solvent was removed in vacuo, and the residue was purified by silica gel column (DCM:MeOH 15:1) to give the desired product (R)-tert-butyl 3-(4-(1,8-naphthyridin-2-yl)butoxy)pyrrolidine-1-carboxylate as a colorless oil (750 mg). Yield 70% (ESI 372.2 (M+H)$^+$).

Step 4: (R)-7-(4-(pyrrolidin-3-yloxy)butyl)-1,2,3,4-tetrahydro-1,8-naphthyridine dihydrochloride

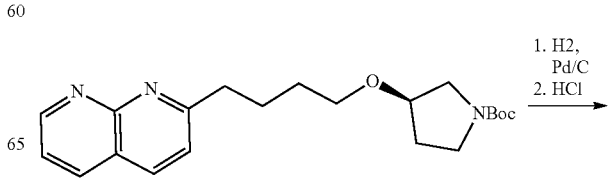

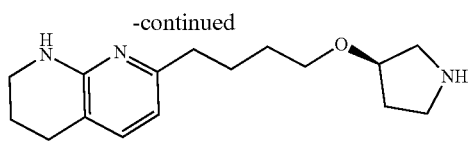

A mixture of (R)-tert-butyl 3-(4-(1,8-naphthyridin-2-yl)butoxy)pyrrolidine-1-carboxylate (750 mg, 2.02 mmol), Pd/C (10%, 500 mg) in EtOAc (10 mL) was stirred at 60° C. for 6 hours under hydrogen. The reaction was filtered and concentrated in vacuo. The residue was treated with a solution of HCl/dioxane (4.0 M, 4 mL) at room temperate for 2 hours, and the solvent was removed in vacuo to give the desired product (R)-7-(4-(pyrrolidin-3-yloxy)butyl)-1,2,3,4-tetrahydro-1,8-naphthyridine dihydrochloride as a white solid (600 mg). Yield 96% (ESI 276.2 (M+H)+).

Preparation of (R)-5-methoxy-7-(4-(pyrrolidin-3-yloxy)butyl)-1,2,3,4-tetrahydro-1,8-naphthyridine dihydrochloride Step 1: (R)-tert-butyl 3-(4-bromobutoxy)pyrrolidine-1-carboxylate

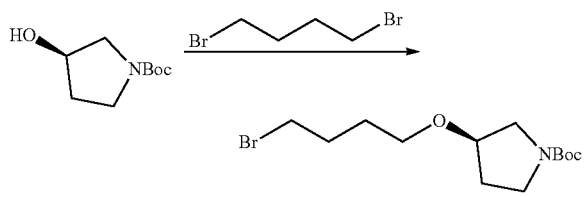

To a solution of tert-butyl (R)-3-hydroxypyrrolidine-1-carboxylat (e500 mg, 2.67 mmol) in n-Heptane (10 mL) was added sodium hydroxide 50% solution in water (5 mL, 31.2 mmol), tetrabutylammonium bromide (43.0 mg, 0.13 mmol) and 1,4-dibromobutane (1.595 mL, 13.35 mmol). The mixture was stirred at 80° C. for 2 hours, then cooled to room temperature, diluted with water (10 mL) and extracted with diethyl ether (3×10 mL). The combined organic layers were dried over Na2SO4, filtered and concentrated in vacuo. The residue was purified by silica gel column (pet ether:EtOAc=4:1) to give the desired product (R)-tert-butyl 3-(4-bromobutoxy)pyrrolidine-1-carboxylate as a colorless oil (686 mg). Yield 80% (ESI 314 (M+H-Boc)+).

Step 2: (R)-tert-butyl 3-(but-3-enyloxy)pyrrolidine-1-carboxylate

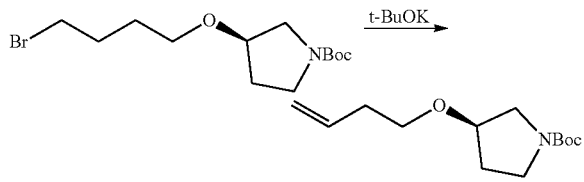

To a solution of tert-butyl (R)-3-(4-bromobutoxy)pyrrolidine-1-carboxylate (512 mg, 1.58 mmol) in THF (10 mL) at 0° C. was added t-BuOK (446 mg, 3.97 mmol). The reaction was stirred at room temperature for 1 hour, then diluted with water (20 mL) and extracted with diethyl ether (3×20 mL). The combined organic layers were dried over sodium sulfate, filtered and concentrated in vacuo to give the desired product (R)-tert-butyl 3-(but-3-enyloxy)pyrrolidine-1-carboxylate as a colorless oil (355 mg). Yield 90% (ESI 186 (M+H-Boc)+).

Step 3: (R)-tert-butyl 3-(4-(4-chloro-1,8-naphthyridin-2-yl)butoxy)pyrrolidine-1-carboxylate

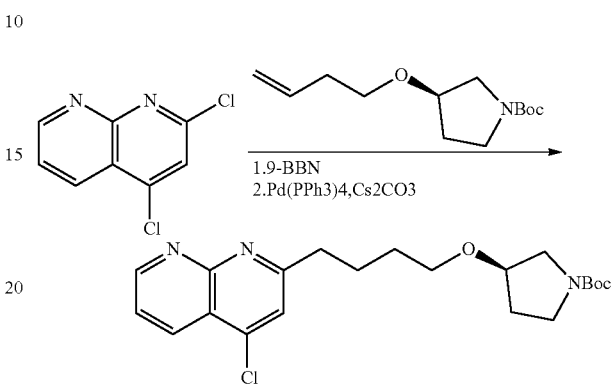

To a solution of tert-butyl (R)-tert-butyl 3-(but-3-enyloxy)pyrrolidine-1-carboxylate (486 mg, 1.8 mmol) in THF (dry, 2 mL) under Ar was added 9-BBN (0.5M solution in THF, 7.2 mL, 3.6 mmol). The reaction was stirred at 50° C. for 2 hours, then cooled to room temperature. This solution was added to a mixture of 2,4-dichloro-1,8-naphthyridine (360 mg, 1.8 mmol), cesium carbonate (1730 mg, 5.4 mmol) and Pd(PPh3)4 (208 mg, 0.18 mmol) in 1,4-dioxane (7 mL). The reaction was stirred at 90° C. for 1.5 hours. Solvent was removed in vacuo, and the residue was purified by silica gel column (pet ether:EtOAc 1:1 to 1:10) to give the desired product (R)-tert-butyl 3-(4-(4-chloro-1,8-naphthyridin-2-yl)butoxy)pyrrolidine-1-carboxylate as a yellow oil (300 mg). Yield 41% (ESI 406 (M+H)+).

Step 4: (R)-tert-butyl 3-(4-(4-methoxy-1,8-naphthyridin-2-yl)butoxy)pyrrolidine-1-carboxylate

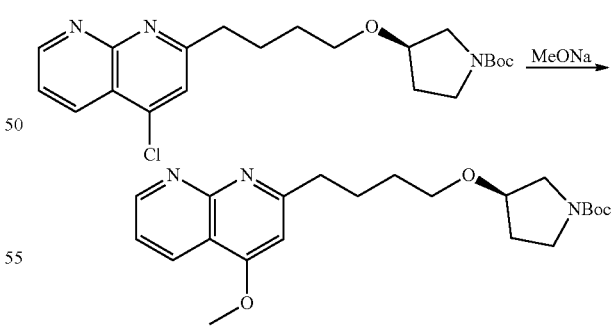

To a solution of (R)-tert-butyl 3-(4-(4-chloro-1,8-naphthyridin-2-yl)butoxy)pyrrolidine-1-carboxylate (76 mg, 0.13 mmol) in MeOH (5 mL) was added NaOMe (45 mg, 0.26 mmol). The reaction was stirred under reflux overnight, then concentrated in vacuo, diluted with ethyl acetate (30 mL), washed with water (2×20 mL), dried over MgSO4, filtered and concentrated in vacuo to give the desired product (R)-tert-butyl 3-(4-(4-methoxy-1,8-naphthyridin-2-yl)

Step 5: (R)-5-methoxy-7-(4-(pyrrolidin-3-yloxy)
butyl)-1,2,3,4-tetrahydro-1,8-naphthyridine dihydrochloride butoxy)pyrrolidine-1-carboxylate as a colorless oil (60 mg). Yield 80% (ESI 402 (M+H)+).

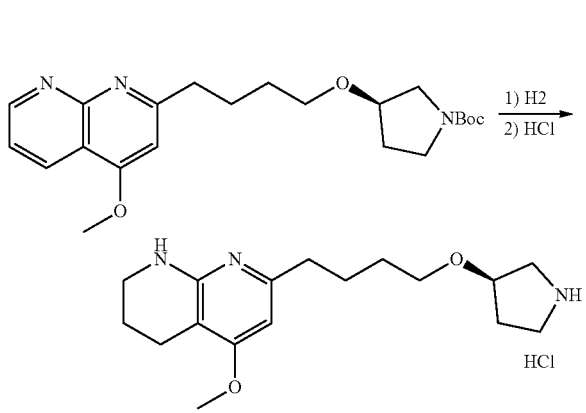

A mixture of (R)-tert-butyl 3-(4-(4-methoxy-1,8-naphthyridin-2-yl)butoxy)pyrrolidine-1-carboxylate (60 mg, 0.15 mmol) and Pd/C (10%, 30 mg) in EtOAc (10 mL) was stirred under balloon hydrogen at 30° C. for 17 hours. The mixture was filtered and concentrated in vacuo. The residue was treated with 4M HCl in dioxane (3 mL, 12 mmol) at room temperature for 2 hours. Solvent was removed in vacuo to give the desired product (R)-5-methoxy-7-(4-(pyrrolidin-3-yloxy)butyl)-1,2,3,4-tetrahydro-1,8-naphthyridine dihydrochloride as a colorless oil (45 mg). Yield 88% (ESI 306 (M+H)+).

Preparation of (R)-7-(5,5-difluoro-5-(pyrrolidin-3-yl)pentyl)-1,2,3,4-tetrahydro-1,8-naphthyridine dihydrochloride Step 1: (R)-tert-butyl 3-(methoxy(methyl)carbamoyl)pyrrolidine-1-carboxylate

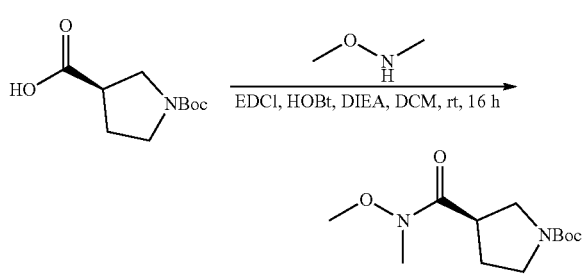

A mixture of (R)-1-(tert-butoxycarbonyl)pyrrolidine-3-carboxylic acid (10.0 g, 46.5 mmol), N,O-dimethylhydroxylamine hydrochloride (6.8 g, 69.8 mmol), EDCI (17.8 g, 93.0 mmol), HOBt (12.6 g, 93.0 mmol) and diisopropylethylamine (18.1 g, 139.5 mmol) in dichloromethane (120 mL) was stirred at room temperature overnight. Solvent was removed in vacuo, and the residue was purified by silica gel column (pet ether:EtOAc 2:1) to give the desired product (R)-tert-butyl 3-(methoxy(methyl)carbamoyl) pyrrolidine-1-carboxylate as a colorless oil (7.5 g). Yield 63%. (ESI 259.0 (M+H)+).

Step 2: (R)-tert-butyl 3-pent-4-enoylpyrrolidine-1-carboxylate

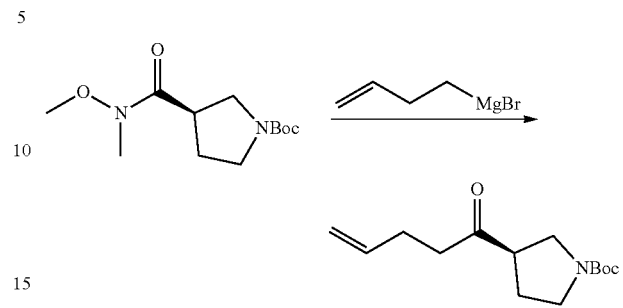

To a solution of (R)-tert-butyl 3-(methoxy(methyl)carbamoyl) pyrrolidine-1-carboxylate (7 g, 27.1 mmol) in THF (40 mL) at 0° C., was added 3-butenylmagnesium bromide solution 0.5 M in THE (108 mL, 54 mmol) dropwise. The reaction was stirred at 0° C. for 1 hour, then stirred at room temperature overnight, quenched with sat. NH4Cl (10 mL) and extracted with EtOAc (3×40 mL). The organic combined phases were washed with brine, dried over Na2SO4, filtered and concentrated in vacuo. The residue was purified by silica gel column (pet ether:EtOAc 5:1) to give the desired product (R)-tert-butyl 3-pent-4-enoylpyrrolidine-1-carboxylate as a yellow oil (4.4 g). Yield 64%. (ESI 254.0 (M+H)+).

Step 3: (R)-tert-butyl 3-(1,1-difluoropent-4-enyl) pyrrolidine-1-carboxylate

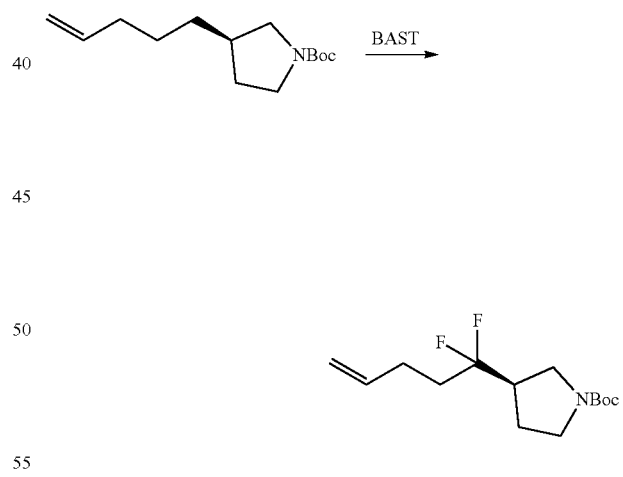

A mixture of (R)-tert-butyl 3-pent-4-enoylpyrrolidine-1-carboxylate (4.4 g, 17.4 mmol) and BAST (19.2 g, 87 mmol) was stirred at room temperature for 40 hours. The reaction was quenched with MeOH (2 mL), diluted with H2O (10 mL) and extracted with EtOAc (50 mL). The organic layer was washed with brine, dried over Na2SO4, filtered and concentrated in vacuo. The residue was purified by silica gel column (pet ether:EtOAc 10:1) to give the desired product (R)-tert-butyl 3-(1,1-difluoropent-4-enyl) pyrrolidine-1-carboxylate as a yellow oil (1.7 g). Yield 36% (ESI 276 (M+H)+).

Step 4: (R)-tert-butyl 3-(1,1-difluoropent-4-enyl) pyrrolidine-1-carboxylate

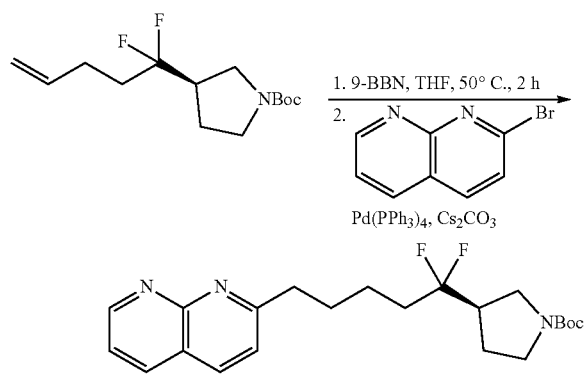

To a solution of (S)-tert-butyl 3-(1,1-difluoropent-4-enyl) pyrrolidine-1-carboxylate (1.4 g, 5.1 mmol) in THE (dry, 5 mL) under Ar, was added 9-BBN (0.5M solution in THF, 20.4 mL, 10.2 mmol). The reaction was stirred at 50° C. for 2 hours, then cooled to room temperature. This solution was added to a mixture of 2-bromo-1,8-naphthyridine (1.07 g, 5.1 mmol), cesium carbonate (4.98 g, 15.3 mmol) and Pd(PPh3)4 (295 mg, 0.255 mmol) in 1,4-dioxane (10 mL). The reaction was stirred at 90° C. for 1.5 hours, then concentrated in vacuo, and the residue was purified by silica gel column (DCM:MeOH 30:1) to give the desired product (R)-tert-butyl 3-(1,1-difluoro-5-(1,8-naphthyridin-2-yl)pentyl)pyrrolidine-1-carboxylate as a yellow oil (1 g). Yield 48% (ESI 406 (M+H)+).

Step 5: (R)-tert-butyl 3-(1,1-difluoro-5-(5,6,7,8-tetrahydro-1,8-naphthyridin-2-yl)pentyl)pyrrolidine-1-carboxylate

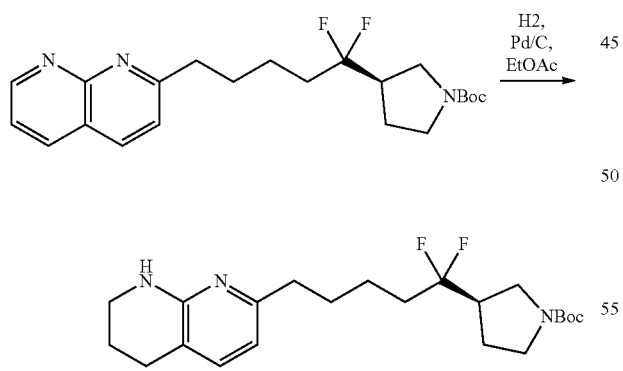

A mixture of (R)-tert-butyl 3-(1,1-difluoro-5-(1,8-naphthyridin-2-yl)pentyl)pyrrolidine-1-carboxylate (1 g, 2.47 mmol), Pd/C (200 mg, 20 Wt %) in ethyl acetate (20 mL) was stirred under H2 balloon at 40° C. for 16 hours. The reaction was filtered and concentrated in vacuo to give the desired product (R)-tert-butyl 3-(1,1-difluoro-5-(5,6,7,8-tetrahydro-1,8-naphthyridin-2-yl)pentyl)pyrrolidine-1-carboxylate as a yellow oil (1 g). Yield 98% (ESI 410 (M+H)+).

Step 6: (R)-7-(5,5-difluoro-5-(pyrrolidin-3-yl)pentyl)-1,2,3,4-tetrahydro-1,8-naphthyridine

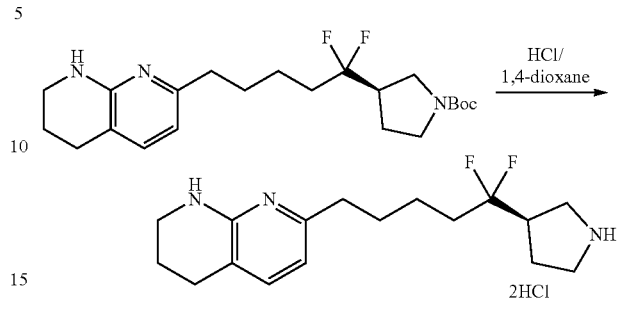

(R)-tert-butyl 3-(1,1-difluoro-5-(5,6,7,8-tetrahydro-1,8-naphthyridin-2-yl)pentyl)pyrrolidine-1-carboxylate (1 g, 2.44 mmol) was treated with HCl in 1,4-dioxane (4M, 10 mL) at room temperature for 2 hours. Solvent was removed in vacuo to give the desired product (R)-7-(5,5-difluoro-5-(pyrrolidin-3-yl)pentyl)-1,2,3,4-tetrahydro-1,8-naphthyridine as a HCl salt (930 mg). Yield 99% (ESI 310 (M+H)+).

Preparation of (R)-7-(5,5-difluoro-5-(pyrrolidin-3-yl)pentyl)-5-methoxy-1,2,3,4-tetrahydro-1,8-naphthyridine dihydrochloride

Step 1: (R)-tert-butyl 3-(1,1-difluoropent-4-enyl) pyrrolidine-1-carboxylate

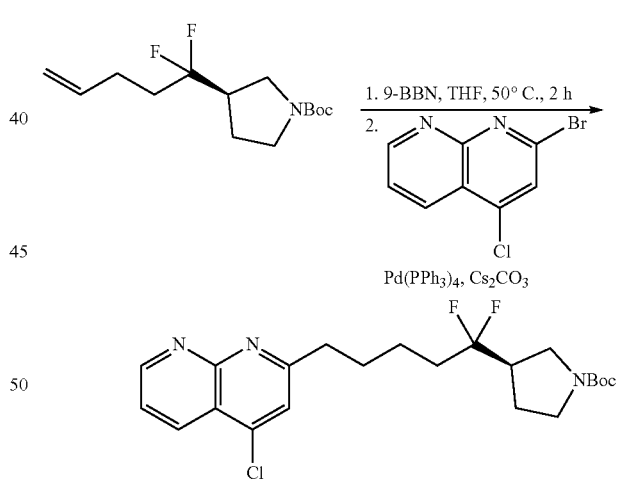

To a solution of (S)-tert-butyl 3-(1,1-difluoropent-4-enyl) pyrrolidine-1-carboxylate (1.4 g, 5.1 mmol) in THF (dry, 5 mL) under Ar, was added 9-BBN (0.5M solution in THF, 20.4 mL, 10.2 mmol). The reaction was stirred at 50° C. for 2 hours, then cooled to room temperature and added to a mixture of 2,4-dichloro-1,8-naphthyridine (1.01 g, 5.1 mmol), cesium carbonate (4.98 g, 15.3 mmol) and Pd(PPh3)4 (295 mg, 0.255 mmol) in 1,4-Dioxane (10 mL). The reaction was stirred at 90° C. for 2 hours. Solvent was removed in vacuo, and the residue was purified by silica gel column (DCM:MeOH 30:1) to give the desired product as a yellow oil (0.95 g). Yield 42% (ESI 440 (M+H)+).

Step 2: (R)-tert-butyl 3-(1,1-difluoro-5-(4-methoxy-1,8-naphthyridin-2-yl)pentyl)pyrrolidine-1-carboxylate

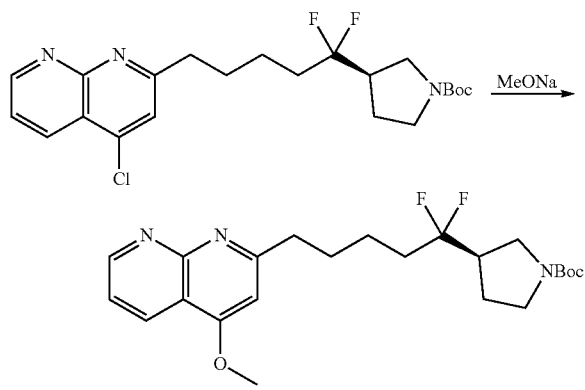

To a solution of (R)-tert-butyl 3-(5-(4-chloro-1,8-naphthyridin-2-yl)-1,1-difluoropentyl)pyrrolidine-1-carboxylate (0.95 g, 2.16 mmol) in MeOH (30 mL) was added sodium methoxide (233 mg, 4.32 mmol). The reaction was refluxed for 15 hours, then concentrated in vacuo. The residue was dissolved in ethyl acetate (20 mL), washed with water (2×20 mL), dried over MgSO4, filtered and concentrated in vacuo to give the desired product as a colorless oil (750 mg). Yield 80% (ESI 436 (M+H)+).

Step 3: (R)-7-(5,5-difluoro-5-(pyrrolidin-3-yl)pentyl)-5-methoxy-1,2,3,4-tetrahydro-1,8-naphthyridine dihydrochloride

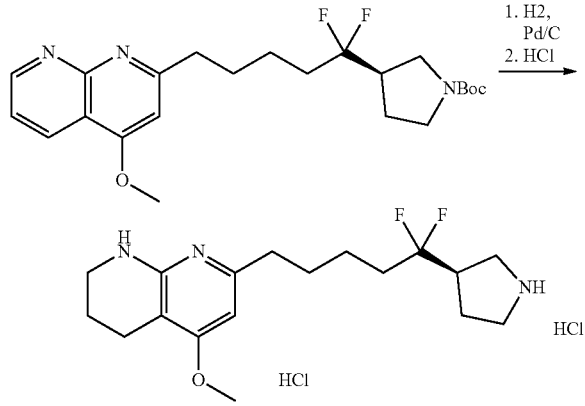

A mixture of (R)-tert-butyl 3-(1,1-difluoro-5-(4-methoxy-1,8-naphthyridin-2-yl)pentyl)pyrrolidine-1-carboxylate (750 mg, 1.72 mmol) and Pd/C (10%, 75 mg) in EtOAc (50 mL) was stirred under balloon hydrogen at room temperature for 16 hours. The mixture was filtered and concentrated in vacuo. The residue was treated with HCl in 1,4-dioxane (4M, 10 mL) at 25° C. for 2 hours. Solvent was removed in vacuo to give (R)-7-(5,5-difluoro-5-(pyrrolidin-3-yl)pentyl)-5-methoxy-1,2,3,4-tetrahydro-1,8-naphthyridine dihydrochloride as a colorless oil (620 mg). Yield 88% (ESI 340 (M+H)+).

Preparation of 7-(5-fluoro-5-((R)-pyrrolidin-3-yl)pentyl)-1,2,3,4-tetrahydro-1,8-naphthyridine dihydrochloride Step 1: (3R)-tert-butyl 3-(1-hydroxypent-4-enyl)pyrrolidine-1-carboxylate

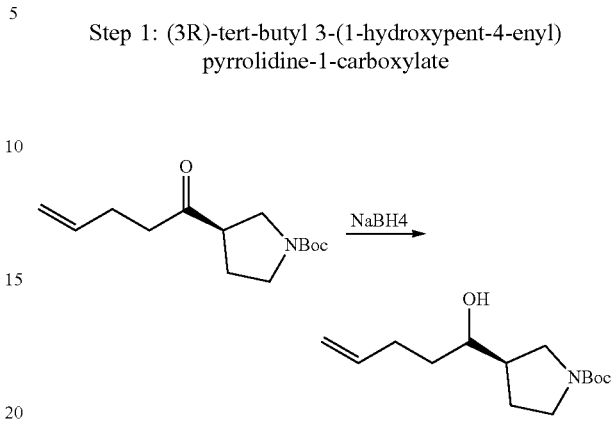

To a solution of (R)-tert-butyl 3-pent-4-enoylpyrrolidine-1-carboxylate (253 mg, 1 mmol) in MeOH (10 mL) at 0° C., was added NaBH4 (46 mg, 1.2 mmol). The reaction was stirred at 0° C. for 1 hour. Solvent was removed in vacuo, and the residue was purified by silica gel column (pet ether:EtOAc 2:1) to give the desired product (3R)-tert-butyl 3-(1-hydroxypent-4-enyl)pyrrolidine-1-carboxylate as a colorless oil (210 mg). Yield 82% (ESI 256 (M+H)+).

Step 2: (3R)-tert-butyl 3-(1-fluoropent-4-enyl)pyrrolidine-1-carboxylate

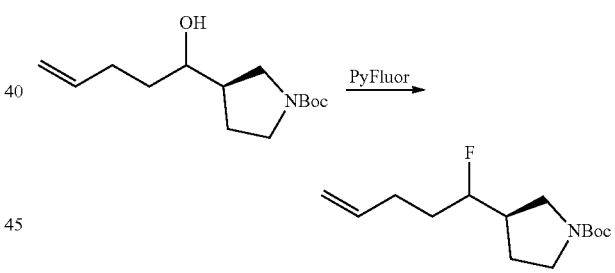

A mixture of (3R)-tert-butyl 3-(1-hydroxypent-4-enyl)pyrrolidine-1-carboxylate (210 mg, 0.82 mmol), PyFluor (199 mg, 1.23 mmol) and DBU (187 mg, 1.23 mmol) in toluene (2 mL) in a sealed tube was stirred at 50° C. overnight. The reaction mixture was partitioned between 0.5 M aq. HCl (10 mL) and EtOAc (10 mL). The layers were separated and the aqueous layer was extracted with EtOAc (2×10 mL). The combined organic layer was concentrated in vacuo, and the residue was purified by silica gel column (pet ether:EtOAc=2:1) to give the desired product (3R)-tert-butyl 3-(1-fluoropent-4-enyl)pyrrolidine-1-carboxylate as a colorless oil (85 mg). Yield 40% (ESI 258 (M+H)+). The racemic product was separated by Prep chiral SFC (IG column) to give (3R)-tert-butyl 3-(1-fluoropent-4-enyl)pyrrolidine-1-carboxylate stereoisomer A (Rt=1.88 min, 30 mg) and (3R)-tert-butyl 3-(1-fluoropent-4-enyl)pyrrolidine-1-carboxylate stereoisomer B (Rt=2.96 min, 25 mg) as colorless oil.

Step 3: tert-butyl 7-(5-((R)-1-(tert-butoxycarbonyl)pyrrolidin-3-yl)-5-fluoropentyl)-3,4-dihydro-1,8-naphthyridine-1(2H)-carboxylate Stereoisomer A

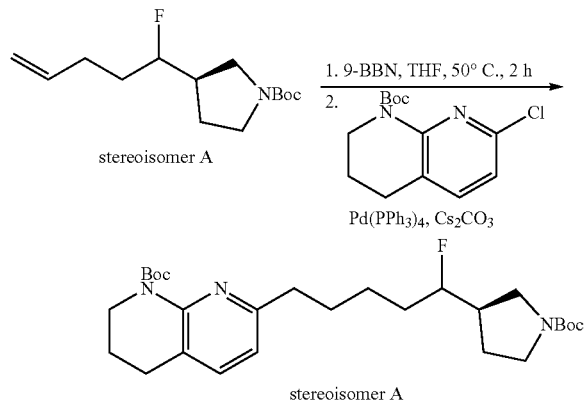

To a solution of (3R)-tert-butyl 3-(1-fluoropent-4-enyl)pyrrolidine-1-carboxylate stereoisomer A (1 g, 3.89 mmol) in THF (dry, 10 mL) under Ar, was added 9-BBN (0.5M solution in THF, 15.6 mL, 7.78 mmol). The reaction was stirred at 50° C. for 2 hours, then cooled to room temperature. This solution was added to a mixture of tert-butyl 7-chloro-3,4-dihydro-1,8-naphthyridine-1(2H)-carboxylate (1.05 g, 3.89 mmol), cesium carbonate (3.81 g, 11.7 mmol) and Pd(PPh3)4 (225 mg, 0.19 mmol) in 1,4-Dioxane (15 mL). The reaction was stirred at 90° C. for 17 hours. Solvent was removed in vacuo, and the residue was purified by silica gel column (pet ether:EtOAc=1:1 to 1:10) to give the desired product tert-butyl 7-(5-((R)-1-(tert-butoxycarbonyl)pyrrolidin-3-yl)-5-fluoropentyl)-3,4-dihydro-1,8-naphthyridine-1(2H)-carboxylate stereoisomer A as a yellow oil (1.1 g). Yield 57% (ESI 492 (M+H)+).

Step 4: 7-(5-fluoro-5-((R)-pyrrolidin-3-yl)pentyl)-1,2,3,4-tetrahydro-1,8-naphthyridine stereoisomer A dihydrochloride

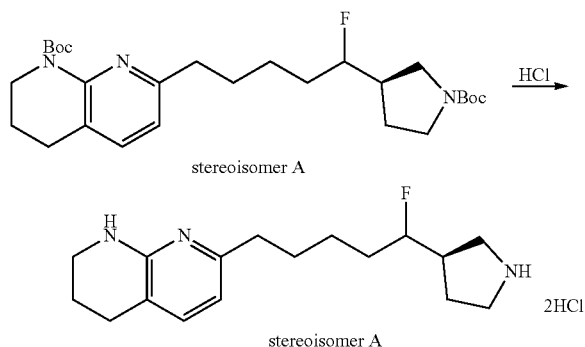

tert-butyl 7-(5-((R)-1-(tert-butoxycarbonyl)pyrrolidin-3-yl)-5-fluoropentyl)-3,4-dihydro-1,8-naphthyridine-1(2H)-carboxylate stereoisomer A (1.1 g, 2.24 mmol) was treated with HCl in 1,4-dioxane (4M, 20 mL) at 25° C. for 2 hours. Solvent was removed in vacuo to give the desired product 7-(5-fluoro-5-((R)-pyrrolidin-3-yl)pentyl)-1,2,3,4-tetrahydro-1,8-naphthyridine stereoisomer A dihydrochloride as a colorless oil (783 mg). Yield 96% (ESI 292 (M+H)+).

7-(5-fluoro-5-((R)-pyrrolidin-3-yl)pentyl)-1,2,3,4-tetrahydro-1,8-naphthyridine dihydrochloride stereoisomer B was prepared by the same method starting from (3R)-tert-butyl 3-(1-fluoropent-4-enyl)pyrrolidine-1-carboxylate stereoisomer B.

7-(5-fluoro-5-((R)-pyrrolidin-3-yl)pentyl)-1,2,3,4-tetrahydro-1,8-naphthyridine dihydrochloride was also prepared as a mixture of stereoisomer A and stereoisomer B by the same method starting from (3R)-tert-butyl 3-(1-fluoropent-4-enyl)pyrrolidine-1-carboxylate mixture of stereoisomer A and stereoisomer B.

Preparation of 7-(5-fluoro-5-((R)-pyrrolidin-3-yl)pentyl)-5-methoxy-1,2,3,4-tetrahydro-1,8-naphthyridine dihydrochloride Step 1: tert-butyl (3R)-3-(5-(4-chloro-1,8-naphthyridin-2-yl)-1-fluoropentyl)pyrrolidine-1-carboxylate Stereoisomer A

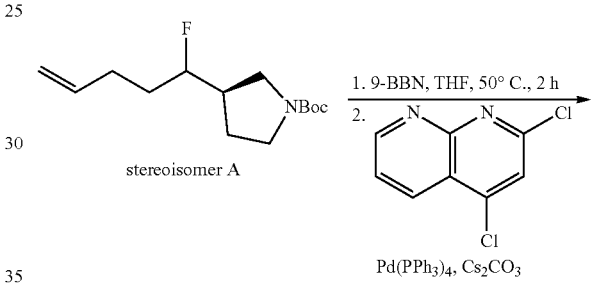

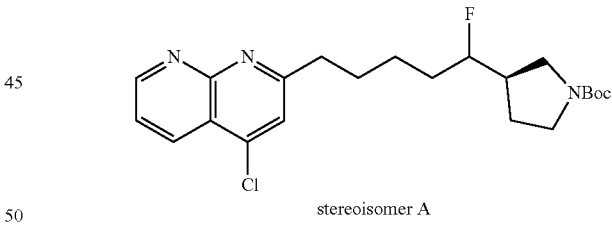

To a solution of (3R)-tert-butyl 3-(1-fluoropent-4-enyl)pyrrolidine-1-carboxylate stereoisomer A (1.3 g, 5.0 mmol) in THF (dry, 5 mL) under Ar, was added 9-BBN (0.5M solution in THF, 20 mL, 10.0 mmol). The reaction was stirred at 50° C. for 2 hours, then cooled to room temperature. This solution was added to a mixture of 2,4-dichloro-1,8-naphthyridine (1.01 g, 5.1 mmol), cesium carbonate (4.98 g, 15.3 mmol) and Pd(PPh3)4 (295 mg, 0.255 mmol) in 1,4-dioxane (10 mL). The reaction was stirred at 90° C. for 2 hours. Solvent was removed in vacuo, and the residue was purified by silica gel column (DCM:MeOH 30:1) to give the desired product tert-butyl (3R)-3-(5-(4-chloro-1,8-naphthyridin-2-yl)-1-fluoropentyl)pyrrolidine-1-carboxylate stereoisomer A as a yellow oil (0.95 g). Yield 45% (ESI 422 (M+H)+).

Step 2: tert-butyl (3R)-3-(1-fluoro-5-(4-methoxy-1,8-naphthyridin-2-yl)pentyl)pyrrolidine-1-carboxylate stereoisomer A

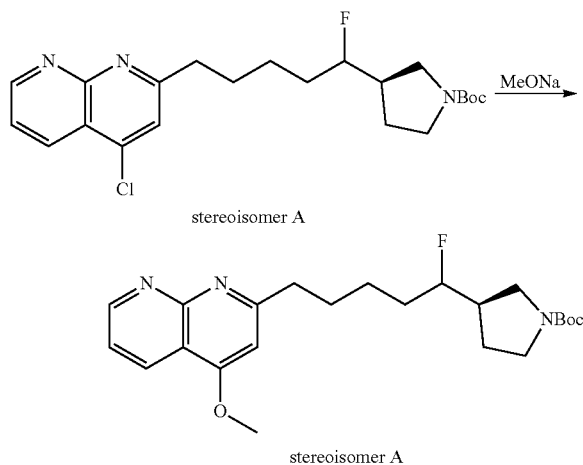

stereoisomer A stereoisomer A

To a solution of (3R)-3-(5-(4-chloro-1,8-naphthyridin-2-yl)-1-fluoropentyl)pyrrolidine-1-carboxylate stereoisomer A (0.95 g, 2.25 mmol) in MeOH (30 mL) was added NaOMe (243 mg, 4.50 mmol). The reaction was refluxed for 15 hours, then concentrated in vacuo. The residue was dissolved in ethyl acetate (20 mL), washed with water (2×20 mL), dried over MgSO4, filtered, and concentrated in vacuo to give the desired product tert-butyl (3R)-3-(1-fluoro-5-(4-methoxy-1,8-naphthyridin-2-yl)pentyl)pyrrolidine-1-carboxylate stereoisomer A as a colorless oil (780 mg). Yield 83% (ESI 418 (M+H)+).

Step 3: 7-(5-fluoro-5-((R)-pyrrolidin-3-yl)pentyl)-5-methoxy-1,2,3,4-tetrahydro-1,8-naphthyridine stereoisomer A dihydrochloride

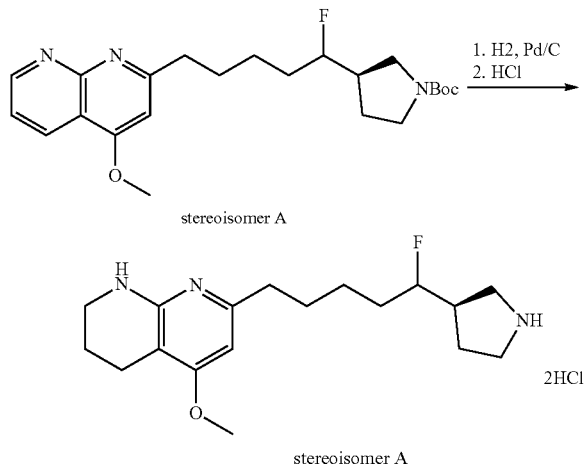

stereoisomer A stereoisomer A

A mixture of tert-butyl (3R)-3-(1-fluoro-5-(4-methoxy-1,8-naphthyridin-2-yl)pentyl)pyrrolidine-1-carboxylate stereoisomer A (780 mg, 1.87 mmol) and Pd/C (10%, 78 mg) in EtOAc (50 mL) was stirred under balloon hydrogen at room temperature for 16 hours. The mixture was filtered and concentrated in vacuo. The residue was treated with HCl in 1,4-dioxane (4M, 10 mL) at 25° C. for 2 hours. Solvent was removed in vacuo to give 7-(5-fluoro-5-((R)-pyrrolidin-3-yl)pentyl)-5-methoxy-1,2,3,4-tetrahydro-1,8-naphthyridine stereoisomer A dihydrochloride as a colorless oil (690 mg). Yield 94% (ESI 322 (M+H)+).

7-(5-fluoro-5-((R)-pyrrolidin-3-yl)pentyl)-5-methoxy-1,2,3,4-tetrahydro-1,8-naphthyridine stereoisomer B dihydrochloride was prepared by the same method starting from (3R)-tert-butyl 3-(1-fluoropent-4-enyl)pyrrolidine-1-carboxylate stereoisomer B.

7-(5-fluoro-5-((R)-pyrrolidin-3-yl)pentyl)-5-methoxy-1,2,3,4-tetrahydro-1,8-naphthyridine dihydrochloride was also prepared as a mixture of stereoisomer A and stereoisomer B by the same method starting from (3R)-tert-butyl 3-(1-fluoropent-4-enyl)pyrrolidine-1-carboxylate mixture of stereoisomer A and stereoisomer B.

Preparation of (S)-7-(4,4-difluoro-5-(pyrrolidin-3-yl)pentyl)-1,2,3,4-tetrahydro-1,8-naphthyridine dihydrochloride Step 1: tert-butyl (S)-3-(2-(methoxy(methyl)amino)-2-oxoethyl)pyrrolidine-1-carboxylate

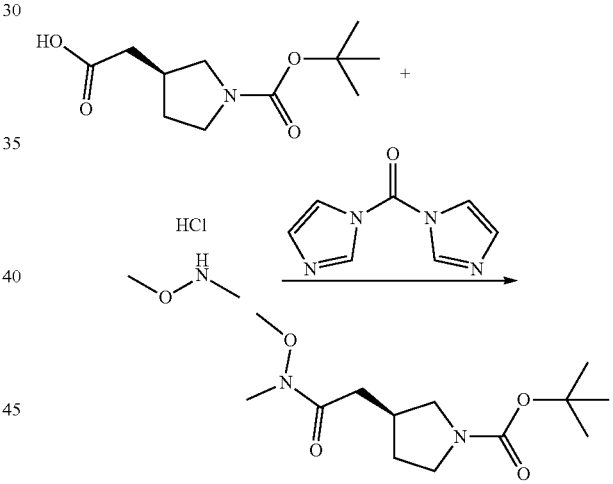

To a solution of (S)-2-(1-(tert-butoxycarbonyl)pyrrolidin-3-yl)acetic acid (3 g, 13.08 mmol) in dichloromethane (75 mL) was added CDI (2.122 g, 13.08 mmol), and the mixture was stirred for 1.5 hours at room temperature. Next, N,O-dimethylhydroxylamine hydrochloride (1.276 g, 13.08 mmol) was added, and after stirring for an additional 3 hours, the mixture was quenched with hydrochloric acid (1 M solution in water). The organic phase was separated, and the aqueous phase was extracted twice with dichloromethane. The combined organic layers were washed with saturated aqueous sodium hydrogencarbonate, dried over sodium sulfate and concentrated in vacuo. The residue was purified by flash column chromatography (80 g silica; heptane, 10%-80% ethyl acetate) to give the desired product tert-butyl (S)-3-(2-(methoxy(methyl)amino)-2-oxoethyl)pyrrolidine-1-carboxylate (2.95 g). Yield 83% (ESI 217 (M-tBu+H)+).

Step 2: tert-butyl (S)-3-(2-oxopent-4-en-1-yl)pyrrolidine-1-carboxylate

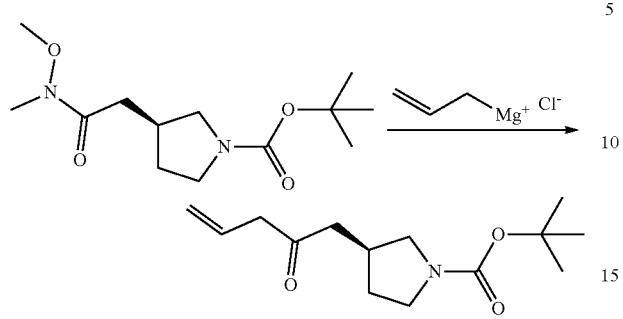

To an ice cooled solution of tert-butyl (S)-3-(2-(methoxy (methyl)amino)-2-oxoethyl)pyrrolidine-1-carboxylate (4.77 g, 17.51 mmol) in THF (90 mL) was added allylmagnesium chloride (12.36 mL, 21.02 mmol, 1.7 M solution in THF) dropwise over a period of 10 minutes. After 10 minutes cooling was stopped, and the mixture was stirred at room temperature for 90 minutes, then poured into saturated aqueous ammonium chloride, diluted with water and extracted three times with ethyl acetate. The combined organic layers were washed with brine, dried over sodium sulfate, and concentrated. The residue was purified by flash column chromatography (80 g silica; heptane, 10%-40% ethyl acetate) to give the desired product tert-butyl (S)-3-(2-oxopent-4-en-1-yl)pyrrolidine-1-carboxylate (4.05 g). Yield 91% (ESI 198 (M-tBu+H)$^+$).

Step 3: tert-butyl (S)-3-(2,2-difluoropent-4-en-1-yl)pyrrolidine-1-carboxylate

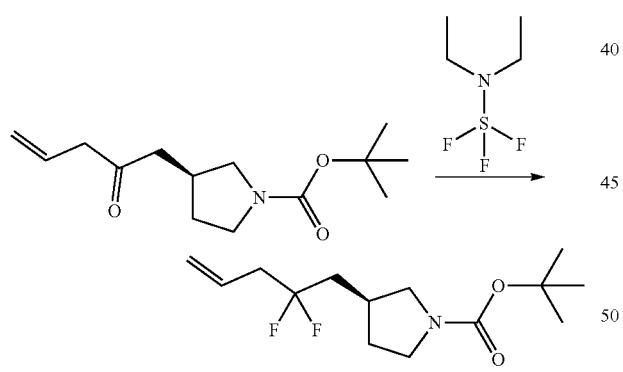

In a 24 mL vial, DAST (21.79 mL, 178 mmol) was added to tert-butyl (S)-3-(2-oxopent-4-en-1-yl)pyrrolidine-1-carboxylate (3.69 g, 14.57 mmol). The vial was sealed and stirred for 20 hours at room temperature. The mixture was diluted with dichloromethane (500 mL) and dropwise added to saturated aqueous sodium hydrogencarbonate. The layers were separated, and the water layer was extracted twice with dichloromethane. The combined organic layers were washed with brine, dried over sodium sulfate, concentrated and the residue was purified by flash column chromatography (220 g silica; heptane, 2%-20% ethyl acetate) to give the desired product tert-butyl (S)-3-(2,2-difluoropent-4-en-1-yl)pyrrolidine-1-carboxylate (1.01 g). Yield 25% (ESI 220 (M-tBu+H)$^+$).

Step 4: tert-butyl 7-chloro-3,4-dihydro-1,8-naphthyridine-1(2H)-carboxylate

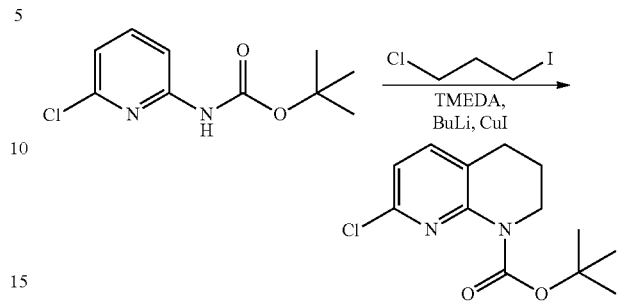

To a solution of TMEDA (4.36 mL, 28.9 mmol) in THF (30 mL) at −20° C. was added n-butyllithium (12.03 mL, 28.9 mmol, 2.4 M solution in hexanes) over ten minutes. The mixture was stirred at 10° C. for 30 minutes, then cooled to −78° C., and a solution of tert-butyl (6-chloropyridin-2-yl) carbamate (3 g, 13.12 mmol) in THF (15 mL) was added over a period of 5 minutes. After 40 minutes, copper(I) iodide (2.499 g, 13.12 mmol) was added, and the mixture was stirred at −10° C. for 1 hour. 1-Chloro-3-iodopropane (2.113 mL, 19.68 mmol) was added over a period of 1 minute, and the mixture was allowed to reach room temperature. After 2.5 hours the mixture was added to saturated aqueous sodium hydrogencarbonate and extracted three times with ethyl acetate. The combined organic layers were dried over sodium sulfate, filtered and concentrated. The residue was stirred in dichloromethane (30 mL), filtered through a glass-sintered funnel and concentrated to half volume and then applied onto a flash column (120 g silica), eluting with 2-20% ethyl acetate in heptane. The eluent coming off the column was passed through a column of potassium carbonate. This gave the desired product tert-butyl 7-chloro-3,4-dihydro-1,8-naphthyridine-1(2H)-carboxylate (2.637 g). Yield 74% $^1$H NMR (400 MHz, Chloroform-d) δ 7.32 (d, J=7.9 Hz, 1H), 6.94 (d, J=7.8 Hz, 1H), 3.81-3.69 (m, 2H), 2.73 (t, J=6.6 Hz, 2H), 1.93 (p, J=6.5 Hz, 2H), 1.54 (s, 9H).

Step 5: Tert-butyl (S)-7-(5-(1-(tert-butoxycarbonyl)pyrrolidin-3-yl)-4,4-difluoropentyl)-3,4-dihydro-1,8-naphthyridine-1(2H)-carboxylate

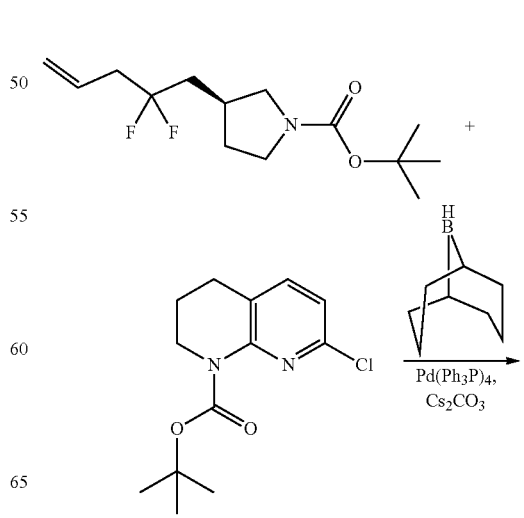

-continued

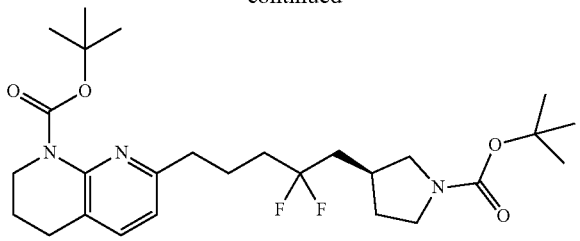

A solution of tert-butyl (S)-3-(2,2-difluoropent-4-en-1-yl)pyrrolidine-1-carboxylate (205 mg, 0.745 mmol) in THF (2 mL) was purged with argon for 10 minutes. Then, 9-BBN (1.638 mL, 0.819 mmol, 0.5 M solution in THF) was added. After 1 hour, additional 9-BBN, 0.5 M solution in THF (0.893 mL, 0.447 mmol) was added. After 30 minutes, this solution was added to a mixture of tert-butyl 7-chloro-3,4-dihydro-1,8-naphthyridine-1(2H)-carboxylate (200 mg, 0.745 mmol), cesium carbonate (364 mg, 1.117 mmol) and tetrakis(triphenylphosphine)palladium(0) (43.0 mg, 0.037 mmol) in 1,4-dioxane (3 mL), which had been purged with argon for 10 minutes. The resulting mixture was heated to 70° C. for 16 hours, then cooled to room temperature, diluted with water and extracted with ethyl acetate. The organic layer was washed brine, dried over sodium sulfate and concentrated. The residue was purified by flash column chromatography (12 g; heptane, 10%-33% ethyl acetate) to give the desired product tert-butyl (S)-7-(5-(1-(tert-butoxycarbonyl)pyrrolidin-3-yl)-4,4-difluoropentyl)-3,4-dihydro-1,8-naphthyridine-1(2H)-carboxylate (216 mg). Yield 51% (ESI 510 (M+H)$^+$).

Step 6: (S)-7-(4,4-difluoro-5-(pyrrolidin-3-yl)pentyl)-1,2,3,4-tetrahydro-1,8-naphthyridine dihydrochloride

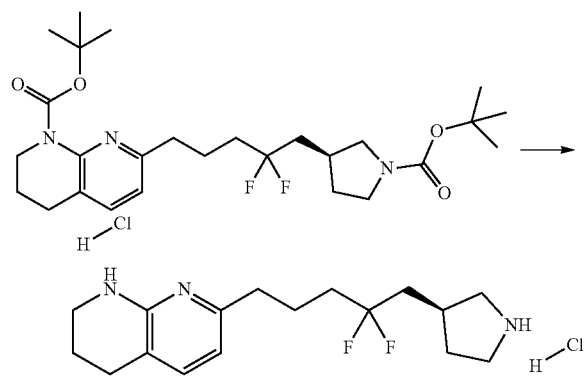

To a solution of tert-butyl (S)-7-(5-(1-(tert-butoxycarbonyl)pyrrolidin-3-yl)-4,4-difluoropentyl)-3,4-dihydro-1,8-naphthyridine-1(2H)-carboxylate (827 mg, 1.623 mmol) in methanol (16 mL) was added hydrochloric acid (16.23 mL, 64.9 mmol, 4N solution in dioxane). After 22 hours, additional hydrochloric acid (8.11 mL, 32.5 mmol, 4N solution in dioxane) was added. The mixture was stirred for 23 hours, then concentrated, and the residue was co-evaporated twice with acetonitrile to give the desired product (S)-7-(4,4-difluoro-5-(pyrrolidin-3-yl)pentyl)-1,2,3,4-tetrahydro-1,8-naphthyridine dihydrochloride (674 mg). Yield 100% (ESI 310 (M−2HCl+H)$^+$). $^1$H NMR (400 MHz, DMSO-d$_6$) δ 14.40 (s, 1H), 9.40 (d, J=26.3 Hz, 2H), 8.13 (s, 1H), 7.61 (d, J=7.3 Hz, 1H), 6.63 (d, J=7.3 Hz, 1H), 3.53-3.26 (m, 4H), 3.26-3.14 (m, 1H), 3.14-2.98 (m, 1H), 2.82-2.65 (m, 4H), 2.47-2.29 (m, 1H), 2.21-2.02 (m, 4H), 2.02-1.72 (m, 5H), 1.63-1.48 (m, 1H).

Preparation of 2-(4-(((R)-pyrrolidin-3-yl)oxy)butyl)-1,2,3,4-tetrahydro-1,8-naphthyridine dihydrochloride Step 1: Tert-butyl (R)-3-(hex-5-en-1-yloxy)pyrrolidine-1-carboxylate

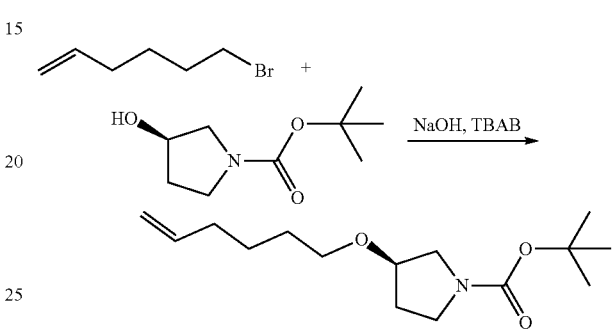

To a suspension of tert-butyl (R)-3-hydroxypyrrolidine-1-carboxylate (12.8 g, 68.4 mmol), tetrabutylammonium bromide (1.102 g, 3.42 mmol) and 6-bromo-1-hexene (13.71 mL, 103 mmol) in heptane (256 mL) was added sodium hydroxide (128 mL, 68.4 mmol, 50 wt % solution in water). The mixture was vigorously stirred at 80° C. for 2 hours, then cooled to room temperature, diluted with water and extracted with heptane and twice with diethyl ether/heptane. The combined organic layers were washed with brine, dried over sodium sulfate and concentrated in vacuo. Purification by column chromatography (600 g silica, 5→14% ethyl acetate in heptane) afforded the desired product tert-butyl (R)-3-(hex-5-en-1-yloxy)pyrrolidine-1-carboxylate (14.93 g). Yield 81%. $^1$H NMR (400 MHz, Chloroform-d) δ 5.87-5.74 (m, 1H), 5.05-4.91 (m, 2H), 4.04-3.95 (m, 1H), 3.48-3.27 (m, 6H), 2.07 (q, J=7.2 Hz, 2H), 2.02-1.84 (m, 2H), 1.60-1.51 (m, 2H), 1.51-1.38 (m, 11H).

Step 2: tert-butyl (R)-3-((5-oxopentyl)oxy)pyrrolidine-1-carboxylate

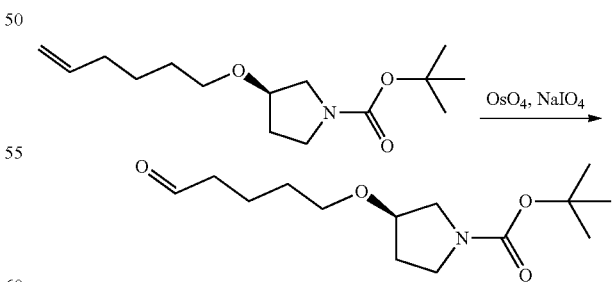

To a solution of tert-butyl (R)-3-(hex-5-en-1-yloxy)pyrrolidine-1-carboxylate (14.93 g, 55.4 mmol) in THF (420 mL) and water (140 mL) was added sodium periodate (26.1 g, 122 mmol) and osmium tetroxide (1.5 mL, 0.232 mmol, 4% solution in water). After 1 hour, additional sodium periodate (5 g, 23.38 mmol) was added. After 30 minutes, the mixture was diluted with water and extracted three times with ethyl acetate. The combined organic layers were washed with brine, dried over sodium sulfate and concentrated in vacuo. The residue was purified by flash column chromatography (~600 g silica, 20→50% ethyl acetate in heptane). This afforded the desired product tert-butyl (R)-3-((5-oxopentyl)oxy)pyrrolidine-1-carboxylate (10.97 g). Yield 72%. ¹H NMR (400 MHz, Chloroform-d) δ 9.77 (s, 1H), 4.03-3.94 (m, 1H), 3.50-3.27 (m, 6H), 2.47 (t, J=7.2 Hz, 2H), 2.02-1.84 (m, 2H), 1.77-1.65 (m, 2H), 1.65-1.54 (m, 2H), 1.46 (s, 9H).

Step 3: tert-butyl (3R)-3-((5-hydroxyhept-6-en-1-yl)oxy)pyrrolidine-1-carboxylate

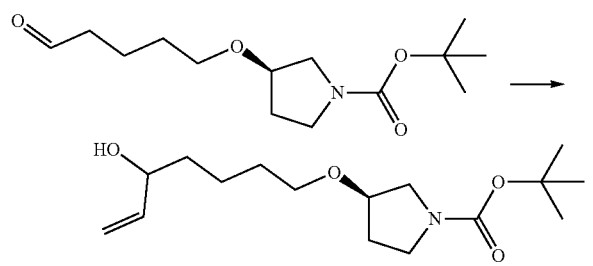

To a solution of tert-butyl (R)-3-((5-oxopentyl)oxy)pyrrolidine-1-carboxylate (10.97 g, 40.4 mmol) in THF (70 mL) at 0° C. was added dropwise vinylmagnesium bromide (66.4 mL, 46.5 mmol, 0.7 M solution in THF). After 16 hours, the mixture was quenched with aqueous saturated ammonium chloride and extracted with ethyl acetate. The organic layer was washed with brine, dried over sodium sulfate and concentrated, and the residue was purified by flash column chromatography (20→50% EtOAc in heptane) to give the desired product tert-butyl (3R)-3-((5-hydroxyhept-6-en-1-yl)oxy)pyrrolidine-1-carboxylate (7.68 g). Yield 63%. ¹H NMR (400 MHz, Chloroform-d) δ 5.93-5.80 (m, 1H), 5.28-5.17 (m, 1H), 5.15-5.06 (m, 1H), 4.17-4.05 (m, 1H), 3.99 (s, 1H), 3.52-3.23 (m, 6H), 2.03-1.83 (m, 2H), 1.65-1.50 (m, 5H), 1.50-1.33 (m, 11H).

Step 4: tert-butyl (R)-3-((7-(2-chloropyridin-3-yl)-5-oxoheptyl)oxy)pyrrolidine-1-carboxylate

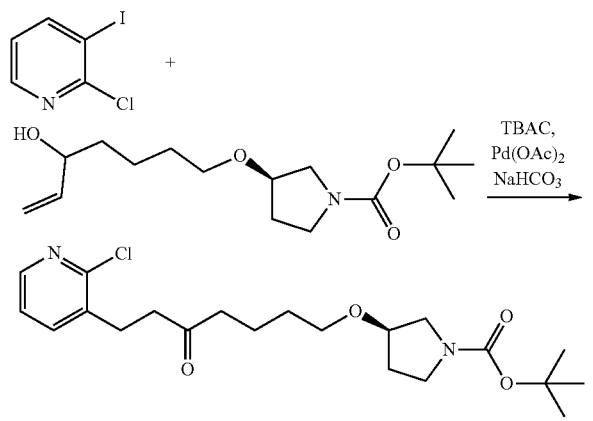

Tert-butyl (3R)-3-((5-hydroxyhept-6-en-1-yl)oxy)pyrrolidine-1-carboxylate (10.48 g, 35.0 mmol), 2-chloro-3-iodopyridine (4.19 g, 17.50 mmol), tetrabutylammonium chloride (0.486 g, 1.750 mmol) and sodium hydrogencarbonate (3.68 g, 43.8 mmol) were dissolved/suspended under argon in DMF (35 mL), and argon was bubbled through this mixture for 15 minutes. Palladium(II) acetate (0.393 g, 1.750 mmol) was added, and the mixture was heated to 50° C. for 24 hours, then cooled to room temperature, diluted with water and extracted three times with ethyl acetate. The combined organic layers were washed three times with brine, dried over sodium sulfate and concentrated, and the residue was purified by column chromatography (silica, 20→55% EtOAc in heptane) to afford the desired product tert-butyl (R)-3-((7-(2-chloropyridin-3-yl)-5-oxoheptyl)oxy)pyrrolidine-1-carboxylate (3.05 g). Yield 42%. ¹H NMR (400 MHz, Chloroform-d) δ 8.25 (dd, J=4.7, 1.9 Hz, 1H), 7.62 (dd, J=7.5, 1.9 Hz, 1H), 7.17 (dd, J=7.5, 4.7 Hz, 1H), 4.04-3.93 (m, 1H), 3.51-3.25 (m, 6H), 2.99 (t, J=7.3 Hz, 2H), 2.79 (t, J=7.3 Hz, 2H), 2.43 (t, J=7.2 Hz, 2H), 2.01-1.83 (m, 2H), 1.72-1.48 (m, 4H), 1.30 (s, 9H).

Step 5: tert-butyl (R)-3-((5-(((R)-tert-butylsulfinyl)imino)-7-(2-chloropyridin-3-yl)heptyl)oxy)pyrrolidine-1-carboxylate

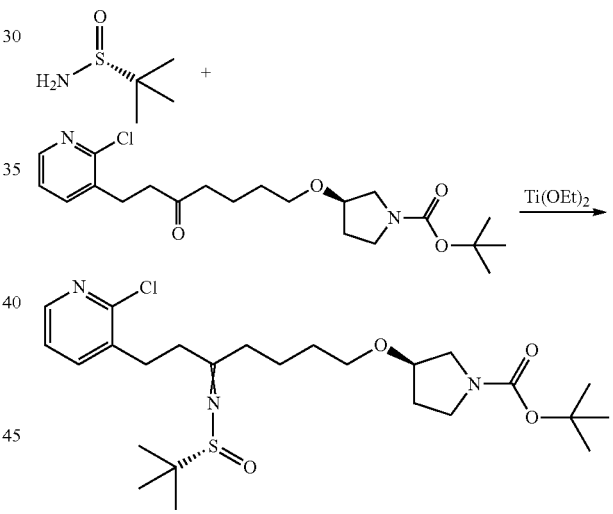

To a solution of (R)—(+)-2-methyl-2-propanesulfinamide (1.799 g, 14.84 mmol) and tert-butyl (R)-3-((7-(2-chloropyridin-3-yl)-5-oxoheptyl)oxy)pyrrolidine-1-carboxylate (3.05 g, 7.42 mmol) in THF (30 mL) was added titanium(IV) ethoxide (7.24 mL, 22.27 mmol). The resulting mixture was heated to 50° C. for 20 hours, then poured out on half-saturated aqueous sodium hydrogencarbonate, stirred for 10 minutes, transferred to 2 centrifuge vials and centrifuged for 5 min at 7800 rpm. The liquids were decanted into a separation funnel. The vials were then filled with ethyl acetate, shaken vigorously and centrifuged again for 5 minutes at 7800 rpm. The liquids were combined in the separation funnel. The layers were separated, and the aqueous phase was extracted once more with ethyl acetate. The combined organic layers were washed with brine, dried over sodium sulfate and concentrated, and the residue was purified by flash column chromatography (300 g silica, 35-65% EtOAc in heptane) to afford the desired product tert-butyl (R)-3-((5-(((R)-tert-butylsulfinyl)imino)-7-(2-chloropyridin-3-yl)heptyl)oxy)pyrrolidine-1-carboxylate (3.15 g). Yield 78% (ESI 514/516 (M+H)+). ¹H NMR (400 MHz, Chloroform-d) δ 8.27 (dd, J=4.7, 1.9 Hz, 1H), 7.64 (dd, J=62.5, 7.4 Hz, 1H), 7.19 (dd, J=7.5, 4.8 Hz, 1H), 3.99 (s, 1H), 3.54-3.24 (m, 6H), 3.16-2.87 (m, 2H), 2.87-2.60 (m, 2H), 2.60-2.35 (m, 1H), 1.94 (s, 2H), 1.77-1.53 (m, 5H), 1.45 (s, 9H), 1.35-1.11 (m, 9H).

Step 6: tert-butyl (3R)-3-((5-(((R)-tert-butylsulfinyl)amino)-7-(2-chloropyridin-3-yl)heptyl)oxy)pyrrolidine-1-carboxylate

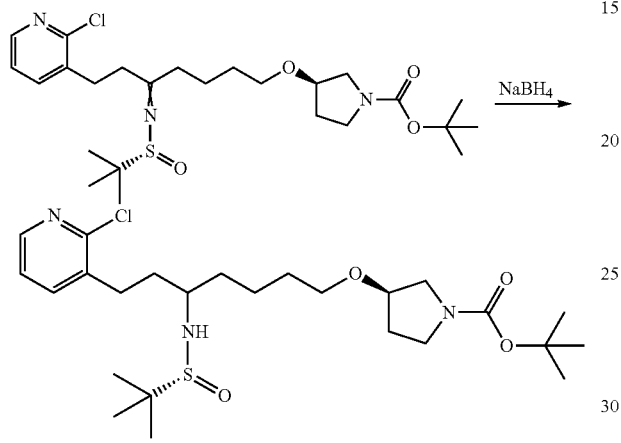

To a solution of tert-butyl (R)-3-((5-(((R)-tert-butylsulfinyl)imino)-7-(2-chloropyridin-3-yl)heptyl)oxy)pyrrolidine-1-carboxylate (3.15 g, 6.13 mmol) in methanol (20 mL) was added sodium borohydride (0.278 g, 7.35 mmol). After 2 hours, the mixture was quenched with saturated aqueous ammonium chloride and extracted three times with ethyl acetate. The combined organic layers were washed with brine, dried over sodium sulfate and concentrated, and the residue was purified by flash column chromatography (50→100% EtOAc in heptane) to afford the desired product tert-butyl (3R)-3-((5-(((R)-tert-butylsulfinyl)amino)-7-(2-chloropyridin-3-yl)heptyl)oxy)pyrrolidine-1-carboxylate (3.05 g). Yield 85%. ¹H NMR (400 MHz, Chloroform-d) δ 8.28-8.22 (m, 1H), 7.72-7.51 (m, 1H), 7.22-7.15 (m, 1H), 4.03-3.95 (m, 1H), 3.49-3.22 (m, 7H), 3.16-3.06 (m, 1H), 2.96-2.64 (m, 2H), 2.00-1.83 (m, 4H), 1.80-1.70 (m, 1H), 1.65-1.51 (m, 3H), 1.51-1.37 (m, 11H), 1.25 (s, 9H).

Step 7: tert-butyl (3R)-3-(4-(1-((R)-tert-butylsulfinyl)-1,2,3,4-tetrahydro-1,8-naphthyridin-2-yl)butoxy)pyrrolidine-1-carboxylate

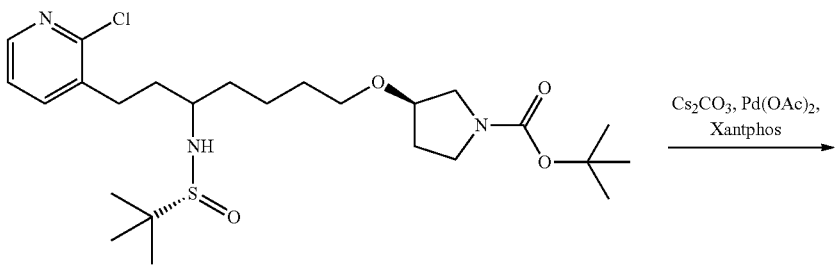

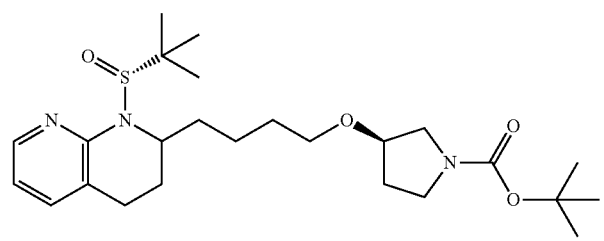

To a solution of tert-butyl (3R)-3-((5-(((R)-tert-butylsulfinyl)amino)-7-(2-chloropyridin-3-yl)heptyl)oxy)pyrrolidine-1-carboxylate (3.05 g, 5.20 mmol) in 1,4-dioxane (25 mL) was added Xantphos (0.602 g, 1.040 mmol) and cesium carbonate (3.39 g, 10.40 mmol). The mixture was bubbled through with argon for 15 minutes. Palladium(II) acetate (0.117 g, 0.520 mmol) was added, and the reaction was bubbled through with argon for 1 minute and stirred at 100° C. for 16 hours, then cooled to room temperature, quenched with water and extracted three times with ethyl acetate. The combined organic layers were washed with brine, dried over sodium sulfate and concentrated, and the residue was purified by flash column chromatography (40→100% EtOAc in heptane) to afford the desired product tert-butyl (3R)-3-(4-(1-((R)-tert-butylsulfinyl)-1,2,3,4-tetrahydro-1,8-naphthyridin-2-yl)butoxy)pyrrolidine-1-carboxylate (928 mg). Yield 36% (ESI 480 (M+H)+). The compound was separated by chiral SFC to give stereoisomer A and stereoisomer B. Apparatus: Waters Prep 100 SFC UV directed system; Waters 2998 Photodiode Array (PDA) Detector; Waters 2767 Sample Manager; Masslynx™ Software; FractionLynx™ Application Manager, Acq. Method: Cell-2_f70_10_50_8 mn_SW_120 bar, Loading: 50 mg, Column: Phenomenex Lux Cellulose-2 (250×21.2 mm, 5 μm), Flow: 70 mL/min, Column temp: 35° C.; ABPR: 120 bar; Eluent A: $CO_2$, Eluent B: 20 mM ammonia in methanol, Linear gradient: t=0 min 10% B, t=5 min 50% B, t=7.5 min 50% B, t=8 min 10% B. Injection: Sandwich 100 μl methanol, Detection PDA: 210-320 nm, Collection: Based on PDA TIC.

tert-butyl (3R)-3-(4-(1-((R)-tert-butylsulfinyl)-1,2,3,4-tetrahydro-1,8-naphthyridin-2-yl)butoxy)pyrrolidine-1-carboxylate stereoisomer A: 0.58 grams, LC/MS ESI 480 (M+H)+. $^1$H NMR (400 MHz, Chloroform-d) δ 8.06-7.98 (m, 1H), 7.37-7.29 (m, 1H), 6.73-6.63 (m, 1H), 4.20-4.09 (m, 1H), 4.03-3.93 (m, 1H), 3.50-3.25 (m, 6H), 2.94-2.79 (m, 1H), 2.77-2.65 (m, 1H), 2.20-2.08 (m, 1H), 2.00-1.49 (m, 7H), 1.46 (s, 9H), 1.43-1.27 (m, 2H), 1.21 (s, 9H).

tert-butyl (3R)-3-(4-(1-((R)-tert-butylsulfinyl)-1,2,3,4-tetrahydro-1,8-naphthyridin-2-yl)butoxy)pyrrolidine-1-carboxylate stereoisomer B: 0.45 grams, LC/MS ESI 480 (M+H)+. $^1$H NMR (400 MHz, Chloroform-d) δ 8.20-8.09 (m, 1H), 7.39-7.31 (m, 1H), 6.90-6.80 (m, 1H), 4.25-4.12 (m, 1H), 4.04-3.92 (m, 1H), 3.51-3.24 (m, 6H), 2.87-2.62 (m, 2H), 2.11-1.83 (m, 3H), 1.76-1.49 (m, 6H), 1.46 (s, 9H), 1.40-1.27 (m, 10H).

Step 8: 2-(4-(((R)-pyrrolidin-3-yl)oxy)butyl)-1,2,3,4-tetrahydro-1,8-naphthyridine stereoisomer A dihydrochloride

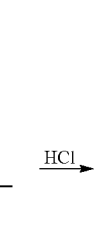

stereoisomer A

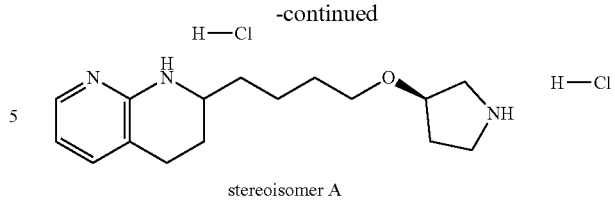

stereoisomer A

To a solution of tert-butyl (3R)-3-(4-(1-((R)-tert-butylsulfinyl)-1,2,3,4-tetrahydro-1,8-naphthyridin-2-yl)butoxy)pyrrolidine-1-carboxylate stereoisomer A (0.58 g, 1.209 mmol) in methanol (5 mL) was added hydrochloric acid (5 mL, 20.00 mmol, 4N solution in dioxane). The mixture was stirred at room temperature for 3 hours, then concentrated in vacuo and coevaporated with methanol. Diethyl ether was added which started a slow crystallisation of the product. After standing overnight the crystallised material was scratched loose, and the material was triturated with diethyl ether. After a few hours the solids were collected by filtration, rinsed with fresh diethyl ether and dried under vacuum to afford the desired product 2-(4-(((R)-pyrrolidin-3-yl)oxy)butyl)-1,2,3,4-tetrahydro-1,8-naphthyridine stereoisomer A dihydrochloride (438 mg) as a beige solid. Yield 100%. LC/MS ESI 276 (M−2HCl+H)+. $^1$H NMR (400 MHz, Methanol-d4) δ 7.75-7.66 (m, 2H), 6.80 (t, J=6.8 Hz, 1H), 4.30-4.23 (m, 1H), 3.67-3.56 (m, 1H), 3.56-3.44 (m, 2H), 3.44-3.33 (m, 3H), 3.25 (dd, J=12.5, 4.2 Hz, 1H), 2.96-2.78 (m, 2H), 2.26-2.16 (m, 1H), 2.13-1.99 (m, 2H), 1.77-1.46 (m, 7H), 1.23-1.12 (m, 1H). Specific Optical Rotation: 33.9° C.=0.5, MeOH, 22.7° C., 589 nm.

Step 9: 2-(4-(((R)-pyrrolidin-3-yl)oxy)butyl)-1,2,3,4-tetrahydro-1,8-naphthyridine stereoisomer B dihydrochloride

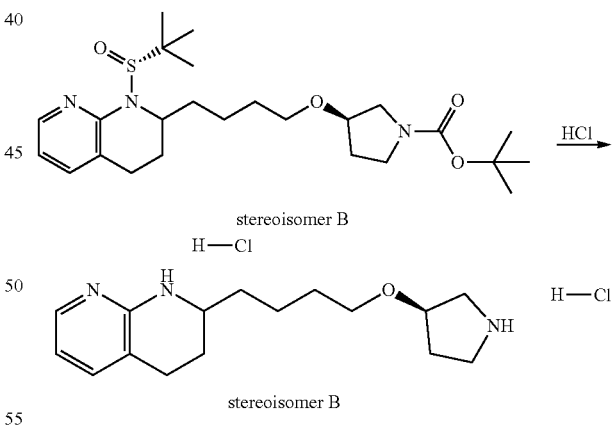

stereoisomer B stereoisomer B

To a solution of tert-butyl (3R)-3-(4-(1-((R)-tert-butylsulfinyl)-1,2,3,4-tetrahydro-1,8-naphthyridin-2-yl)butoxy)pyrrolidine-1-carboxylate stereoisomer B (0.45 g, 0.938 mmol) in methanol (5 mL) was added hydrochloric acid (5 mL, 20.00 mmol, 4N solution in dioxane). The mixture was stirred at room temperature for 3 hours, then concentrated in vacuo and coevaporated with methanol. Diethyl ether was added which started a slow crystallisation of the product. After standing overnight the crystallised material was scratched loose, and the material was triturated with diethyl ether. After a few hours, the solids were collected by filtration, rinsed with fresh diethyl ether and dried under vacuum to afford the desired product 2-(4-(((R)-pyrrolidin-3-yl)oxy)butyl)-1,2,3,4-tetrahydro-1,8-naphthyridine stereoisomer B dihydrochloride (289 mg) as a beige solid. Yield 85%. LC/MS ESI 276 (M−2HCl+H)+. $^1$H NMR (400 MHz, Methanol-d4) δ 7.74-7.66 (m, 2H), 6.80 (t, J=6.8 Hz, 1H), 4.30-4.23 (m, 1H), 3.66-3.57 (m, 1H), 3.57-3.45 (m, 2H), 3.45-3.33 (m, 3H), 3.29-3.21 (m, 1H), 2.96-2.78 (m, 2H), 2.26-2.16 (m, 1H), 2.13-1.97 (m, 2H), 1.76-1.44 (m, 7H). Specific Optical Rotation: −48.3° C.=0.5, MeOH, 22.7° C., 589 nm.

The following methods were used to prepare compounds 1-6:

Example 1: Preparation of 2-((R)-3-(4-(5,6,7,8-tetrahydro-1,8-naphthyridin-2-yl)butoxy)pyrrolidin-1-yl)-2-(1-((S)-tetrahydrofuran-3-yl)-1H-indazol-7-yl)acetic acid (Compound 1)

Step 1: (S)-7-bromo-1-(tetrahydrofuran-3-yl)-1H-indazole

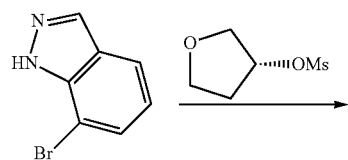

A mixture of (R)-tetrahydrofuran-3-yl methanesulfonate (2.4 g, 14.4 mmol), 7-bromo-1H-indazole (2 g, 10.14 mmol) and Cs$_2$CO$_3$ (6.6 g, 20.28 mmol) in DMF (20 mL) was stirred at 80° C. for 16 hours, then concentrated under reduced pressure. The residue was purified by silica gel column (pet ether:EtOAc 2:3) to give the desired product (S)-7-bromo-1-(tetrahydrofuran-3-yl)-1H-indazole as a pale yellow solid (1.1 g). Yield: 38% (ESI 267 [M+H]+).

Step 2: (S)-tert-butyl 2-(1-(tetrahydrofuran-3-yl)-1H-indazol-7-yl)acetate

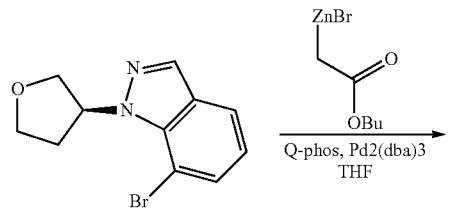

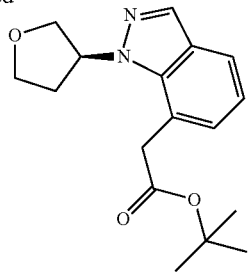

To a mixture of (S)-7-bromo-1-(tetrahydrofuran-3-yl)-1H-indazole (1 g, 3.74 mmol), Pd$_2$(dba)$_3$ (192 mg, 0.187 mmol) and Q-phos (260 mg, 0.374 mmol) in THF (20 mL) was added (2-tert-butoxy-2-oxoethyl)zinc(II) bromide solution 1.0 M in THF (15 mL, 15 mmol). The reaction was stirred at 50° C. for 2 hours, then quenched with sat.NaHCO3 solution to pH=7-8 and extracted with EtOAc (2×20 mL). The combined organic phase was washed with brine, dried over Na2SO4, filtered and concentrated in vacuo. The residue was purified by silica gel column (pet ether:EtOAc 1:1) to give the desired product (S)-tert-butyl 2-(1-(tetrahydrofuran-3-yl)-1H-indazol-7-yl)acetate as a pink solid (900 mg). Yield 80% (ESI 303.1 (M+H)+).

Step 3: tert-butyl 2-bromo-2-(1-((S)-tetrahydrofuran-3-yl)-1H-indazol-7-yl)acetate

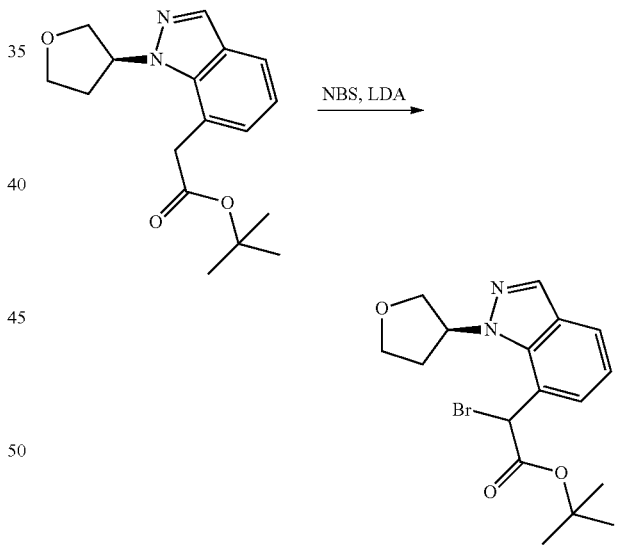

To a solution of (S)-tert-butyl 2-(1-(tetrahydrofuran-3-yl)-1H-indazol-7-yl)acetate (500 mg, 1.65 mmol) in THF (10 mL) at −78° C. was added lithium diisopropylamide solution 2.0 M in THF/hexanes (1.65 mL, 3.3 mmol) dropwise. The reaction was stirred at −78° C. for 20 min. Then a solution of chlorotrimethylsilane (218 mg, 2.0 mmol) in THF (0.5 mL) was added, and the reaction was stirred at −78° C. for another 10 min. A solution of NBS (590 mg, 3.3 mmol) in THF (2 mL) was added, and the reaction was stirred at −78° C. for 30 min, then quenched with aq. NH4Cl (20 mL) and extracted with EtOAc (40 mL). The organic layer was dried over Na2SO4, filtered and concentrated in vacuo. The residue was purified by silica gel column (pet ether:EtOAc 1:1) to give the desired product as a yellow oil (0.5 g). Yield: 80% (ESI 381 [M+H]+).

Step 4: tert-butyl 2-((R)-3-(4-(5,6,7,8-tetrahydro-1,8-naphthyridin-2-yl)butoxy)pyrrolidin-1-yl)-2-(1-((S)-tetrahydrofuran-3-yl)-1H-indazol-7-yl)acetate

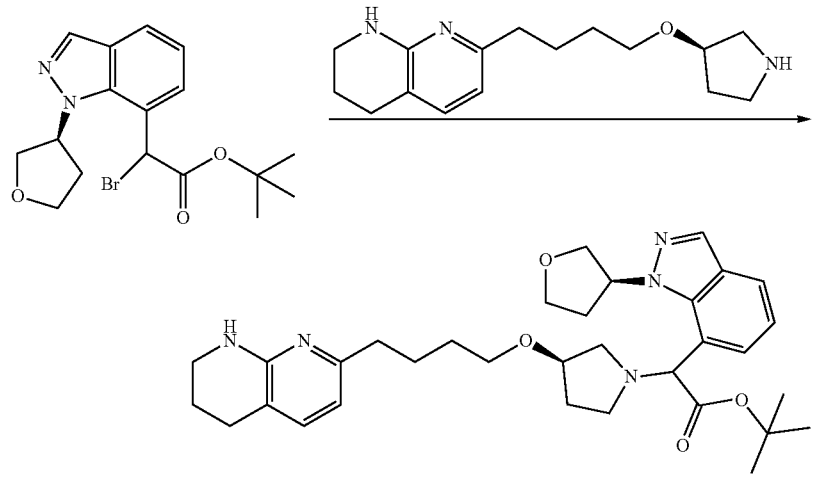

A mixture of tert-butyl 2-bromo-2-(1-((S)-tetrahydrofuran-3-yl)-1H-indazol-7-yl)acetate (410 mg, 1.1 mmol), (R)-7-(4-(pyrrolidin-3-yloxy)butyl)-1,2,3,4-tetrahydro-1,8-naphthyridine (300 mg, 1.1 mmol) and diisopropylethylamine (0.6 mL, 3.3 mmol) in acetonitrile (20 mL) was stirred at room temperature for 2 hours. Solvent was removed in vacuo, and the residue was purified by silica gel column (MeOH/DCM=30/1) to give the desired product as a white solid (200 mg). Yield 31% (ESI 576 (M+H)+).

Step 5: 2-((R)-3-(4-(5,6,7,8-tetrahydro-1,8-naphthyridin-2-yl)butoxy)pyrrolidin-1-yl)-2-(1-((S)-tetrahydrofuran-3-yl)-1H-indazol-7-yl)acetic acid (Compound 1)

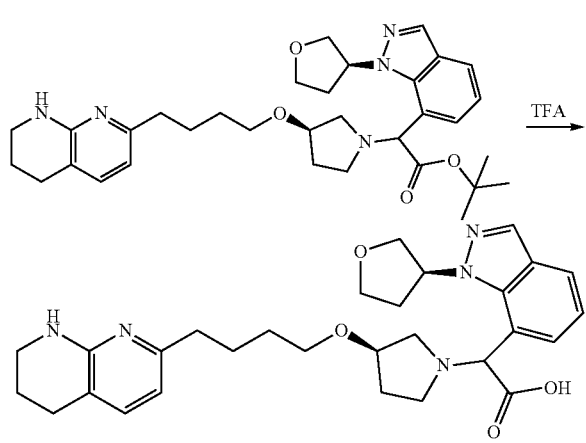

A solution of tert-butyl 2-((R)-3-(4-(5,6,7,8-tetrahydro-1,8-naphthyridin-2-yl)butoxy)pyrrolidin-1-yl)-2-(1-((S)-tetrahydrofuran-3-yl)-1H-indazol-7-yl)acetate (200 mg, 0.35 mmol) in DCM (4 mL) and TFA (1 mL) was stirred at room temperature overnight. Solvent was removed in vacuo, and the residue was purified by Prep-HPLC A (30-65% MeCN) to give the desired product compound 1 as a white solid (80 mg, yield: 44%).

Compound 1 LC/MS ESI 520 (M+H)+. 1H NMR (500 MHz, MeOD) δ 8.10 (s, 1H), 7.77-7.66 (m, 2H), 7.33 (d, J=7.5 Hz, 1H), 7.19-7.16 (m, 1H), 6.46 (d, J=7.5 Hz, 1H), 6.14 (s, 1H), 5.20 (s, 1H), 4.19-3.94 (m, 5H), 3.55-3.02 (m, 7H), 2.69-2.47 (m, 6H), 2.08-1.60 (m, 8H).

Example 2: Preparation of 2-((R)-3-(4-(4-methoxy-5,6,7,8-tetrahydro-1,8-naphthyridin-2-yl)butoxy)pyrrolidin-1-yl)-2-(1-(oxetan-3-yl)-1H-indazol-7-yl)acetic acid (Compound 2)

Step 1: 7-bromo-1-(oxetan-3-yl)-1H-indazole

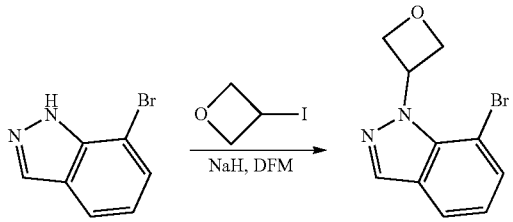

A mixture of 3-iodooxetane (2.65 g, 14.4 mmol), 7-bromo-1H-indazole (2 g, 10.14 mmol) and NaH (60%, 576 mg, 14.4 mmol) in DMF (20 mL) was stirred at 60° C. for 16 hours. The mixture was concentrated under reduced pressure. The residue was purified by silica gel column (pet ether:EtOAc 1:1) to give the desired product 7-bromo-1-(oxetan-3-yl)-1H-indazole as a pale yellow solid (1.0 g). Yield: 39% (ESI 253 [M+H]+). 1H NMR (400 MHz, CDCl3) δ 8.13 (s, 1H), 7.70 (dd, J1=8.0 Hz, J2=0.8 Hz, 1H), 7.55 (dd, J1=8.0 Hz, J2=0.8 Hz, 1H), 7.02 (t, J=8.0 Hz, 1H), 6.64 (m, 1H), 5.34 (t, J=6.4 Hz, 2H), 5.10 (t, J=7.2 Hz, 2H).

Step 2: tert-butyl 2-(1-(oxetan-3-yl)-1H-indazol-7-yl)acetate

Step 3: tert-butyl 2-bromo-2-(1-(oxetan-3-yl)-1H-indazol-7-yl)acetate

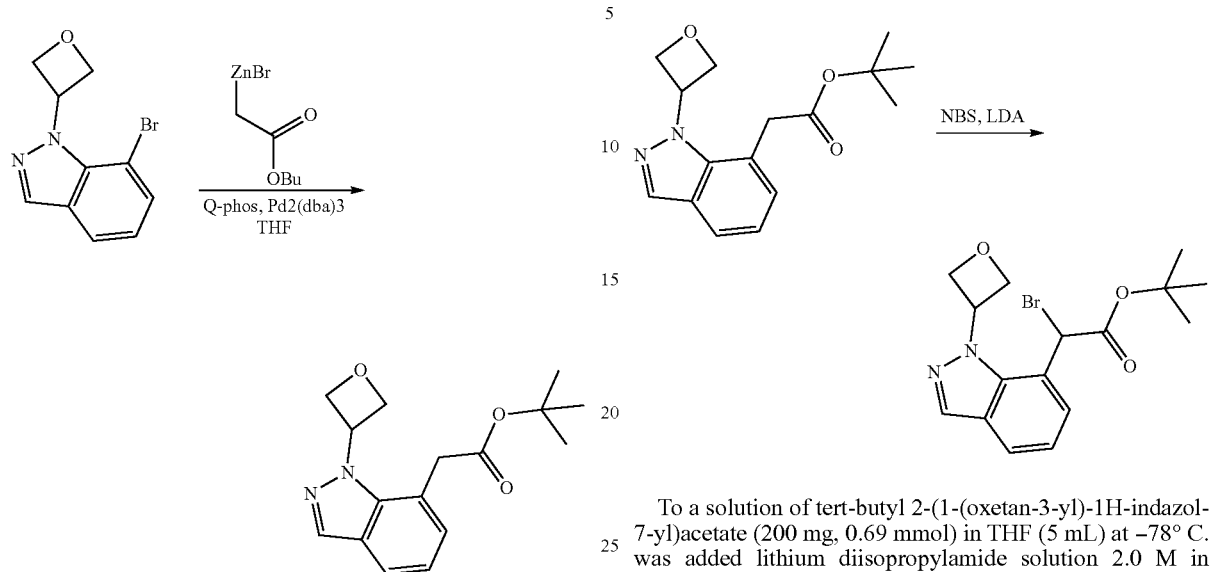

To a mixture of 7-bromo-1-(oxetan-3-yl)-1H-indazole (0.8 g, 3.16 mmol), Pd2(dba)3 (145 mg, 0.158 mmol) and Q-phos (112 mg, 0.158 mmol) in THF (20 mL) was added (2-tert-butoxy-2-oxoethyl)zinc(II) bromide solution 1.0 M in THF (15 mL, 15 mmol). The reaction was stirred at 50° C. for 2 hours, then adjusted with sat. NaHCO3 solution to pH~7~8 and extracted with EtOAc (2×20 mL). The combined organic phase was washed with brine, dried over Na2SO4, filtered and concentrated in vacuo. The residue was purified by silica gel column (pet ether:EtOAc 1:1) to give the desired product tert-butyl 2-(1-(oxetan-3-yl)-1H-indazol-7-yl)acetate as a pink solid (650 mg). Yield 71% (ESI 289 (M+H)+).

To a solution of tert-butyl 2-(1-(oxetan-3-yl)-1H-indazol-7-yl)acetate (200 mg, 0.69 mmol) in THF (5 mL) at −78° C. was added lithium diisopropylamide solution 2.0 M in THF/hexanes (0.87 mL, 1.74 mmol) dropwise. The reaction was stirred at −78° C. for 20 min. Then a solution of chlorotrimethylsilane (113 mg, 1.04 mmol) in THF (0.5 mL) was added, and the reaction was stirred at −78° C. for another 10 min. A solution of NBS (185 mg, 1.04 mmol) in THF (1 mL) was added, and the reaction was stirred at −78° C. for 30 min, then quenched with aq. NH4Cl (10 mL) and extracted with EtOAc (20 mL). The organic layer was dried over Na2SO4, filtered and concentrated in vacuo. The residue was purified by silica gel column (pet ether:EtOAc 1:1) to give the desired product as a yellow oil (120 mg). Yield: 47% (ESI 367 [M+H]+).

Step 4: tert-butyl 2-((R)-3-(4-(4-methoxy-5,6,7,8-tetrahydro-1,8-naphthyridin-2-yl)butoxy)pyrrolidin-1-yl)-2-(1-(oxetan-3-yl)-1H-indazol-7-yl)acetate

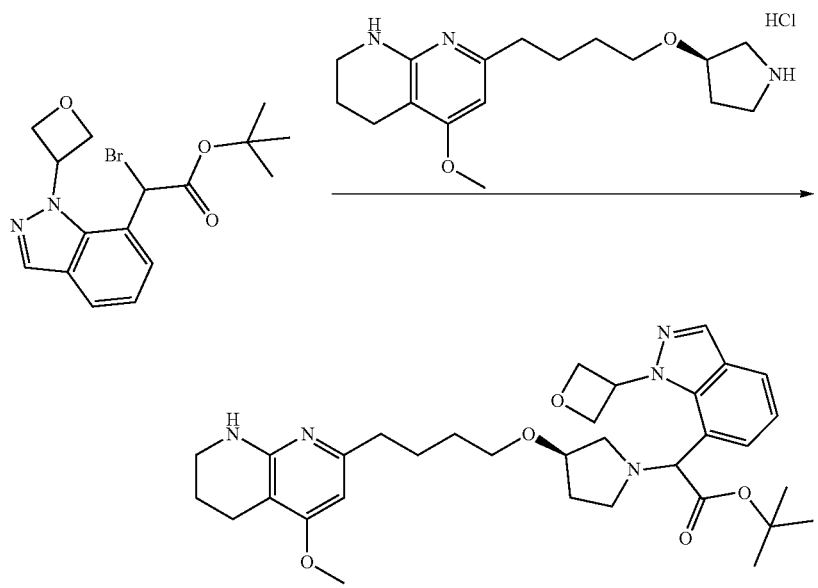

A mixture of tert-butyl 2-bromo-2-(1-(oxetan-3-yl)-1H-indazol-7-yl)acetate (150 mg, 0.41 mmol), (R)-5-methoxy-7-(4-(pyrrolidin-3-yloxy)butyl)-1,2,3,4-tetrahydro-1,8-naphthyridine hydrochloride (134 mg, 0.41 mmol) and diisopropylethylamine (160 mg, 1.23 mmol) in acetonitrile (5 mL) was stirred at room temperature for 2 hours. The mixture was diluted with water (8 mL) and extracted with EtOAc (20 mL). The organic phase was washed with brine, dried over Na2SO4, filtered and concentrated in vacuo. The residue was purified by prep-HPLC A (40-70% MeCN) to give the desired tert-butyl 2-((R)-3-(4-(4-methoxy-5,6,7,8-tetrahydro-1,8-naphthyridin-2-yl)butoxy)pyrrolidin-1-yl)-2-(1-(oxetan-3-yl)-1H-indazol-7-yl)acetate as a colorless oil (65 mg). Yield 27% (ESI 592 (M+H)+.

Step 5: 2-((R)-3-(4-(4-methoxy-5,6,7,8-tetrahydro-1,8-naphthyridin-2-yl)butoxy)pyrrolidin-1-yl)-2-(1-(oxetan-3-yl)-1H-indazol-7-yl)acetic acid (Compound 2)

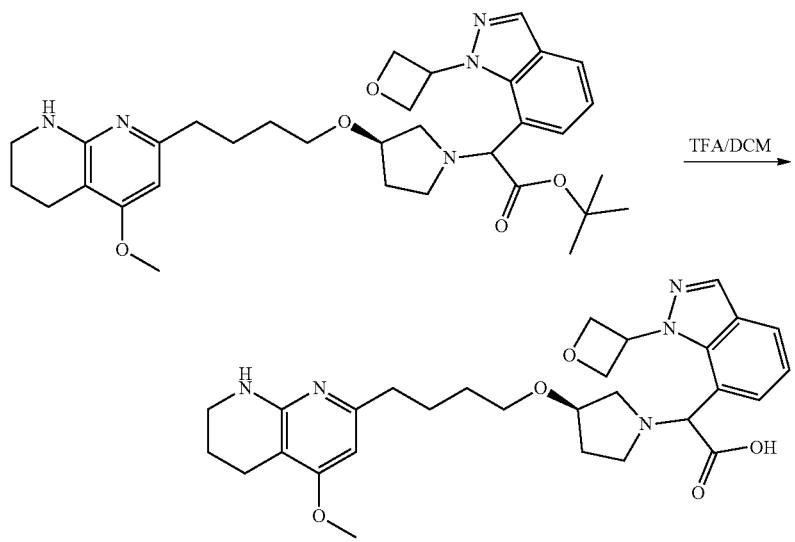

To a solution of tert-butyl 2-((R)-3-(4-(4-methoxy-5,6,7,8-tetrahydro-1,8-naphthyridin-2-yl)butoxy)pyrrolidin-1-yl)-2-(1-(oxetan-3-yl)-1H-indazol-7-yl)acetate (65 mg, 0.11 mmol) in DCM (5 mL) was added TFA (1.5 mL). The reaction was stirred at room temperature for 36 hours. The reaction was concentrated in vacuo, adjusted to pH=7 with aq. NH4HCO3 and purified by prep-HPLC A (40-70% MeCN) to give the desired product compound 2 as a white solid (17 mg, 29% yield).

Compound 2 LC/MS ESI 536 (M+H)+. 1H NMR (400 MHz, MeOD) δ 8.18-8.17 (m, 1H), 7.78-7.56 (m, 2H), 7.28-7.16 (m, 1H), 6.46-6.42 (m, 1H), 5.28-5.10 (m, 5H), 4.00-3.93 (m, 4H), 3.60-3.30 (m, 7H), 3.10-2.60 (m, 6H), 2.10-1.60 (m, 8H).

Example 3: Preparation of 2-((3R)-3-(1-fluoro-5-(5,6,7,8-tetrahydro-1,8-naphthyridin-2-yl)pentyl)pyrrolidin-1-yl)-2-(1-(oxetan-3-yl)-1H-indazol-7-yl)acetic acid (Compound 3)

Step 1: tert-butyl 2-((3R)-3-(1-fluoro-5-(5,6,7,8-tetrahydro-1,8-naphthyridin-2-yl)pentyl)pyrrolidin-1-yl)-2-(1-(oxetan-3-yl)-1H-indazol-7-yl)acetate

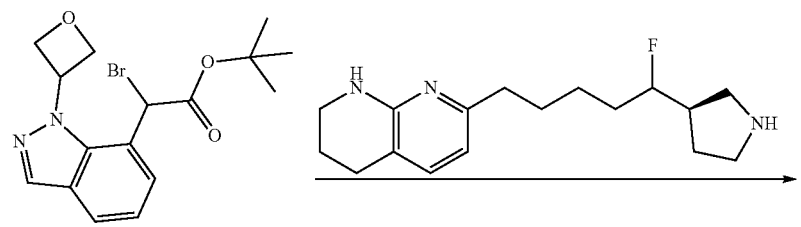

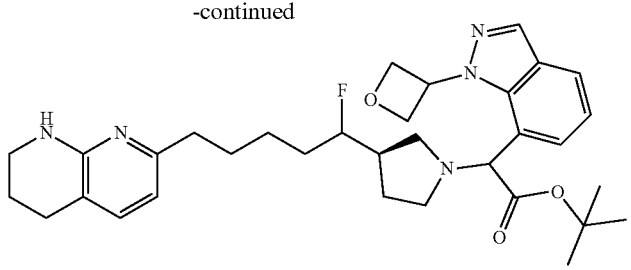

A mixture of tert-butyl 2-bromo-2-(1-(oxetan-3-yl)-1H-indazol-7-yl)acetate (60 mg, 0.17 mmol), 7-(5-fluoro-5-((R)-pyrrolidin-3-yl)pentyl)-1,2,3,4-tetrahydro-1,8-naphthyridine (48 mg, 0.17 mmol) and diisopropylethylamine (66 mg, 0.51 mmol) in acetonitrile (5 mL) was stirred at room temperature for 2 hours. The mixture was diluted with water (8 mL) and extracted with EtOAc (25 mL). The organic phase was washed with brine, dried over Na2SO4, filtered and concentrated in vacuo. The residue was purified by prep-HPLC A (40-70% MeCN) to give the desired product tert-butyl 2-((3R)-3-(1-fluoro-5-(5,6,7,8-tetrahydro-1,8-naphthyridin-2-yl)pentyl)pyrrolidin-1-yl)-2-(1-(oxetan-3-yl)-1H-indazol-7-yl)acetate as a colorless oil (35 mg). Yield 37% (ESI 578 (M+H)+).

Step 2: 2-((3R)-3-(1-fluoro-5-(5,6,7,8-tetrahydro-1,8-naphthyridin-2-yl)pentyl)pyrrolidin-1-yl)-2-(1-(oxetan-3-yl)-1H-indazol-7-yl)acetic acid (Compound 3)

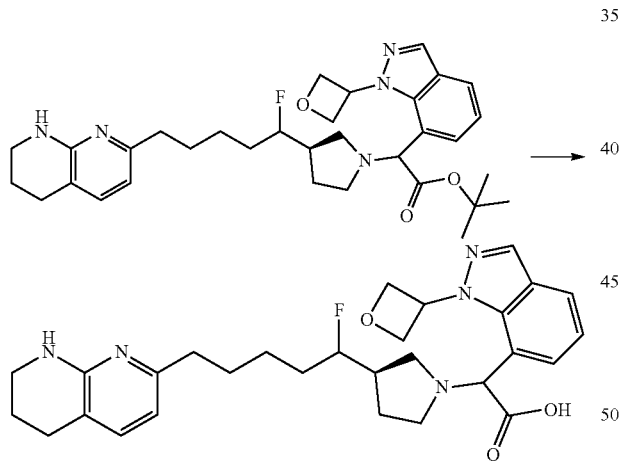

To a solution of tert-butyl 2-((3R)-3-(1-fluoro-5-(5,6,7,8-tetrahydro-1,8-naphthyridin-2-yl)pentyl)pyrrolidin-1-yl)-2-(1-(oxetan-3-yl)-1H-indazol-7-yl)acetate (35 mg, 0.06 mmol) in DCM (5 mL) was added TFA (1.5 mL). The reaction was stirred at room temperature for 36 hours. The reaction was concentrated in vacuo, adjusted to pH=7 with aq. NH4HCO3 and purified by prep-HPLC A (40-70% MeCN) to give the desired product compound 3 as a white solid (6 mg, 19% yield).

Compound 3 LC/MS ESI 522 (M+H)+. 1H NMR (400 MHz, MeOD) δ 8.22-8.20 (m, 1H), 7.78-7.56 (m, 2H), 7.28-7.16 (m, 2H), 6.46-6.42 (m, 1H), 5.28-5.10 (m, 4H), 4.89-4.87 (m, 1H), 4.50-4.30 (m, 1H), 3.39-3.31 (m, 4H), 3.30-2.50 (m, 8H), 1.90-1.55 (m, 10H).

Example 4: Preparation of 2-((3R)-3-(1-fluoro-5-(5,6,7,8-tetrahydro-1,8-naphthyridin-2-yl)pentyl)pyrrolidin-1-yl)-2-(1-((R)-tetrahydrofuran-3-yl)-1H-indazol-7-yl)acetic acid (Compounds 4-E1 and 4-E2)

Step 1: (R)-7-bromo-1-(tetrahydrofuran-3-yl)-1H-indazole

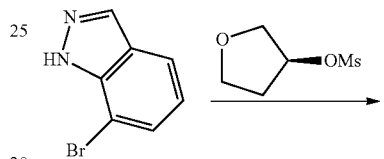

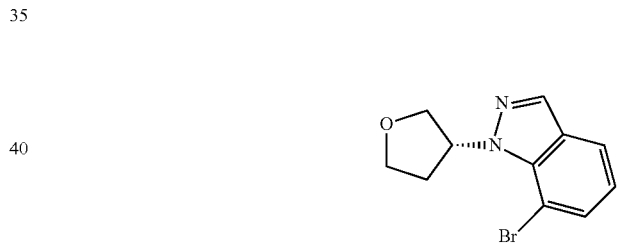

To a solution of (S)-tetrahydrofuran-3-ol (1.06 g, 12 mmol) and triethylamine (2.43 g, 24 mmoL) in THF (30 mL) at 0~5° C. was slowly added MsCl (2.06 g, 18 mmol). The mixture was stirred at room temperature for 2 hours, then diluted with water (10 mL) and extracted with ethyl acetate. The organic phase was washed with sat.NaHCO3 solution and brine, dried over Na2SO4, filtered and concentrated to give (S)-tetrahydrofuran-3-yl methanesulfonate as an orange oil. The oil was dissolved in MeCN (80 mL), and 7-bromo-1H-indazole (1.18 g, 6.0 mmol) and Cs2CO3 (3.91 g, 12 mmol) were added. The mixture was stirred under reflux overnight, then filtered and concentrated in vacuo. The residue was purified by silica gel column (pet ether:EtOAc 2:3) to give the desired product (R)-7-bromo-1-(tetrahydrofuran-3-yl)-1H-indazole as a pale yellow solid (560 mg). Yield 35% (ESI 267.0 (M+H)+). 1H NMR (500 MHz, CDCl3) δ 8.06 (s, 1H), 7.72-7.70 (m, 1H), 7.58-7.60 (m, 1H), 7.03 (t, J=7.5 Hz, 1H), 6.27-6.30 (m, 1H), 4.18-4.28 (m, 3H), 4.04-4.08 (m, 1H), 2.62-2.65 (m, 1H), 2.49-2.54 (m, 1H).

Step 2: (R)-tert-butyl 2-(1-(tetrahydrofuran-3-yl)-1H-indazol-7-yl)acetate

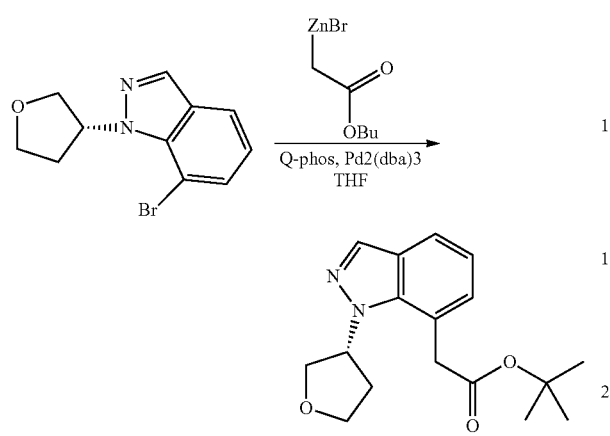

To a mixture of (R)-7-bromo-1-(tetrahydrofuran-3-yl)-1H-indazole (534 mg, 2.0 mmol), Pd2(dba)3 (73 mg, 0.08 mmol) and Q-phos (58 mg, 0.08 mmol) in THF (40 mL) was added (2-tert-butoxy-2-oxoethyl)zinc(II) bromide solution 1.0 M in THF (10 mL, 10 mmol). The reaction was stirred at 50° C. for 2 hours, then quenched with sat. NaHCO3 solution to pH=7~8 and extracted with EtOAc (2×20 mL). The combined organic phase was washed with brine, dried over Na2SO4, filtered and concentrated in vacuo. The residue was purified by silica gel column (pet ether:EtOAc 1:1) to give the desired product (R)-tert-butyl 2-(1-(tetrahydrofuran-3-yl)-1H-indazol-7-yl)acetate as a pink solid (410 mg). Yield 68% (ESI 303.1 (M+H)+). 1H NMR (500 MHz, CDCl3) δ 8.06 (s, 1H), 7.67-7.70 (m, 1H), 7.20 (m, 1H), 7.11 (t, J=7.5 Hz, 1H), 5.55 (m, 1H), 4.24-4.28 (m, 3H), 4.19-4.21 (m, 2H), 4.16 (m, 1H), 3.93-4.08 (m, 2H), 2.56-2.57 (m, 1H), 2.43-2.47 (m, 1H), 1.46 (s, 9H).

Step 3: tert-butyl 2-bromo-2-(1-((R)-tetrahydrofuran-3-yl)-1H-indazol-7-yl)acetate

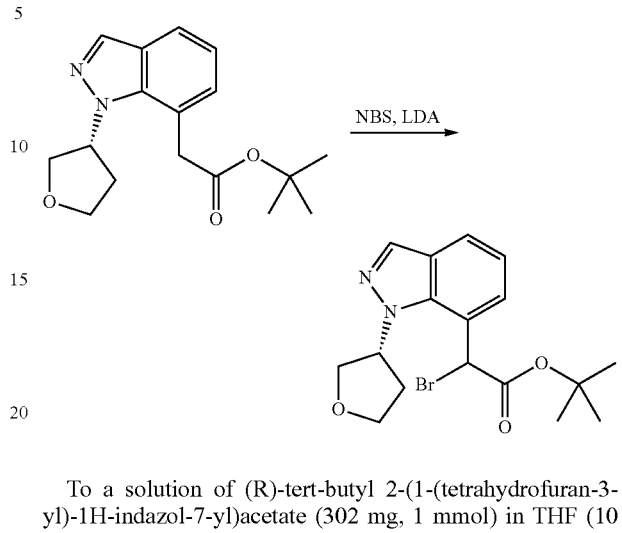

To a solution of (R)-tert-butyl 2-(1-(tetrahydrofuran-3-yl)-1H-indazol-7-yl)acetate (302 mg, 1 mmol) in THF (10 mL) at −78° C. was added lithium diisopropylamide solution 2.0 M in THF/hexanes (1.0 mL, 2.0 mmol) dropwise. The reaction was stirred at −78° C. for 20 min. Then a solution of chlorotrimethylsilane (218 mg, 2.0 mmol) in THF (0.5 mL) was added, and the reaction was stirred at −78° C. for another 10 min. Then a solution of NBS (356 mg, 2.0 mmol) in THF (2 mL) was added, and the reaction was stirred at −78° C. for 10 min., then poured into water (10 mL) and extracted with EtOAc (20 mL). The organic phase was washed with sat. NaHCO3 solution and water and concentrated in vacuo to give the crude product as a yellow oil (360 mg). Yield 65% (ESI 381.0 (M+H)+).

Step 4: tert-butyl 2-((3R)-3-(1-fluoro-5-(5,6,7,8-tetrahydro-1,8-naphthyridin-2-yl)pentyl)pyrrolidin-1-yl)-2-(1-((R)-tetrahydrofuran-3-yl)-1H-indazol-7-yl)acetate

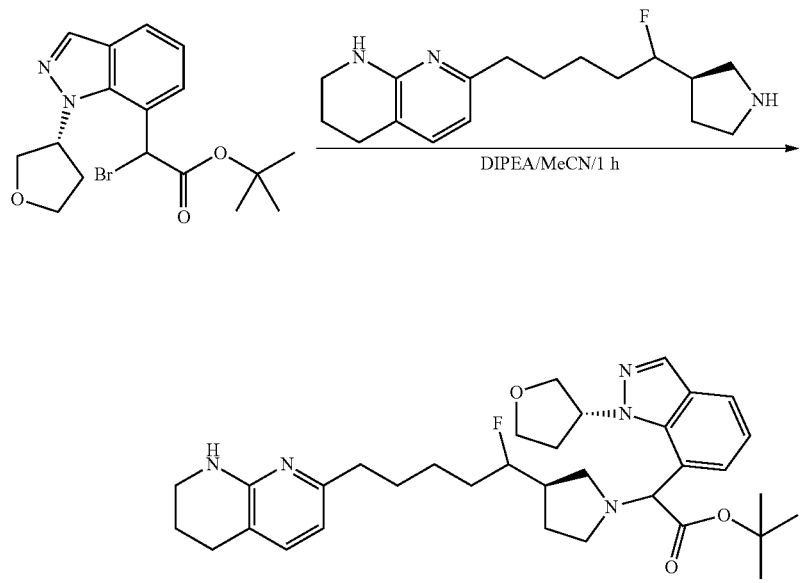

A mixture of tert-butyl 2-bromo-2-(1-((R)-tetrahydrofuran-3-yl)-1H-indazol-7-yl)acetate (332 mg, 69% purity), 7-(5-fluoro-5-((R)-pyrrolidin-3-yl)pentyl)-1,2,3,4-tetrahydro-1,8-naphthyridine (17 mg, 0.4 mmol) and diisopropylethylamine (165 mg, 1.2 mmol) in acetonitrile (16 mL) was stirred at room temperature for 1 hour. Solvent was removed in vacuo, and the residue was purified by prep-HPLC A (40-70% MeCN) to give the desired product tert-butyl 2-((3R)-3-(1-fluoro-5-(5,6,7,8-tetrahydro-1,8-naphthyridin-2-yl)pentyl)pyrrolidin-1-yl)-2-(1-((R)-tetrahydrofuran-3-yl)-1H-indazol-7-yl)acetate as a white solid (65 mg). Yield 27% (ESI 592.3 (M+H)+).

Step 5: 2-((3R)-3-(1-fluoro-5-(5,6,7,8-tetrahydro-1, 8-naphthyridin-2-yl)pentyl)pyrrolidin-1-yl)-2-(1-((R)-tetrahydrofuran-3-yl)-1H-indazol-7-yl)acetic acid (Compounds 4-E1 and 4-E2)

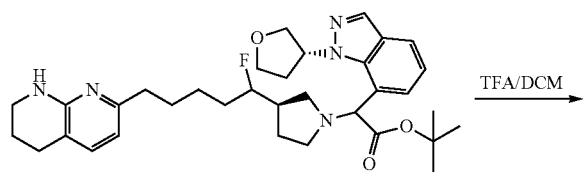

TFA/DCM

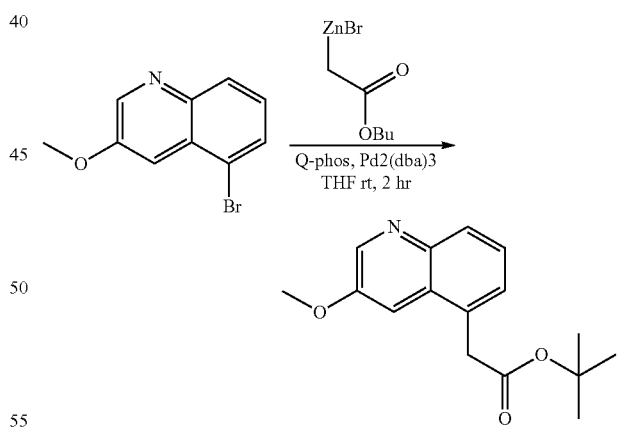

A solution of tert-butyl 2-((R)-3-((S)-1-fluoro-5-(5,6,7,8-tetrahydro-1,8-naphthyridin-2-yl)pentyl)pyrrolidin-1-yl)-2-(1-((R)-tetrahydrofuran-3-yl)-1H-indazol-7-yl)acetate (65 mg, 0.11 mmol) in DCM (4 mL) and TFA (1 mL) was stirred at room temperature overnight. Solvent was removed in vacuo, and the residue was purified by Prep-HPLC A (30-65% MeCN) to give desired products compound 4-E1 (21 mg) and compound 4-E2 (19 mg) as white solids, each as a mixture of 2 stereoisomers.

Compound 4-E1 (mixture of 2 stereoisomers) LC/MS ESI 536.2 (M+H)+. 1H NMR (500 MHz, MeOD) δ 8.10 (s, 1H), 7.76-7.68 (m, 2H), 7.28-7.18 (m, 2H), 6.42 (m, 1H), 6.13 (m, 1H), 5.10 (m, 1H), 4.55-3.95 (m, 5H), 3.33-2.85 (m, 6H), 2.72 (m, 2H), 2.61-2.31 (m, 5H), 2.05-1.45 (m, 11H).

Compound 4-E2 (mixture of 2 stereoisomers) LC/MS ESI 536.2 (M+H)+. 1H NMR (500 MHz, MeOD) δ 8.08 (s, 1H), 7.61-7.73 (m, 2H), 7.35 (m, 1H), 7.15 (m, 1H), 6.46 (m, 1H), 6.13 (m, 1H), 5.10 (m, 1H), 4.61 (m, 1H), 4.25-3.95 (m, 4H), 3.40 (m, 2H), 3.25-2.95 (m, 3H), 2.75-2.35 (m, 8H), 2.15-1.45 (m, 11H).

Example 5: Preparation of 2-(3-methoxyquinolin-5-yl)-2-((R)-3-(4-(5,6,7,8-tetrahydro-1,8-naphthyridin-2-yl)butoxy)pyrrolidin-1-yl)acetic acid (Compound 5)

Step 1: 5-bromo-3-methoxyquinoline

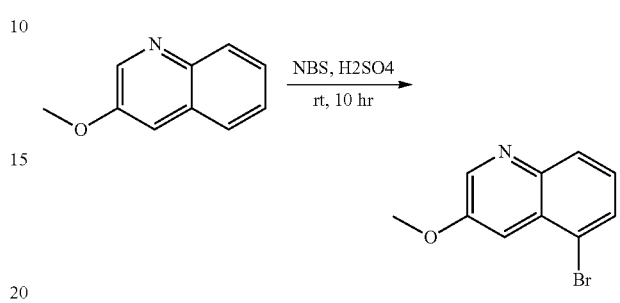

To a mixture of 3-methoxyquinoline (450 mg, 2.8 mmol) in $H_2SO_4$ (6 mL) at 0° C. was added NBS (500 mg, 2.8 mmol) in portions. The mixture was warmed to room temperature and stirred for 10 hours, then poured onto ice, adjusted to pH 6-7 with 4N NaOH solution and extracted with EtOAc (2×20 mL). The combined organic phase was concentrated in vacuo, and the residue was purified by silica gel column (pet ether:EtOAc 10:1) to give the desired product 5-bromo-3-methoxyquinoline as a white solid (400 mg). Yield 60%. (ESI 238.0 (M+H)+). 1H NMR (400 MHz, CDCl3) δ:8.59 (s, 1H), 7.97-7.95 (d, 1H), 7.87-7.85 (d, 1H), 7.79 (s, 1H), 7.50-7.46 (t, 1H), 4.02 (s, 3H).

Step 2: tert-butyl 2-(3-methoxyquinolin-5-yl)acetate

To a mixture of 5-bromo-3-methoxyquinoline (400 mg, 1.7 mmol), $Pd_2(dba)_3$ (46 mg, 0.05 mmol) and Q-phos (36 mg, 0.05 mmol) in THF (8 mL) was added (2-tert-butoxy-2-oxoethyl)zinc(II) bromide solution 1 M in THF (8.5 mL, 8.5 mmol) at room temperature under Ar. The reaction was stirred at room temperature for 2 hours, then quenched with $NaHCO_3$ solution, filtered and concentrated in vacuo. The residue was purified by silica gel column (pet ether:EtOAc 10:1) to give the desired product as a yellow oil (240 mg). Yield 51% (ESI 274.0 (M+H)+).

93

Step 3: tert-butyl
2-bromo-2-(3-methoxyquinolin-5-yl)acetate

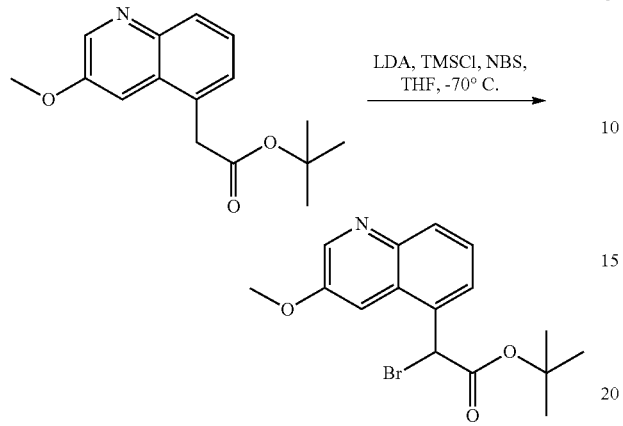

94

To a solution of tert-butyl 2-(3-methoxyquinolin-5-yl)acetate (240 mg, 0.88 mmol) in THF (6 mL) at −78° C. was added lithium diisopropylamide solution 2.0 M in THF/hexanes (1.8 mL, 1.8 mmol) dropwise. The reaction was stirred at −78° C. for 30 min. Then chlorotrimethylsilane (190 mg, 1.76 mmol) was added, and the reaction was stirred at −78° C. for another 30 min. Then a solution of NBS (314 mg, 1.76 mmol) in THF (2 mL) was added, and the reaction was stirred at −78° C. for 1 hour, then quenched with MeOH (2 mL) and concentrated in vacuo. The residue was purified by silica gel column (pet ether:EtOAc 8:1) to give the desired product tert-butyl 2-bromo-2-(3-methoxyquinolin-5-yl)acetate as a yellow oil (130 mg). Yield 42%. (ESI 352.0 (M+H)+).

Step 4: tert-butyl 2-(3-methoxyquinolin-5-yl)-2-((R)-3-(4-(5,6,7,8-tetrahydro-1,8-naphthyridin-2-yl)butoxy)pyrrolidin-1-yl)acetate

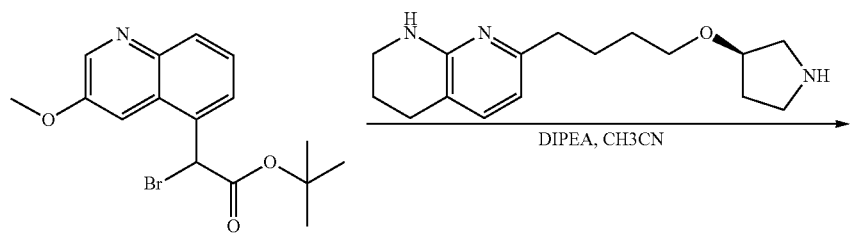

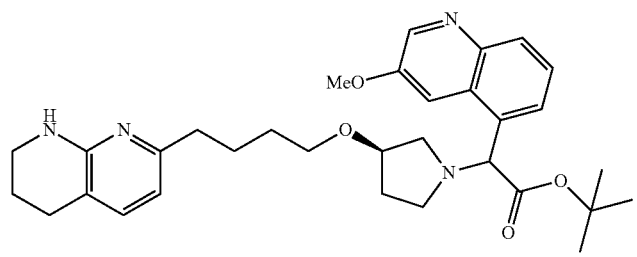

A mixture of tert-butyl 2-bromo-2-(3-methoxyquinolin-5-yl)acetate (130 mg, 0.37 mmol), (R)-7-(4-(pyrrolidin-3-yloxy)butyl)-1,2,3,4-tetrahydro-1,8-naphthyridine (100 mg, 0.37 mmol) and diisopropylethylamine (95 mg, 0.74 mmol) in acetonitrile (8 mL) was stirred at room temperature for 3 hours. Solvent was removed in vacuo, and the residue was purified by silica gel column (DCM:MeOH 10:1) to give the desired product tert-butyl 2-(3-methoxyquinolin-5-yl)-2-((R)-3-(4-(5,6,7,8-tetrahydro-1,8-naphthyridin-2-yl)butoxy)pyrrolidin-1-yl)acetate as a yellow oil (85 mg). Yield 42%. (ESI 547.0 (M+H)+).

Step 5: 2-(3-methoxyquinolin-5-yl)-2-((R)-3-(4-(5,6,7,8-tetrahydro-1,8-naphthyridin-2-yl)butoxy)pyrrolidin-1-yl)acetic acid (Compound 5)

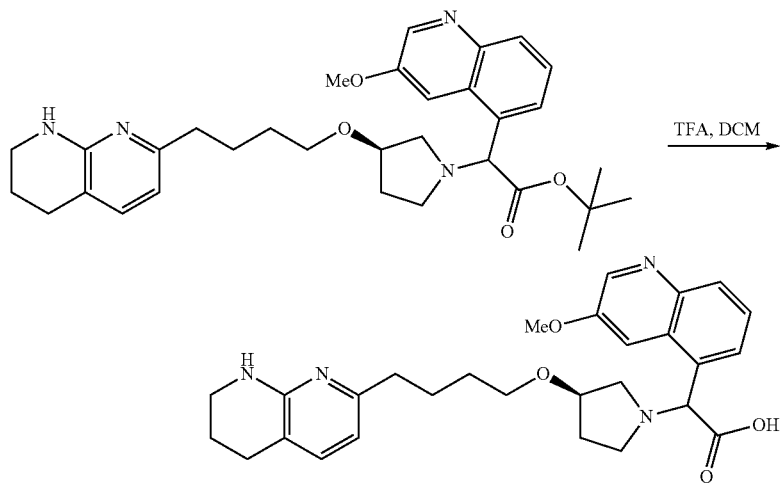

To a solution of tert-butyl 2-(3-methoxyquinolin-5-yl)-2-((R)-3-(4-(5,6,7,8-tetrahydro-1,8-naphthyridin-2-yl)butoxy)pyrrolidin-1-yl)acetate (85 mg, 0.16 mmol) in DCM (5 mL) was added TFA (0.5 mL). The mixture was stirred at room temperature for 18 hours, then concentrated in vacuo. The residue was purified by Prep-HPLC A (30-65% MeCN) to give compound 5 as a white solid (40 mg, 51% yield).

Compound 5 LC/MS ESI 491.2 (M+H)+. $^1$H NMR (500 MHz, MeOD) δ 8.56 (dd, J=5.7, 2.7 Hz, 1H), 8.09-7.79 (m, 3H), 7.58-7.51 (m, 1H), 7.16 (t, J=8.3 Hz, 1H), 6.35 (d, J=7.3 Hz, 1H), 5.26 (d, 1H), 4.10 (s, 1H), 3.98 (d, 3H), 3.55-3.03 (m, 7H), 2.62-2.50 (m, 4H), 2.25-2.05 (m, 2H), 1.81-1.46 (m, 7H).

Example 6: Preparation of 2-((S)-3-(2,2-difluoro-5-(5,6,7,8-tetrahydro-1,8-naphthyridin-2-yl)pentyl)pyrrolidin-1-yl)-2-(1-((S)-tetrahydrofuran-3-yl)-1H-indazol-7-yl)acetic acid (Compound 6)

Step 1: tert-butyl 2-((S)-3-(2,2-difluoro-5-(5,6,7,8-tetrahydro-1,8-naphthyridin-2-yl)pentyl)pyrrolidin-1-yl)-2-(1-((S)-tetrahydrofuran-3-yl)-1H-indazol-7-yl)acetate

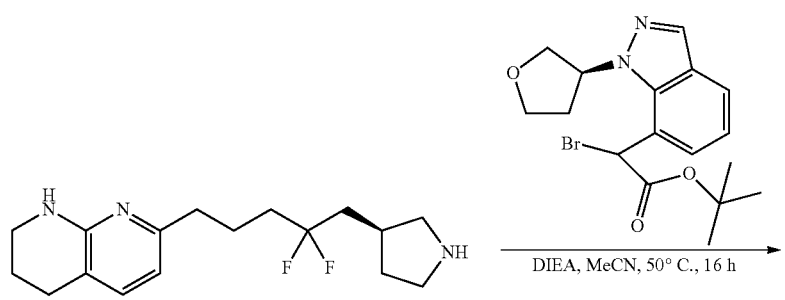

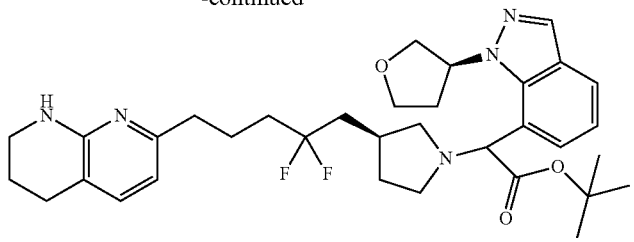

A mixture of (S)-7-(4,4-difluoro-5-(pyrrolidin-3-yl)pentyl)-1,2,3,4-tetrahydro-1,8-naphthyridine (200 mg, 0.65 mmol tert-butyl 2-bromo-2-(1-((S)-tetrahydrofuran-3-yl)-1H-indazol-7-yl)acetate (298 mg, 0.78 mmol) and diisopropylethylamine (252 mg, 1.95 mmol) in acetonitrile (8 mL) was stirred at 50° C. for 16 hours. Solvent was removed in vacuo, and the residue was purified by silica gel column (DCM:MeOH 20:1) to give the desired product tert-butyl 2-((S)-3-(2,2-difluoro-5-(5,6,7,8-tetrahydro-1,8-naphthyridin-2-yl)pentyl)pyrrolidin-1-yl)-2-(1-((S)-tetrahydrofuran-3-yl)-1H-indazol-7-yl)acetate as a yellow oil (120 mg). Yield 30% (ESI 610 (M+H)+).

Step 2: 2-((S)-3-(2,2-difluoro-5-(5,6,7,8-tetrahydro-1,8-naphthyridin-2-yl)pentyl)pyrrolidin-1-yl)-2-(1-((S)-tetrahydrofuran-3-yl)-1H-indazol-7-yl)acetic acid (Compound 6)

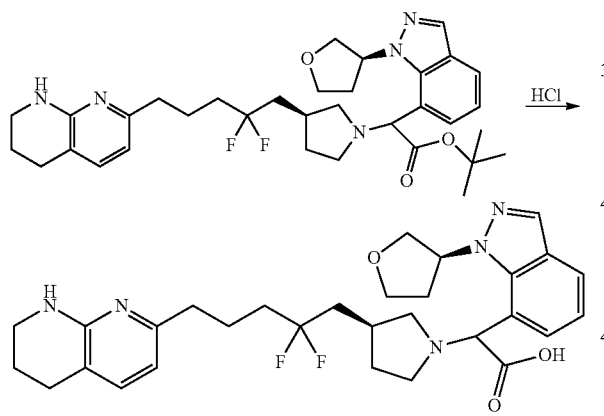

Tert-butyl 2-((S)-3-(2,2-difluoro-5-(5,6,7,8-tetrahydro-1,8-naphthyridin-2-yl)pentyl)pyrrolidin-1-yl)-2-(1-((S)-tetrahydrofuran-3-yl)-1H-indazol-7-yl)acetate (120 mg, 0.20 mmol) was treated with HCl in 1,4-dioxane (4M, 4 mL) at 25° C. for 2 hours. Solvent was removed in vacuo, and the residue was purified by Prep-HPLC A (33-65% MeCN) to give the desired product 2-((S)-3-(2,2-difluoro-5-(5,6,7,8-tetrahydro-1,8-naphthyridin-2-yl)pentyl)pyrrolidin-1-yl)-2-(1-((S)-tetrahydrofuran-3-yl)-1H-indazol-7-yl)acetic acid (compound 6) as a white solid (101 mg, 91% yield).

Compound 6 LC/MS ESI 554.6 (M+H)+. 1H NMR (400 MHz, MeOD) δ 8.12 (s, 1H), 7.81-7.66 (m, 2H), 7.23-7.17 (m, 2H), 6.08-5.30 (m, 1H), 4.24-4.20 (m, 3H), 4.08-3.90 (m, 1H), 3.45-3.61 (m, 3H), 3.05-2.73 (m, 2H), 2.80-2.36 (m, 8H), 2.23-2.09 (m, 3H), 1.97-1.58 (m, 8H).

Additional Examples

Compounds 7-41 were prepared using general procedures based on the methods used to prepare compounds 1-6.

2-[2-(propan-2-yl)-1,3-benzoxazol-4-yl]-2-[(3R)-3-[4-(5,6,7,8-tetrahydro-1,8-naphthyridin-2-yl)butoxy]pyrrolidin-1-yl]acetic acid (Compound 7)

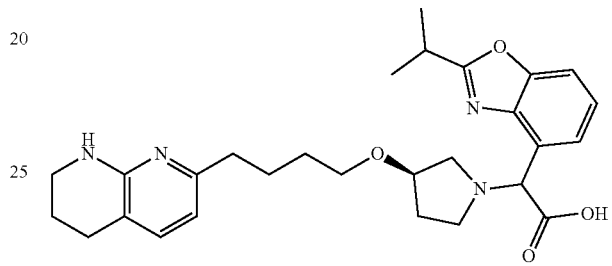

Compound 7 LC/MS ESI 493 (M+H)+ 1H NMR (400 MHz, MeOD) δ 7.63 (d, J=8.4 Hz, 1H), 7.57 (t, J=6.8 Hz, 1H), 7.40 (t, J=8.4 Hz, 1H), 7.17 (d, J=7.2 Hz, 1H), 6.42-6.39 (m, 1H), 5.25-5.20 (m, 1H), 4.20-4.14 (m, 1H), 3.33-3.13 (m, 9H), 2.72 (t, J=6.0 Hz, 2H), 2.57 (t, J=6.0 Hz, 2H), 2.08-2.04 (m, 2H), 1.88-1.85 (m, 2H), 1.69-1.46 (m, 4H), 1.45-1.40 (m, 6H).

2-(1-(cyclopropylmethyl)-1H-indazol-7-yl)-2-((R)-3-(4-(5,6,7,8-tetrahydro-1,8-naphthyridin-2-yl)butoxy)pyrrolidin-1-yl)acetic acid (Diastereomeric Compounds 8-E1 and 8-E2)

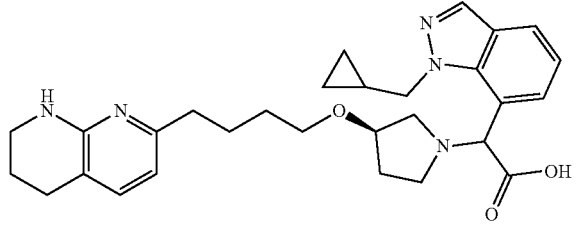 [SMILES: O=C(O)C(c1cccc2cnn(CC3CC3)c12)N1CC[C@@H](OCCCCc2ccc3c(n2)NCCC3)C1]

Compound 8-E1 LC/MS ESI 504.2 (M+H)+. 1H NMR (500 MHz, MeOD) δ 8.01 (s, 1H), 7.76 (d, J=8.0 Hz, 1H), 7.66 (d, J=7.4 Hz, 1H), 7.31 (d, J=7.3 Hz, 1H), 7.14 (t, J=7.7 Hz, 1H), 6.42 (d, J=7.3 Hz, 1H), 5.24 (s, 1H), 4.64-4.59 (m, 2H), 4.10 (s, 1H), 3.48-3.16 (m, 7H), 2.69 (t, J=6.1 Hz, 2H), 2.62-2.56 (m, 2H), 2.13-2.08 (m, 2H), 1.85-1.52 (m, 8H), 0.45-0.35 (m, 4H).

Compound 8-E2 LC/MS ESI 504.2 (M+H)+. 1H NMR (500 MHz, MeOD) δ 8.01 (s, 1H), 7.76 (d, J=8.0 Hz, 1H), 7.65 (d, J=7.2 Hz, 1H), 7.29 (d, J=7.4 Hz, 1H), 7.15 (t, J=7.6 Hz, 1H), 6.42 (d, J=7.3 Hz, 1H), 5.36 (s, 1H), 4.69-4.65 (m, 1H), 4.48-4.41 (m, 1H), 4.11 (s, 1H), 3.59-3.32 (m, 5H), 3.12-3.02 (m, 2H), 2.70-2.54 (m, 4H), 2.09-1.92 (m, 2H), 1.71-1.49 (m, 8H), 0.48-0.32 (m, 4H).

2-(2-(cyclopropylmethyl)-1H-indazol-7-yl)-2-((R)-3-(4-(5,6,7,8-tetrahydro-1,8-naphthyridin-2-yl)butoxy) pyrrolidin-1-yl)acetic acid (Compound 9)

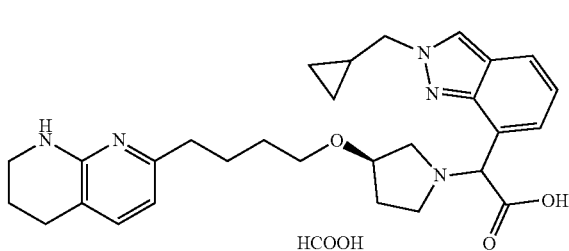 [SMILES: O=C(O)C(c1cccc2cn(CC3CC3)nc12)N1CC[C@@H](OCCCCc2ccc3c(n2)NCCC3)C1 ; "HCOOH"]

Compound 9 LC/MS ESI 504.2 (M+H)+. H NMR (500 MHz, MeOD) δ 8.51 (s, 1H), 8.38-8.37 (m, 1H), 7.71-7.67 (m, 1H), 7.46-7.33 (m, 2H), 7.06-7.01 (m, 1H), 6.49-6.45 (m, 1H), 5.46-5.16 (m, 1H), 4.17-4.02 (m, 3H), 3.43-3.20 (m, 5H), 3.18-3.08 (m, 2H), 2.73-2.52 (m, 4H), 2.06-1.26 (m, 10H), 0.54-0.30 (m, 4H).

2-(1-(cyclopropylmethyl)-1H-indazol-4-yl)-2-((R)-3-(4-(5,6,7,8-tetrahydro-1,8-naphthyridin-2-yl)butoxy) pyrrolidin-1-yl)acetic acid (Compound 10)

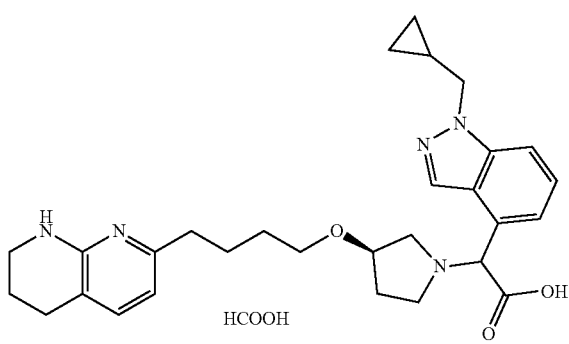 [SMILES: O=C(O)C(c1cccc2c1cnn2CC1CC1)N1CC[C@@H](OCCCCc2ccc3c(n2)NCCC3)C1 ; "HCOOH"]

Compound 10 LC/MS ESI 504.3 (M+H)+. ¹H NMR (500 MHz, MeOD) δ 8.46 (s, 1H), 8.24-8.20 (m, 1H), 7.66-7.62 (m, 1H), 7.42-7.36 (m, 2H), 7.32-7.27 (m, 1H), 6.48 (t, J=7.8 Hz, 1H), 5.08-4.98 (m, 1H), 4.27-4.11 (m, 3H), 3.47-3.26 (m, 6H), 3.16-2.98 (m, 1H), 2.69-2.60 (m, 4H), 2.09-2.04 (m, 2H), 1.80-1.54 (m, 6H), 1.23-1.21 (m, 1H), 0.47-0.39 (m, 2H), 0.35-0.28 (m, 2H).

2-(2-(cyclopropylmethyl)-1H-indazol-4-yl)-2-((R)-3-(4-(5,6,7,8-tetrahydro-1,8-naphthyridin-2-yl)butoxy) pyrrolidin-1-yl)acetic acid (Compound 11)

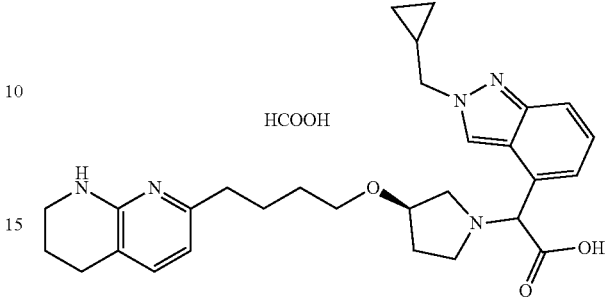

Compound 11 LC/MS ESI 504.3 (M+H)+. ¹H NMR (500 MHz, MeOD) δ 8.50 (d, J=7.5 Hz, 1H), 8.28 (s, 1H), 7.67-7.64 (m, 1H), 7.42 (s, 1H), 7.31-7.19 (m, 2H), 6.53-6.46 (m, 1H), 4.99-4.88 (m, 1H), 4.25-4.15 (m, 3H), 3.49-3.32 (m, 6H), 3.15-3.03 (m, 1H), 2.70-2.64 (m, 4H), 2.15-1.38 (m, H), 0.61-0.43 (m, 4H).

2-(isoquinolin-4-yl)-2-((R)-3-(4-(5,6,7,8-tetrahydro-1,8-naphthyridin-2yl)butoxy) pyrrolidin-1-yl)acetic acid (Compound 12)

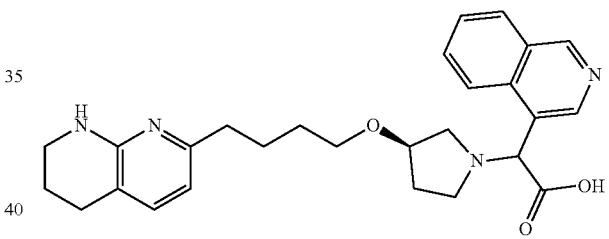

Compound 12 LC/MS ESI 561 (M+H)+. 1H NMR (500 MHz, MeOD) δ 9.26 (d, J=10.0 Hz, 1H), 8.75 (d, J=8.5 Hz, 1H), 8.58-8.46 (m, 1H), 8.19 (t, J=7.5 Hz, 1H), 7.85-7.75 (m, 2H), 7.28 (t, J=7.5 Hz, 1H), 6.47-6.45 (m, 1H), 5.25-5.14 (m, 1H), 4.15-4.14 (m, 1H), 3.50-3.32 (m, 4H), 3.30-2.96 (m, 4H), 2.74-2.63 (m, 4H), 2.19-2.06 (m, 2H), 1.88-1.84 (m, 1H), 1.76-1.65 (m, 4H).

2-(quinolin-5-yl)-2-((R)-3-(4-(5,6,7,8-tetrahydro-1,8-naphthyridin-2-yl)butoxy)pyrrolidin-1-yl)acetic acid (Diastereomeric Compounds 13-E1 and 13-E2)

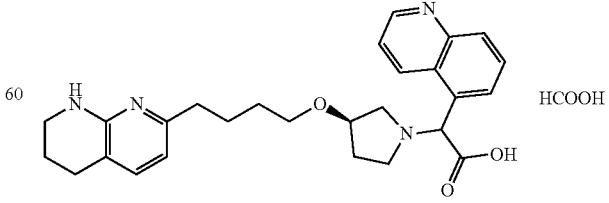

Compound 13-E1 LC/MS ESI 461 (M+H)+ ¹H NMR (400 MHz, MeOD) δ 8.91 (d, J=5.6 Hz, 1H), 8.47 (s, 1H), 8.14

(d, J=8.8 Hz, 1H), 8.02 (d, J=7.8 Hz, 1H), 7.85 (t, J=8.0 Hz, 1H), 7.63-7.61 (m, 1H), 7.46 (d, J=7.2 Hz, 1H), 6.53 (d, J=6.4 Hz, 1H), 5.51 (s, 1H), 4.22-4.20 (m, 1H), 3.56-3.30 (m, 8H), 2.78-2.60 (m, 4H), 2.22-1.50 (m, 8H).

Compound 13-E2 LC/MS ESI 461 (M+H)+ 1H NMR (400 MHz, MeOD) δ δ 8.93-8.83 (m, 2H), 8.50 (s, 1H), 8.14 (d, J=8.4 Hz, 1H), 8.00 (d, J=7.8 Hz, 1H), 7.85 (t, J=8.0 Hz, 1H), 7.63-7.61 (m, 1H), 7.44 (d, J=7.2 Hz, 1H), 6.53 (d, J=7.8 Hz, 1H), 5.56 (s, 1H), 4.22-4.20 (m, 1H), 3.58-3.30 (m, 8H), 2.78-2.60 (m, 4H), 2.22-1.50 (m, 8H).

2-(isoquinolin-5-yl)-2-((R)-3-(4-(5,6,7,8-tetrahydro-1,8-naphthyridin-2-yl)butoxy) pyrrolidin-1-yl)acetic acid (Compound 14)

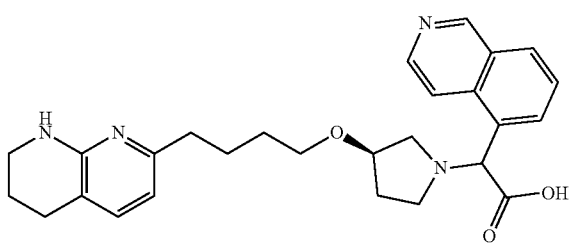 [SMILES: O=C(O)C(c1cccc2cnccc12)N1CC[C@@H](OCCCCc2ccc3c(n2)NCCC3)C1]

Compound 14 LC/MS ESI 461 (M+H)+ 1H NMR (400 MHz, MeOD) δ 9.61-9.60 (m, 1H), 8.45-8.13 (m, 4H), 7.77-7.71 (m, 1H), 7.25-7.22 (m, 1H), 6.43 (d, J=7.6 Hz, 1H), 5.31-5.22 (m, 1H), 4.16-4.13 (m, 1H), 3.50-2.95 (m, 8H), 2.72-2.50 (m, 4H), 2.20-1.50 (m, 8H).

2-(isoquinolin-8-yl)-2-((R)-3-(4-(5,6,7,8-tetrahydro-1,8-naphthyridin-2-yl)butoxy) pyrrolidin-1-yl)acetic acid (compound MRT-15)

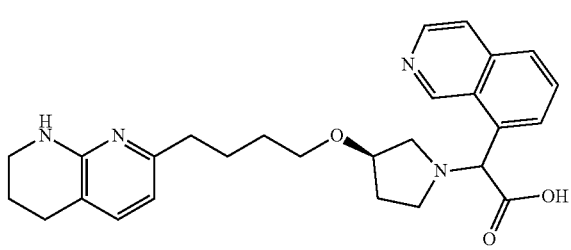 [SMILES: O=C(O)C(c1cccc2ccncc12)N1CC[C@@H](OCCCCc2ccc3c(n2)NCCC3)C1]

Compound 15 LC/MS ESI 461.4 (M+H)+ 1H NMR (400 MHz, MeOD) δ 9.82-9.74 (m, 1H), 8.42-8.40 (m, 1H), 7.86-7.55 (m, 4H), 7.18-7.16 (m, 1H), 6.34 (d, J=7.2 Hz, 1H), 5.32-5.22 (m, 1H), 4.06-4.04 (m, 1H), 3.71-3.69 (m, 2H), 3.42-2.88 (m, 6H), 2.63-2.48 (m, 4H), 2.10-1.92 (m, 2H), 1.80-1.42 (m, 6H).

2-(1-benzothiophen-4-yl)-2-[(3R)-3-[4-(5,6,7,8-tetrahydro-1,8-naphthyridin-2-yl)butoxy]pyrrolidin-1-yl]acetic acid (Compound 16)

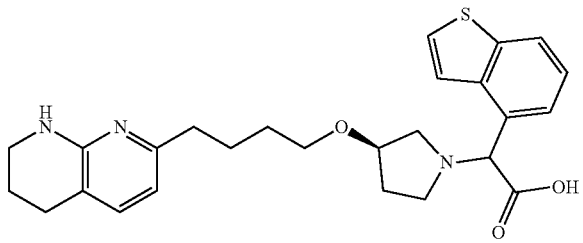 [SMILES: O=C(O)C(c1cccc2sccc12)N1CC[C@@H](OCCCCc2ccc3c(n2)NCCC3)C1]

Compound 16 LC/MS ESI 466 (M+H)+ 1H NMR (400 MHz, MeOD) δ 8.07-8.01 (m, 1H), 7.76-7.63 (m, 3H), 7.48-7.41 (m, 2H), 6.57-6.52 (m, 1H), 5.37-5.23 (m, 1H), 4.21-4.20 (m, 1H), 3.75-3.41 (m, 5H), 3.31-3.05 (m, 2H), 2.73-2.67 (m, 4H), 2.16-2.10 (m, 2H), 1.67-1.61 (m, 6H).

2-(1-benzothiophen-7-yl)-2-[(3R)-3-[4-(5,6,7,8-tetrahydro-1,8-naphthyridin-2-yl)butoxy] pyrrolidin-1-yl]acetic acid (Compound 17)

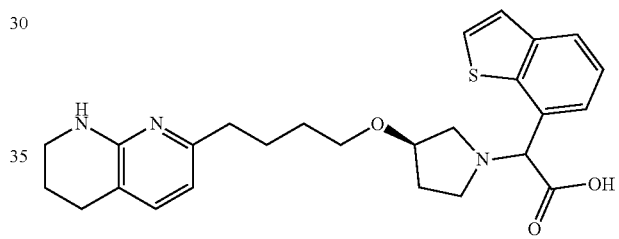

Compound 17 LC/MS ESI 466 (M+H)+ 1H NMR (400 MHz, MeOD) δ 7.98-7.93 (m, 1H), 7.66-7.58 (m, 2H), 7.52-7.45 (m, 3H), 6.60-6.54 (m, 1H), 5.14-4.95 (m, 1H), 4.24-4.18 (m, 1H), 3.75-3.41 (m, 5H), 3.31-3.05 (m, 2H), 2.73-2.67 (m, 4H), 2.16-2.10 (m, 2H), 1.67-1.61 (m, 6H).

2-(1-methyl-1H-indol-4-yl)-2-((R)-3-(4-(5,6,7,8-tetrahydro-1,8-naphthyridin-2-yl)butoxy)pyrrolidin-1-yl)acetic acid (Compound 18)

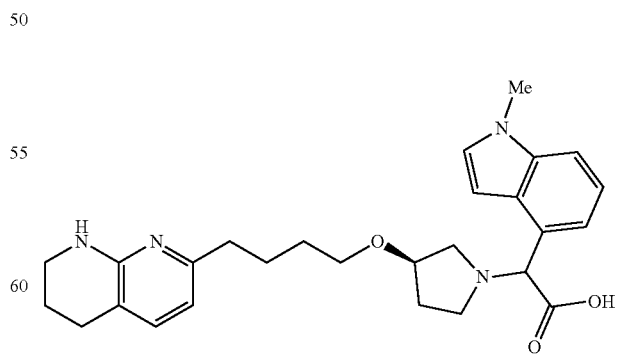

Compound 18 LC/MS ESI 462.9 (M+H)+ 1H NMR (500 MHz, MeOD) δ 7.47-7.16 (m, 5H), 6.77-6.71 (m, 1H), 6.42-6.37 (m, 1H), 5.03-4.99 (m, 1H), 4.16-4.08 (m, 1H), 3.82 (s, 3H), 3.68-3.15 (m, 8H), 2.65-2.52 (m, 4H), 2.16-1.98 (m, 2H), 1.88-1.52 (m, 6H).

2-(1-methyl-1H-indazol-7-yl)-2-((R)-3-(4-(5,6,7,8-tetrahydro-1,8-naphthyridin-2-yl)butoxy)pyrrolidin-1-yl)acetic acid (Compound 19)

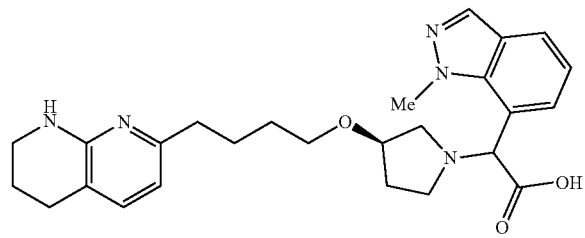 [SMILES: Cn1ncc2cccc(C(C(=O)O)N3CC[C@@H](OCCCCc4ccc5c(n4)NCCC5)C3)c21]

Compound 19 LC/MS ESI 464.3 (M+H)+ ¹H NMR (400 MHz, MeOD) δ 8.03 (s, 1H), 7.78 (d, J=8.0 Hz, 1H), 7.69 (d, J=7.2 Hz, 1H), 7.29-7.16 (m, 2H), 6.42-6.37 (m, 1H), 5.40-5.37 (m, 1H), 4.46-4.37 (m, 3H), 4.17 (s, 1H), 3.53-3.41 (m, 2H), 3.40-3.35 (m, 3H), 3.20-3.05 (m, 2H), 2.74-2.71 (m, 2H), 2.62-2.56 (m, 2H), 2.18-1.98 (m, 2H), 1.92-1.82 (m, 2H), 1.79-1.56 (m, 5H).

2-(2-methoxyquinolin-5-yl)-2-((R)-3-(4-(5,6,7,8-tetrahydro-1,8-naphthyridin-2-yl)butoxy)pyrrolidin-1-yl)acetic acid (Compound 20)

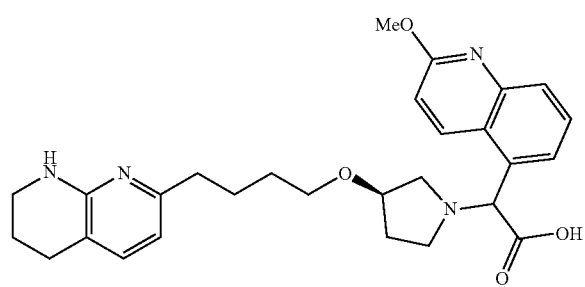 [SMILES: COc1ccc2c(C(C(=O)O)N3CC[C@@H](OCCCCc4ccc5c(n4)NCCC5)C3)cccc2n1]

Compound 20 LC/MS ESI 491 (M+H)+. 1H NMR (500 MHz, MeOD) δ 8.71-8.59 (m, 1H), 7.90-7.88 (m, 1H), 7.76-7.67 (m, 2H), 7.21-7.19 (m, 1H), 6.94-6.92 (m, 1H), 6.42-6.40 (m, 1H), 5.30-5.25 (m, 1H), 4.19-4.13 (m, 1H), 4.07 (s, 3H), 3.50-3.36 (m, 3H), 3.22-3.00 (m, 3H), 2.72-2.69 (m, 2H), 2.61-2.57 (m, 2H), 2.16-2.07 (m, 2H), 1.88-1.84 (m, 2H), 1.77-1.63 (m, 5H).

2-(4-methoxyisoquinolin-8-yl)-2-[(3R)-3-[4-(5,6,7,8-tetrahydro-1,8-naphthyridin-2-yl)butoxy]pyrrolidin-1-yl]acetic acid (Compound 21)

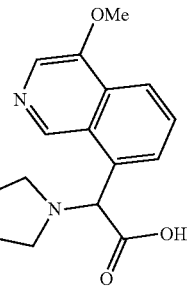

Compound 21 LC/MS ESI 491 (M+H)+ ¹H NMR (400 MHz, MeOD) δ 9.63-9.60 (m, 1H), 8.24 (d, J=8.0 Hz, 1H), 8.07-8.03 (m, 2H), 7.77-7.73 (m, 1H), 7.17 (d, J=7.2 Hz, 1H), 6.39-6.36 (m, 1H), 5.01-4.97 (m, 1H), 4.10-4.02 (m, 4H), 3.42-3.23 (m, 4H), 2.98-2.50 (m, 8H), 2.18-1.56 (m, 8H).

2-((R)-3-(1,1-difluoro-5-(5,6,7,8-tetrahydro-1,8-naphthyridin-2-yl)pentyl)pyrrolidin-1-yl)-2-(1-methyl-1H-indazol-7-yl)acetic acid (Compound 22)

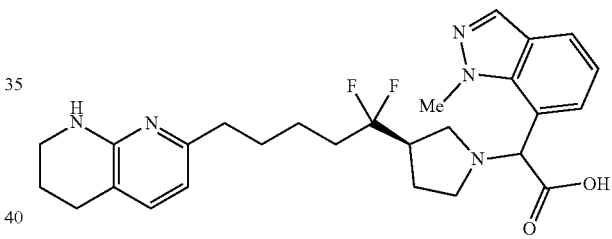

Compound 22 LC/MS ESI 498.3 (M+H)+ ¹H NMR (400 MHz, MeOD) δ 8.03 (s, 1H), 7.79-7.70 (m, 2H), 7.36 (d, J=7.2 Hz, 1H), 7.20 (t, J=7.2 Hz, 1H), 6.48-6.46 (m, 1H), 5.22 (s, 1H), 4.48 (s, 3H), 3.43-3.39 (m, 3H), 3.22-2.80 (m, 2H), 2.76 (t, J=6.0 Hz, 2H), 2.63 (t, J=6.8 Hz, 2H), 2.21-1.80 (m, 6H), 1.76-1.62 (m, 2H), 1.58-1.55 (m, 2H).

2-(1-(oxetan-3-yl)-1H-indazol-7-yl)-2-((R)-3-(4-(5,6,7,8-tetrahydro-1,8-naphthyridin-2-yl)butoxy)pyrrolidin-1-yl)acetic acid (Compound 23)

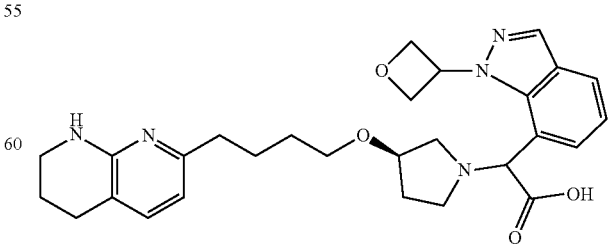

Compound 23 LC/MS ESI 506 (M+H)+. ¹H NMR (400 MHz, MeOD) δ 8.19 (s, 1H), 7.76-7.52 (m, 2H), 7.35-7.12

(m, 2H), 6.45-6.42 (m, 1H), 5.27-5.05 (m, 5H), 4.25 (s, 1H), 3.48-3.26 (m, 5H), 3.12-3.02 (m, 1H), 2.74-2.53 (m, 5H), 2.04-1.52 (m, 8H).

2-((R)-3-(4-(5,6,7,8-tetrahydro-1,8-naphthyridin-2-yl)butoxy)pyrrolidin-1-yl)-2-(1-(tetrahydro-2H-pyran-4-yl)-1H-indazol-7-yl)acetic acid (Compound 24)

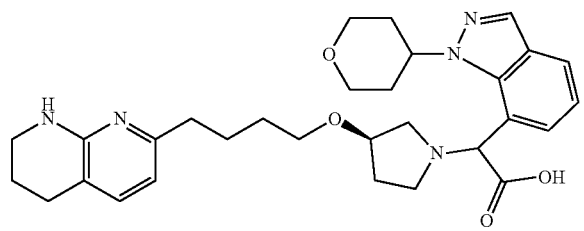 [SMILES: O=C(O)C(c1cccc2cnn(C3CCOCC3)c12)N1CC[C@@H](OCCCCc2ccc3c(n2)NCCC3)C1]

Compound 24 LC/MS ESI 534.3 (M+H)+. $^1$H NMR (400 MHz, MeOD) δ 8.10 (s, 1H), 7.75-7.62 (m, 2H), 7.38 (d, J=7.4 Hz, 1H), 7.15 (t, J=7.6 Hz, 1H), 6.48 (d, J=7.3 Hz, 1H), 5.47 (s, 1H), 5.10 (s, 1H), 4.47-3.81 (m, 3H), 3.84-3.36 (m, 5H), 3.16-3.12 (m, 2H), 2.88-2.53 (m, 5H), 2.44-2.34 (m, 2H), 2.20-1.26 (m, 12H).

2-(1-methyl-1H-benzo[d]imidazol-7-yl)-2-((R)-3-(4-(5,6,7,8-tetrahydro-1,8-naphthyridin-2-yl)butoxy)pyrrolidin-1-yl)acetic acid (Compound 25)

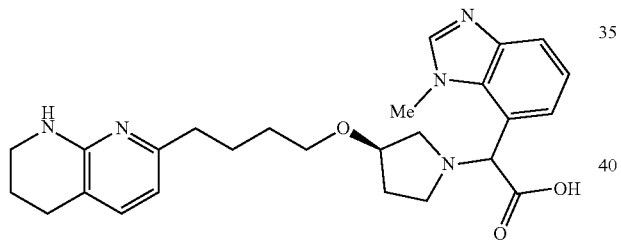

Compound 25 LC/MS ESI 464.2 (M+H)+. $^1$H NMR (400 MHz, MeOD) δ 8.25-7.97 (m, 1H), 7.79-7.48 (m, 2H), 7.40-7.03 (m, 2H), 6.39 (d, J=7.3 Hz, 1H), 5.30 (d, J=8.2 Hz, 1H), 4.43-4.01 (m, 4H), 3.62-3.32 (m, 6H), 3.26-2.97 (m, 2H), 2.80-2.49 (m, 4H), 2.31-1.94 (m, 2H), 1.89-1.84 (m, 2H), 1.80-1.46 (m, 4H).

2-(1-(2-methoxyethyl)-1H-indazol-7-yl)-2-((R)-3-(4-(5,6,7,8-tetrahydro-1,8-naphthyridin-2-yl)butoxy)pyrrolidin-1-yl)acetic acid (Compound 26)

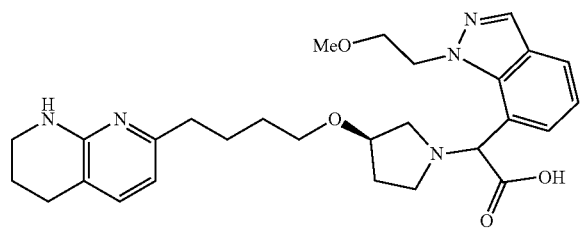 [SMILES: COCCn1ncc2cccc(C(C(=O)O)N3CC[C@@H](OCCCCc4ccc5c(n4)NCCC5)C3)c21]

Compound 26 LC/MS ESI 508.2 (M+H)+. $^1$H NMR (400 MHz, MeOD) δ 8.09-8.08 (m, 1H), 7.72 (d, J=7.4 Hz, 2H), 7.25-7.08 (m, 2H), 6.43-6.28 (m, 1H), 5.65-5.23 (m, 2H), 4.82-4.60 (m, 1H), 4.11 (s, 1H), 3.90-3.85 (m, 2H), 3.56-3.26 (m, 9H), 3.15-3.12 (m, 1H), 2.79-2.46 (m, 4H), 2.23-1.98 (m, 2H), 1.96-1.80 (m, 2H), 1.79-1.40 (m, 5H).

2-(3-methyl-1-(oxetan-3-yl)-1H-indazol-7-yl)-2-((R)-3-(4-(5,6,7,8-tetrahydro-1,8-naphthyridin-2-yl)butoxy)pyrrolidin-1-yl)acetic acid (Compound 27)

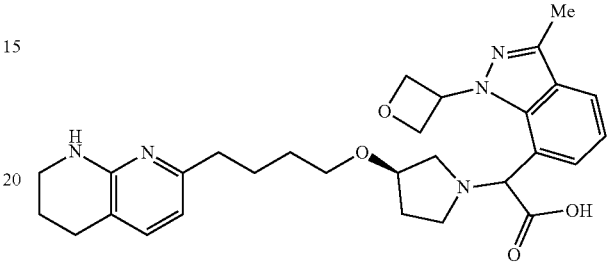

Compound 27 LC/MS ESI 520 (M+H)+. $^1$H NMR (400 MHz, MeOD) δ 7.81-7.58 (m, 2H), 7.38-7.04 (m, 2H), 6.43-6.38 (m, 1H), 5.28-4.98 (m, 5H), 4.06-4.02 (m, 1H), 3.60-3.32 (m, 5H), 3.16-2.86 (m, 2H), 2.78-2.55 (m, 8H), 2.13-1.40 (m, 8H).

2-((3R)-3-(1-fluoro-5-(5,6,7,8-tetrahydro-1,8-naphthyridin-2-yl)pentyl)pyrrolidin-1-yl)-2-(quinolin-5-yl)acetic acid (Compound 28)

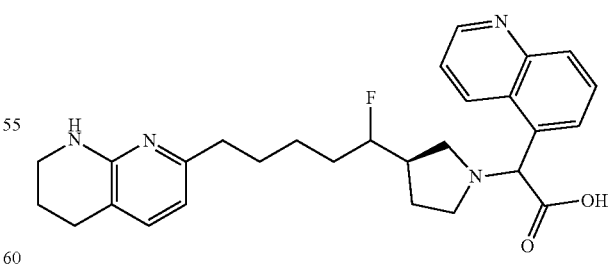

Compound 28 LC/MS ESI 477.2 (M+H)+. $^1$H NMR (400 MHz, MeOD) δ 9.23-8.77 (m, 2H), 8.13-7.92 (m, 2H), 7.88-7.52 (m, 2H), 7.26-7.11 (m, 1H), 6.46-6.29 (m, 1H), 5.30-5.02 (m, 1H), 4.61-4.26 (m, 1H), 3.48-3.33 (m, 2H), 3.24-2.78 (m, 3H), 2.76-2.41 (m, 5H), 2.16-1.77 (m, 4H), 1.77-1.17 (m, 7H).

2-((R)-3-(4-(4-methoxy-5,6,7,8-tetrahydro-1,8-naphthyridin-2-yl)butoxy)pyrrolidin-1-yl)-2-(3-methoxyquinolin-5-yl)acetic acid (Compound 29)

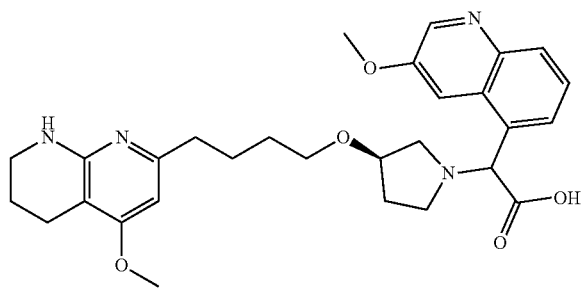 [SMILES: COc1cnc2cccc(C(C(=O)O)N3CC[C@@H](OCCCCc4cc(OC)c5c(n4)NCCC5)C3)c2c1]

Compound 29 LC/MS ESI 521.3 (M+H)+. $^1$H NMR (500 MHz, MeOD) δ 8.66-8.61 (m, 1H), 8.49-8.24 (m, 1H), 8.00-7.98 (m, 1H), 7.88 (t, J=8.4 Hz, 1H), 7.64-7.55 (m, 1H), 6.43-6.39 (m, 1H), 4.15 (s, 1H), 4.02-4.01 (m, 3H), 3.93-3.89 (m, 3H), 3.59-3.50 (m, 2H), 3.24-2.58 (m, 10H), 2.24-1.57 (m, 9H).

2-((R)-3-(4-(5,6,7,8-tetrahydro-1,8-naphthyridin-2-yl)butoxy)pyrrolidin-1-yl)-2-(1-((R)-tetrahydrofuran-3-yl)-1H-indazol-7-yl)acetic acid (Compound 30)

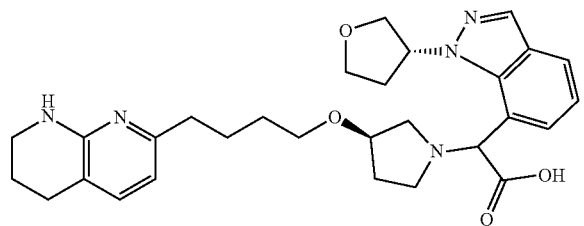 [SMILES: O=C(O)C(c1cccc2cnn([C@@H]3CCOC3)c12)N1CC[C@@H](OCCCCc2ccc3c(n2)NCCC3)C1]

Compound 30 LC/MS ESI 520 (M+H)+. 1H NMR (500 MHz, MeOD) δ 8.09 (s, 1H), 7.78-7.76 (m, 1H), 7.67-7.65 (m, 1H), 7.34-7.32 (m, 1H), 7.19-7.16 (m, 1H), 6.47-6.46 (m, 1H), 5.30-5.19 (m, 1H), 4.26-3.91 (m, 5H), 3.54-3.33 (m, 5H), 3.32-3.02 (m, 3H), 2.77-2.52 (m, 6H), 2.04-1.86 (m, 5H), 1.72-1.60 (m, 4H).

2-((3R)-3-(1-fluoro-5-(5,6,7,8-tetrahydro-1,8-naphthyridin-2-yl)pentyl)pyrrolidin-1-yl)-2-(1-((S)-tetrahydrofuran-3-yl)-1H-indazol-7-yl)acetic acid (Diastereomeric Compounds 31-E1 and 31-E2)

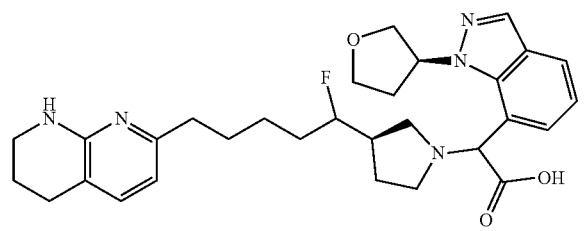 [SMILES: O=C(O)C(c1cccc2cnn([C@H]3CCOC3)c12)N1CC[C@@H](C(F)CCCCc2ccc3c(n2)NCCC3)C1]

Compound 31-E1 (mixture of 2 stereoisomers) LC/MS ESI 536 (M+H)+ $^1$H NMR (500 MHz, MeOD) δ 7.99 (s, 1H), 7.66-7.51 (m, 2H), 7.31 (d, J=7.0 Hz, 1H), 7.09 (s, 1H), 6.36 (d, J=7.0 Hz, 1H), 5.23 (s, 1H), 4.38-3.88 (m, 5H), 3.29-2.99 (m, 7H), 2.64-2.03 (m, 7H), 1.98-1.18 (m, 11H).

Compound 31-E2 (mixture of 2 stereoisomers) LC/MS ESI 536 (M+H)+ $^1$H NMR (500 MHz, MeOD) δ 8.00 (s, 1H), 7.69-7.57 (m, 2H), 7.37 (d, J=7.0 Hz, 1H), 7.10-7.08 (m, 1H), 6.40 (d, J=7.0 Hz, 1H), 5.28 (s, 1H), 4.50-4.39 (m, 1H), 4.11-3.60 (m, 5H), 3.32-2.96 (m, 6H), 2.66-2.44 (m, 7H), 1.98-1.32 (m, 11H).

2-((3R)-3-(1-fluoro-5-(5,6,7,8-tetrahydro-1,8-naphthyridin-2-yl)pentyl)pyrrolidin-1-yl)-2-(1-(trans-3-methoxycyclobutyl)-1H-indazol-7-yl)acetic acid (Diastereomeric Compounds 32-E1, 32-E2 and 32-E3)

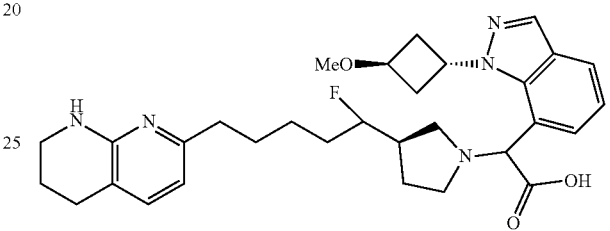

Compound 32-E1 (single stereoisomer) LC/MS ESI 550 (M+H)+ 1H NMR (500 MHz, MeOD) δ 8.15 (s, 1H), 7.83-7.73 (m, 2H), 7.50 (d, J=7.5 Hz, 1H), 7.24-7.22 (m, 1H), 6.53-6.51 (m, 11H), 5.50-5.28 (m, 2H), 4.52-4.38 (m, 2H), 3.45-3.02 (m, 8H), 2.77-2.55 (m, 8H), 2.21-1.44 (m, 10H).

Compound 32-E2 (single stereoisomer) LC/MS ESI 550 (M+H)+ 1H NMR (500 MHz, MeOD) δ 8.02 (s, 1H), 7.71-7.59 (m, 2H), 7.37 (d, J=7.5 Hz, 1H), 7.13-7.11 (m, 1H), 6.45-6.43 (m, 1H), 5.73 (s, 1H), 5.11 (s, 1H), 4.45-4.18 (m, 2H), 3.45-3.02 (m, 8H), 2.77-2.55 (m, 8H), 2.11-1.24 (m, 10H).

Compound 32-E3 (mixture of 2 stereoisomers) LC/MS ESI 550 (M+H)+ $^1$H NMR (500 MHz, MeOD) δ 8.15 (s, 1H), 7.84-7.71 (m, 2H), 7.55 (d, 0.1=7.5 Hz, 1H), 7.25-7.23 (m, 1H), 6.58-6.56 (m, 11H), 5.85 (s, 11H), 5.28 (s, 1H), 4.58-4.50 (m, 1H), 4.40-4.38 (m, 1H), 3.75-3.08 (m, 8H), 2.90-2.65 (m, 8H), 2.21-1.44 (m, 10H).

2-(1,3-dimethyl-1H-indazol-4-yl)-2-((R)-3-(4-(5,6,7,8-tetrahydro-1,8-naphthyridin-2-yl)butoxy)pyrrolidin-1-yl)acetic acid (Diastereomeric Compounds 33-E1 and 33-E2)

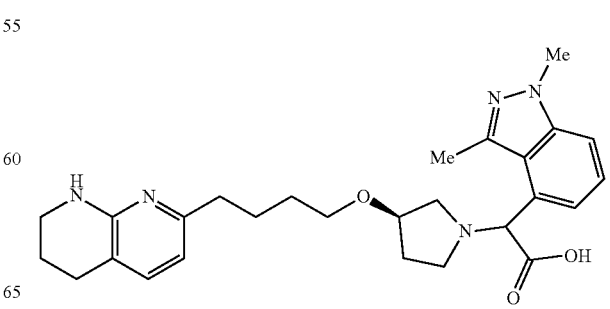

Compound 33-E1 LC/MS ESI 478 (M+H)+ $^1$H NMR (500 MHz, MeOD) δ 7.58 (d, J=6.0 Hz, 1H), 7.49-7.46 (m, 3H), 6.54 (d, J=7.5 Hz, 1H), 5.31 (s, 1H), 4.21 (m, 1H), 4.01 (s, 3H), 3.64-3.32 (m, 8H), 2.84-2.62 (m, 7H), 2.35-2.21 (m, 2H), 1.98-1.57 (m, 6H).

Compound 33-E2 LC/MS ESI 478 (M+H)+ $^1$H NMR (500 MHz, MeOD) δ 7.84 (d, J=8.0 Hz, 1H), 7.75-7.70 (m, 3H), 6.82 (d, J=8.0 Hz, 1H), 5.68 (s, 1H), 4.50 (m, 1H), 4.41 (s, 3H), 3.84-3.32 (m, 8H), 2.84-2.62 (m, 7H), 2.35-2.21 (m, 2H), 1.98-1.77 (m, 6H).

(S)-2-(3-methylbenzo[d]isoxazol-4-yl)-2-((R)-3-(4-(5,6,7,8-tetrahydro-1,8-naphthyridin-2-yl)butoxy)pyrrolidin-1-yl)acetic acid (Diastereomeric Compounds 34-E1 and 34-E2)

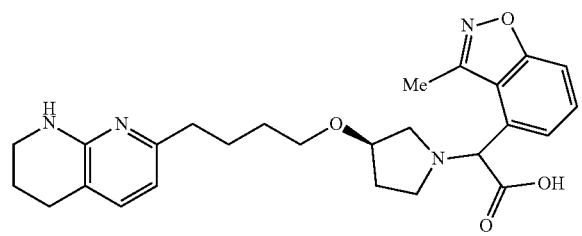 [SMILES: Cc1noc2cccc(C(C(=O)O)N3CC[C@@H](OCCCCc4ccc5c(n4)NCCC5)C3)c12]

Compound 34-E1 LC/MS ESI 465.2 (M+H)+. 1H NMR (400 MHz, MeOD) δ 7.80-7.57 (m, 3H), 7.26 (d, J=6.0 Hz, 1H), 6.41 (d, J=7.2 Hz, 1H), 4.95-4.91 (m, 1H), 4.14 (s, 1H), 3.60-3.00 (m, 8H), 2.89-2.57 (m, 7H), 2.25-1.56 (m, 8H).

Compound 34-E2 LC/MS ESI 465.2 (M+H)+. $^1$H NMR (400 MHz, MeOD) δ 7.74-7.73 (m, 2H), 7.62-7.58 (m, 2H), 6.61 (d, J=7.2 Hz, 1H), 5.48 (s, 1H), 4.30 (s, 1H), 3.80-3.48 (m, 6H), 3.32 (s, 2H), 2.84-2.73 (m, 7H), 2.40-1.67 (m, 8H).

2-(1-methyl-1H-benzo[d][1,2,3]triazol-7-yl)-2-((R)-3-(4-(5,6,7,8-tetrahydro-1,8-naphthyridin-2-yl)butoxy)pyrrolidin-1-yl)acetic acid (Compound 35)

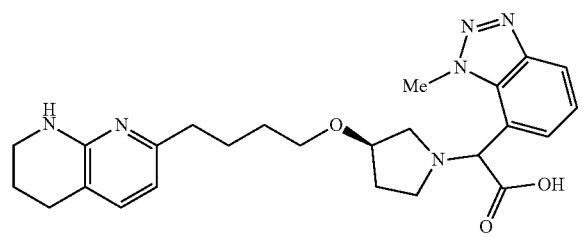 [SMILES: Cn1nnc2cccc(C(C(=O)O)N3CC[C@@H](OCCCCc4ccc5c(n4)NCCC5)C3)c21]

Compound 35 LC/MS ESI 465 (M+H)+ $^1$H NMR (500 MHz, MeOD) δ 7.96-7.94 (m, 1H), 7.80-7.78 (m, 1H), 7.44-7.28 (m, 2H), 6.46-6.43 (m, 1H), 5.05-4.68 (m, 4H), 4.11-4.08 (m, 1H), 3.51-2.98 (m, 8H), 2.78-2.58 (m, 4H), 2.20-1.40 (m, 8H).

2-((R)-3-(1,1-difluoro-5-(5,6,7,8-tetrahydro-1,8-naphthyridin-2-yl)pentyl)pyrrolidin-1-yl)-2-(1-((S)-tetrahydrofuran-3-yl)-1H-indazol-7-yl)acetic acid (Diastereomeric Compounds 36-E1 and 36-E2)

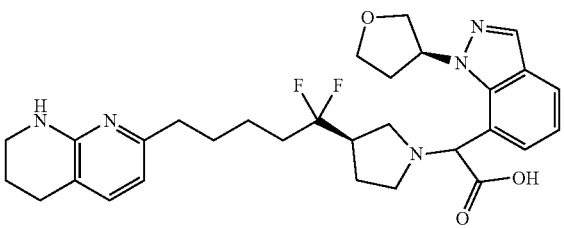 [SMILES: O=C(O)C(c1cccc2cnn([C@H]3CCOC3)c12)N1CC[C@@H](C(F)(F)CCCCc2ccc3c(n2)NCCC3)C1]

Compound 36-E1 LC/MS ESI 554.3 (M+H)+. $^1$H NMR (400 MHz, MeOD) δ 7.97 (s, 1H), 7.70-7.50 (m, 2H), 7.35-7.25 (m, 1H), 7.10-6.95 (m, 1H), 6.37 (d, J=7.2 Hz, 1H), 4.70-4.40 (m, 2H), 4.20-4.00 (m, 2H), 3.92-3.85 (m, 1H), 3.29 (t, J=5.6 Hz, 2H), 2.64 (t, J=6.0 Hz, 4H), 2.61-2.20 (m, 5H), 2.00-1.30 (m, 11H). Chiral SFC M (20% MeOH): ee 100%, Rt=2.04 min.

Compound 36-E2 LC/MS ESI 554.3 (M+H)+. $^1$H NMR (400 MHz, MeOD) δ 7.97 (s, 1H), 7.61 (d, J=8.4 Hz, 2H), 7.32-7.22 (m, 1H), 7.15-6.90 (m, 1H), 6.37 (d, J=7.2 Hz, 11H), 4.70-4.40 (m, 2H), 4.15-4.05 (m, 2H), 3.95-3.80 (m, 2H), 3.35-3.27 (m, 2H), 2.64 (t, J=6.0 Hz, 4H), 2.60-2.20 (m, 5H), 1.95-1.30 (m, 11H). Chiral SFC M (20% MeOH): ee 85%, Rt=3.91 min.

2-((3R)-3-(4-(1,2,3,4-tetrahydro-1,8-naphthyridin-2-yl)butoxy)pyrrolidin-1-yl)-2-(1-((S)-tetrahydrofuran-3-yl)-1H-indazol-7-yl)acetic acid (Diastereomeric Compounds 37-A and 37-B)

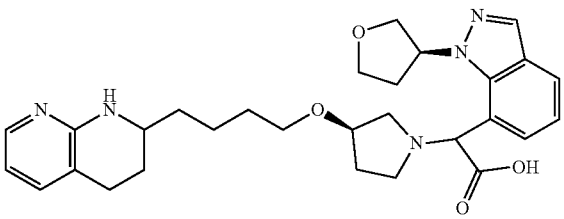 [SMILES: O=C(O)C(c1cccc2cnn([C@H]3CCOC3)c12)N1CC[C@@H](OCCCCC2CCc3cccnc3N2)C1]

Compound 37-A (mixture of 2 stereoisomers from 2-(4-(((R)-pyrrolidin-3-yl)oxy)butyl)-1,2,3,4-tetrahydro-1,8-naphthyridine stereoisomer A) LC/MS ESI 520.3 (M+H)+. $^1$H NMR (400 MHz, MeOD) δ 8.12 (s, 1H), 7.81 (d, J=6.4 Hz, 1H), 7.69-7.66 (m, 2H), 7.34 (d, J=6.0 Hz, 1H), 7.22 (t, J=6.0 Hz, 1H), 6.57-6.55 (m, 1H), 6.10-6.00 (m, 0.5H), 5.40-5.30 (m, 0.5H), 4.28-4.17 (m, 4H), 4.02-3.98 (m, 1H), 3.54-3.10 (m, 6H), 2.80-2.20 (m, 4H), 2.11-1.30 (m, 12H).

Compound 37-B (mixture of 2 stereoisomers from 2-(4-(((R)-pyrrolidin-3-yl)oxy)butyl)-1,2,3,4-tetrahydro-1,8-naphthyridine stereoisomer B) LC/MS ESI 520.2 (M+H)+. 1H NMR (500 MHz, MeOD) δ 8.11-8.10 (m, 1H), 7.80-7.67 (m, 3H), 7.34 (d, J=6.5 Hz, 1H), 7.24-7.22 (m, 1H), 6.57-6.55 (m, 1H), 6.10-6.00 (m, 0.5H), 5.40-5.30 (m, 0.5H), 4.25-3.98 (m, 5H), 3.54-3.10 (m, 8H), 2.80-2.46 (m, 4H), 2.11-1.92 (m, 3H), 1.65-1.45 (m, 7H).

111

2-[2-(propan-2-yl)-1,3-benzoxazol-7-yl]-2-[(3R)-3-[4-(5,6,7,8-tetrahydro-1,8-naphthyridin-2-yl)butoxy]pyrrolidin-1-yl]acetic acid (Compound 38)

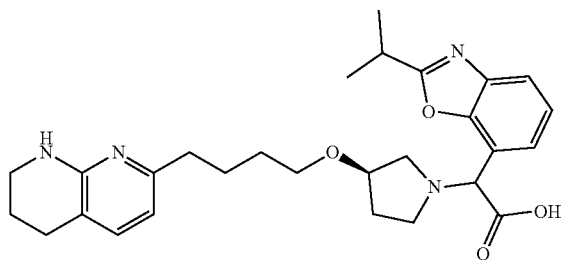 [SMILES: CC(C)c1nc2cccc(C(C(=O)O)N3CC[C@@H](OCCCCc4ccc5c(n4)NCCC5)C3)c2o1]

Compound 38 LC/MS ESI 493 (M+H)+ ¹H NMR (400 MHz, MeOD) δ 7.67-7.58 (m, 2H), 7.42-7.39 (m, 1H), 7.20-7.18 (m, 1H), 6.39 (d, J=7.2 Hz, 1H), 5.05-4.98 (m, 1H), 4.15-4.13 (m, 1H), 3.48-3.15 (m, 9H), 2.72 (t, J=6.0 Hz, 2H), 2.58-2.50 (m, 2H), 2.08-2.04 (m, 2H), 1.88-1.46 (m, 9H), 1.45-1.40 (m, 6H).

2-(1-(cyclopropylmethyl)-1H-pyrrolo[2,3-b]pyridin-5-yl)-2-((R)-3-(1,1-difluoro-5-(5,6,7,8-tetrahydro-1,8-naphthyridin-2-yl)pentyl)pyrrolidin-1-yl)acetic acid (Compound 39)

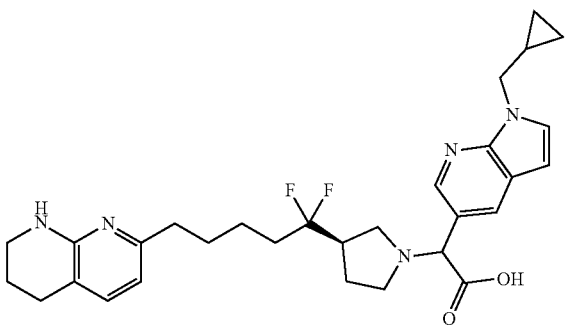 [SMILES: O=C(O)C(c1cnc2c(ccn2CC2CC2)c1)N1CC[C@@H](C(F)(F)CCCCc2ccc3c(n2)NCCC3)C1]

Compound 39 LC/MS ESI 538.4 (M+H)+ ¹H NMR (400 MHz, MeOD) δ 8.39 (s, 1H), 8.21-8.18 (m, 1H), 7.46 (t, J=4.0 Hz, 2H), 7.13-7.02 (m, 1H), 6.48-6.28 (m, 2H), 4.14-4.12 (m, 2H), 3.79 (d, J=6.0 Hz, 1H), 3.39-3.35 (m, 2H), 3.19-3.16 (m, 1H), 2.72-2.28 (m, 8H), 1.91-1.28 (m, 11H), 0.58-0.53 (m, 2H), 0.43-0.39 (m, 2H).

112

2-((R)-3-(1-fluoro-5-(5,6,7,8-tetrahydro-1,8-naphthyridin-2-yl)pentyl)pyrrolidin-1-yl)-2-(1-((S)-tetrahydrofuran-3-yl)-1H-indazol-7-yl)acetic acid (Diastereomeric Compounds 40-A-E1, 40-B-E1 and 40-B-E2)

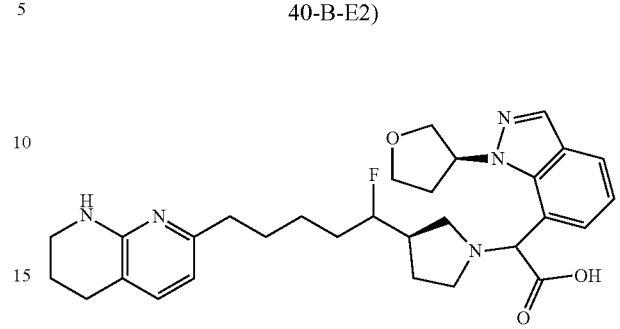

Compound 40-A-E1 LC/MS ESI 536 (M+H)+. 1H NMR (400 MHz, MeOD) δ 8.09 (s, 1H), 7.75-7.73 (m, 1H), 7.62-7.61 (m, 1H), 7.34-7.33 (m, 1H), 7.17-7.14 (m, 1H), 6.47-6.46 (m, 1H), 6.40-6.15 (m, 1H), 5.11-5.05 (m, 1H), 4.70-4.50 (m, 1H), 4.27-4.21 (m, 2H), 4.15-4.13 (m, 1H), 4.01-3.98 (m, 1H), 3.41-3.38 (m, 2H), 3.28-3.00 (m, 3H), 2.80-2.40 (m, 7H), 2.10-1.50 (m, 11H).

Compound 40-B-E1 LC/MS ESI 536.0 (M+H)+. 1H NMR (400 MHz, MeOD) δ 8.12 (s, 1H), 7.82-7.78 (m, 1H), 7.75-7.60 (m, 1H), 7.41-7.35 (m, 1H), 7.28-7.18 (m, 1H), 6.47 (d, J=7.2 Hz, 1H), 6.15-5.95 (m, 1H), 5.35-5.20 (m, 1H), 4.60-4.38 (m, 1H), 4.35-4.08 (m, 3H), 4.05-3.95 (m, 1H), 3.40-3.35 (m, 3H), 3.25-3.10 (m, 2H), 2.80-2.70 (m, 2H), 2.68-2.40 (m, 5H), 2.20-1.20 (m, 11H).

Compound 40-B-E2 LC/MS ESI 536.0 (M+H)+. 1H NMR (400 MHz, MeOD) δ 8.12 (s, 1H), 7.80 (d, J=8.0 Hz, 1H), 7.75-7.66 (m, 1H), 7.41 (d, J=7.6 Hz, 1H), 7.24-7.19 (m, 1H), 6.49 (d, J=7.2 Hz, 1H), 6.20-5.95 (m, 1H), 5.40-5.20 (m, 1H), 4.60-4.40 (m, 1H), 4.25-4.18 (m, 3H), 4.02-3.95 (m, 1H), 3.75-3.60 (m, 1H), 3.42-3.38 (m, 2H), 3.25-3.10 (m, 2H), 2.80-2.70 (m, 2H), 2.68-2.40 (m, 5H), 2.20-1.20 (m, 11H).

2-((R)-3-(1-fluoro-5-(4-methoxy-5,6,7,8-tetrahydro-1,8-naphthyridin-2-yl)pentyl)pyrrolidin-1-yl)-2-(1-((S)-tetrahydrofuran-3-yl)-1H-indazol-7-yl)acetic acid (Diastereomeric Compounds 41-A-E1, 41-A-E2, 41-B-E1 and 41-B-E2)

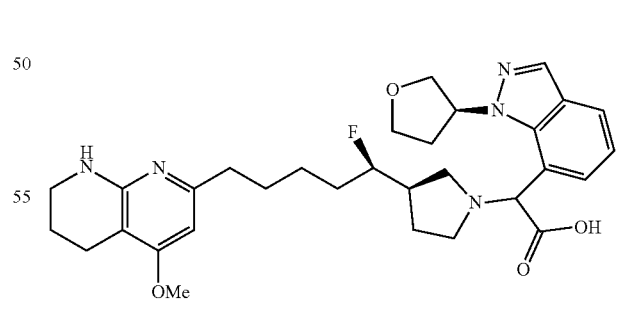

Compound 41-A-E1 LC/MS ESI 566.1 (M+H)+. 1H NMR (400 MHz, MeOD) δ 8.07 (s, 1H), 7.70-7.60 (m, 2H), 7.12 (s, 1H), 6.43 (s, 1H), 6.15-6.05 (m, 1H), 4.50-4.35 (m, 1H), 4.25-4.08 (m, 2H), 4.02-3.85 (m, 5H), 3.25-2.95 (m, 2H), 2.75-2.30 (m, 9H), 2.05-1.40 (m, 11H).

Compound 41-A-E2 LC/MS ESI 566.1 (M+H)+. 1H NMR (400 MHz, MeOD) δ 7.94 (s, 1H), 7.57-7.47 (m, 2H), 7.00-6.97 (m, 1H), 6.32 (s, 1H), 6.15-6.05 (m, 1H), 4.55-4.45 (m, 1H), 4.15-3.95 (m, 3H), 3.89-3.82 (m, 4H), 2.95-2.20 (m, 10H), 1.95-1.40 (m, 11H).

Compound 41-B-E1 LC/MS ESI 566 (M+H) $^1$H NMR (500 MHz, MeOD) δ 8.03 (s, 1H), 7.75-7.64 (m, 2H), 7.15-7.10 (m, 1H), 6.20 (s, 1H), 4.49-4.30 (m, 4H), 3.98-3.95 (m, 1H), 3.83 (s, 3H), 2.65-2.48 (m, 8H), 2.40-2.20 (m, 4H), 1.98-1.80 (m, 5H), 1.70-1.45 (m, 8H). Chiral SFC A (45% EtOH): ee 100%, Rt=3.01 min.

Compound 41-B-E2 LC/MS LC/MS ESI 566 (M+H) $^1$H NMR (500 MHz, MeOD) δ 8.04 (s, 1H), 7.66-7.64 (m, 2H), 7.10-7.05 (m, 1H), 6.20 (s, 1H), 4.45-4.26 (m, 3H), 3.98-3.95 (m, 2H), 3.82 (s, 3H), 2.85-2.10 (m, 11H), 1.98-1.80 (m, 6H), 1.70-1.45 (m, 8H). Chiral SFC A (45% EtOH): ee 98%, Rt=6.79 min.

Example 7: Fluorescence Polarization Assays of Compounds for αvβ6 Binding

Fluorescence Polarization (FP) assays were used to measure compound activity through binding competition with the fluorescein-labeled peptide GRGDLGRL. In the assay, 10 nM of integrin αvβ6 was incubated with the test compound in 2 mM manganese chloride, 0.1 mM calcium chloride, 20 mM HEPES buffer at pH 7.3, 150 mM sodium chloride, 0.01% Triton X-100, 2% DMSO, and 3 nM of the fluorescein-labeled peptide. The assays were run in 384-well plates. For both assay versions, the integrin protein was pre-incubated with the test compounds for 15 minutes at 22° C. before the fluorescein-labeled peptide was added. After the fluorescein-labeled peptide was added, the assay was incubated at 22° C. for 1 hour and fluorescence polarization was measured. $IC_{50}$ values were determined by nonlinear regression, 4-parameter curve fitting (data in FIG. 1).

Example 8: MDCK In Vitro Permeability Assays of Compounds

Compounds were tested for permeability in an MDCK permeability assay. This assay measures the ability of compounds to cross a layer of Madin-Darby Canine Kidney (MDCK) cells from the apical to basolateral side (A→B). This measurement is predictive of the ability of compounds to be absorbed in the gut following oral dosing, an essential characteristic of an orally administered small molecule integrin inhibitor drug.

The assay is run in two formats. One uses wild type MDCK cells with no inhibitor. This method works well in determining the passive permeability of compounds with low efflux by P-glycoprotein (Pgp), and was used to assess permeability of a Reference Compound having the chemical formula shown below. The MDCK value of less than 1 (i.e., less than about 0.23) was obtained for the Reference Compound using this method; an IC50 value of about 96.5 nM was obtained for the Reference Compound using the fluorescence polarization assay of Example 7.

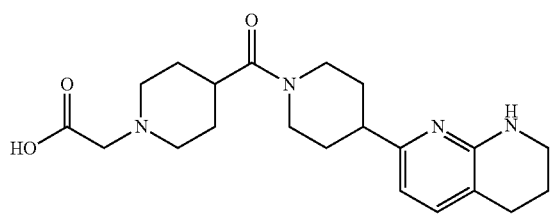 [SMILES: O=C(O)CN1CCC(C(=O)N2CCC(c3ccc4c(n3)NCCC4)CC2)CC1]

| Reference Compound | |
|---|---|
| avb6. (IC50) [nM] | MDCK (A→B) |
| 96.5 | <0.23 |

However, for compounds with Pgp efflux, it is necessary to include a Pgp inhibitor order to determine passive permeability for A→B transmission. In this case, a MDCK-MDR1 cell line overexpressing Pgp is used, and PGP inhibitor GF120918 is included at sufficient concentration (10 μM) to block activity of Pgp. This procedure (MDCK-MDR1 with PGP inh (A→B) [10^6 cm/s]) was used to obtain the data presented in Tables shown in FIG. 2. MDCK permeability values of less than 5 10^6 cm/s predict low absorption in the gut, while permeability values greater than 5 10^6 cm/s predict sufficient absorption in the gut for oral dosing of a small molecule drug.

The detailed experimental procedure is as follows:

| EQUIPMENT | REAGENTS |
|---|---|
| 24-well Cell Culture Plate (PET membrane): Millipore # PSHT 010 R5 | GF 120918 (Pgp inhibitor) Lucifer Yellow |
| 24-well feeder tray: Millipore #PSMW 010 R5 | Reference compounds: Quinidine, Metoprolol, Atenolol |
| Millicell ERS System - Millipore # MERS 000 01 | Cell line: MDCK (ATCC) or MDCK MDR1 (NKI) |
| 96-well U-shape plates (BH Bio# BH-04ML-96U) | Cell culture growth medium (MEM + 10% FBS + 1% NEAA): |
| 96-well microplates (Greiner#655209) 37 □ CO$_2$ Incubator | Trypsin-EDTA (Invitrogen, Cat# 25200-072) |
| Infinite F2000pro (TECAN) | Assay and dosing solution buffer: Hanks Balanced Salt Solution (HBSS, Invitrogen, Cat# 14025-092) with 25 mM HEPES, pH 7.4 Test article and reference compound stock solutions were prepared in DMSO, Lucifer Yellow (LY) stock solution was prepared in the assay buffer. |

Cell Culture and Maintenance:
  Cell stock cultures (MDCK or MDCK MDR1) are maintained in MEM+10% FBS+1% NEAA, grown in 75 cm$^2$ tissue culture treated flasks and split (passed) 2 times weekly to maintain desired confluence.
  For maintenance passage: trypsinized cells are routinely distributed into new flasks at a standard passage ratio of 1:20.
  Seeding assay plates: MDCK assay plates are seeded with MDCK or MDCK MCR1 cells 3-4 days prior to running the assay. 24-well plates are seeded at a cell density of 0.88× 10$^5$/well in a 400 μL apical chamber volume (2.2×10$^5$/mL) with a 25 mL volume of growth medium to the 24-well basal chamber. Assay plates are generally provided with a growth medium change 24 hours prior to the assay.
  Preparation of the assay plates and Trans-epithelial Electrical Resistance (TEER) measurement: MDCK assay plates are rinsed with HBSS+ prior to running the assay. After rinsing, fresh HBSS+ is added to the assay plate in a 400 μL apical chamber volume and a 0.8 mL HBSS+ basal chamber volume. Measure the electrical resistance across the monolayer using the Millicell ERS system ohm meter. (The cells will be used if TEER is higher than 100 ohm*cm$^2$).
  Preparation of dosing solution. Donor solutions are prepared in HBSS+ with 0.4% DMSO and 5 μM test compound.

The donor solution contains 5 µM lucifer yellow for apical dosing, but no lucifer yellow for basolateral dosing. The donor solution may also contain 10 µM GF120918 for Pgp inhibition. Receiver solutions are prepared with HBSS+ with 0.4% DMSO. Donor and receiver solutions were centrifuged at 4000 rpm, 5 min, and supernatants were used for compound dosing.

Preparation of the Cell Plates:
  Remove the buffer from the apical side and basolateral side. Add 600 µL of donor solution (for A-to-B) or 500 µL of receiver solution (for B-to-A) to the apical wells based on plate map.
  A fresh basolateral plate is prepared by adding 800 µL of receiver solution (for A-to-B) or 900 µL of donor solution (B-to-A) to the well of a new 24-well plate.
  Put the apical plate and basolateral plate into a 37□ $CO_2$ incubator.

Preparation of Analytical Plate:
  After 5 min, transfer 100 µL of samples from all donors (for both A-to-B and B-to-A) into appropriate wells of a sample plate for DO. And transfer 100 µL of samples from all apical chambers (the donor of A-to-B and receiver of B-to-A) into appropriate wells of a microplate for Lucifer Yellow D0 (D0 LY)
  Lay the apical plate to the basolateral plate to start transport process.
  At 90 min, separate the apical and basolateral plates and transfer 100 µL of samples from all donors (for both A-to-B and B-to-A) into appropriate wells of a new sample plate for D90, and transfer 200 µL of samples from all receivers into appropriate wells of a sample plate for R90. Transfer 100 µL of samples from all basolateral chambers (receiver of A-to-B and donor of B-to-A) into appropriate wells of a new microplate for Lucifer Yellow R90 (R90 LY).
  Determine LY permeability by reading D0 LY and R90 LY at an excitation wavelength of 485 nm and an emission wavelength of 535 nm using a fluorescent plate reader.

LC/MS/MS Sample Preparation:
  For receiver solution: 60 µL of sample+60 µL ACN with IS (200 ng/mL Osalmid)
  For donor solution: 6 µL of sample+54 µL 0.4% DMSO/HBSS+60 µL ACN with IS (200 ng/mL Osalmid)
  The compound standard curve 20× solutions (0.1-60 µM range) are prepared in MeOH:$H_2O$ (1:1). 1× concentrated solutions (0.005-3 µM range) are prepared by mixing 3 µL of 20× solution with 57 µL 0.4% DMSO HBSS and 60 µL ACN with IS (200 ng/mL Osalmid).

Calculations

Transepithelial electrical resistance (TEER)=(Resistance$_{sample}$−Resistance$_{blank}$)×Effective Membrane Area Lucifer Yellow permeability:

$P_{app}=(V_A/(Area \times time)) \times ([RFU]_{accepter}-[RFU]_{blank})/(([RFU]_{initial, donor}-[RFU]_{blank}) \times Dilution Factor) \times 100$ Plate drug transport assays using the following equation:

Transepithelial electrical resistance (TEER)=(Resistance$_{sample}$−Resistance$_{blank}$)×Effective Membrane Area Drug permeability:

$P_{app}=(V_R/(Area \times time)) \times ([drug]_{receiver}/(([drug]_{initial, donor}) \times Dilution Factor)$ Where $V_R$ is the volume in the receiver well (0.8 mL for A-to-B and 0.4 mL for B-to-A), area is the surface area of the membrane (0.7 $cm^2$ for Millipore-24 Cell Culture Plates), and time is the total transport time in seconds.

Percentage Recovery=100×(Total compound in donor at 90 min×Dilution Factor+Total compound in receiver at 90 min)/(Total compound in donor at 0 min×Dilution Factor)

INCORPORATION BY REFERENCE

All of the U.S. patents and U.S. patent application publications cited herein are hereby incorporated by reference.

EQUIVALENTS

Those skilled in the art will recognize, or be able to ascertain using no more than routine experimentation, many equivalents to the specific embodiments of the invention described herein. Such equivalents are intended to be encompassed by the following claims.

We claim:
1. A compound of formula (I):

A-B—C    (I)

wherein:
A is

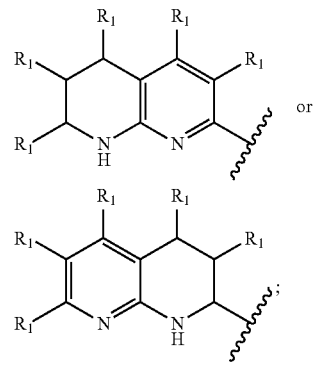

B is-alkylene-(O)—;
C is

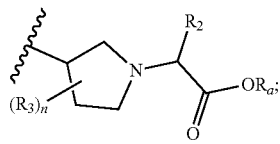

R is H, alkyl, or aryl;
$R_1$ is independently selected from the group consisting of H, alkyl, halide, alkoxy, $CF_3$, OH, alkylene-OH, $NO_2$, —N(H)R, and $NH_2$;
$R_2$ is substituted or unsubstituted benzoxazolyl, quinolinyl, benzothiophenyl, indazolyl, indolyl, benzotriazolyl, benzisoxazolyl, benzisothiazolyl, or benzthiazolyl;
$R_3$ is independently selected from the group consisting of H, halide, $CF_3$, alkyl, alkylene-alkoxy, aryl, hydroxyl, and alkoxy;

R$_a$ is H, (C$_1$-C$_6$)alkyl, —(C$_1$-C$_6$)alkylene-O—(C$_1$-C$_6$)alkyl, or —(C$_1$-C$_6$)alkylene-O—C(O)O(C$_1$-C$_6$)alkyl; and n is 0, 1, 2, 3, or 4;

or a pharmaceutically acceptable salt thereof.

2. The compound of claim 1, wherein B is —(CH$_2$)$_4$—O—.

3. The compound of claim 1, wherein at least one instance of R$_1$ is alkyl, halide, OMe, OH, alkylene-OH, or NH$_2$.

4. The compound of claim 3, wherein the at least one instance of R$_1$ is OMe.

5. The compound of claim 1, wherein all instances of R$_1$ are H.

6. The compound of claim 1, wherein R$_2$ is unsubstituted.

7. The compound of claim 1, wherein R$_2$ is substituted.

8. The compound of claim 7, wherein R$_2$ is substituted with one or more substituents independently selected from the group consisting of alkyl, heterocycloalkyl, alkoxy, —(O)alkyl, -alkylene-O-alkyl, -alkylene-cycloalkyl, -alkylene-O-alkyl, cycloalkyl, aryl, heteroaryl, OH, halide, -alkylene-heteroaryl, -alkylene-O-cycloalkyl, -alkylene-O-heterocyclocycloalkyl, —O-alkylene-cycloalkyl, and —O-alkylene-heterocycloalkyl, wherein each substituent can be further substituted with alkyl, halide, or alkoxyl.

9. The compound of claim 1, wherein R$_2$ is selected from the group consisting of:

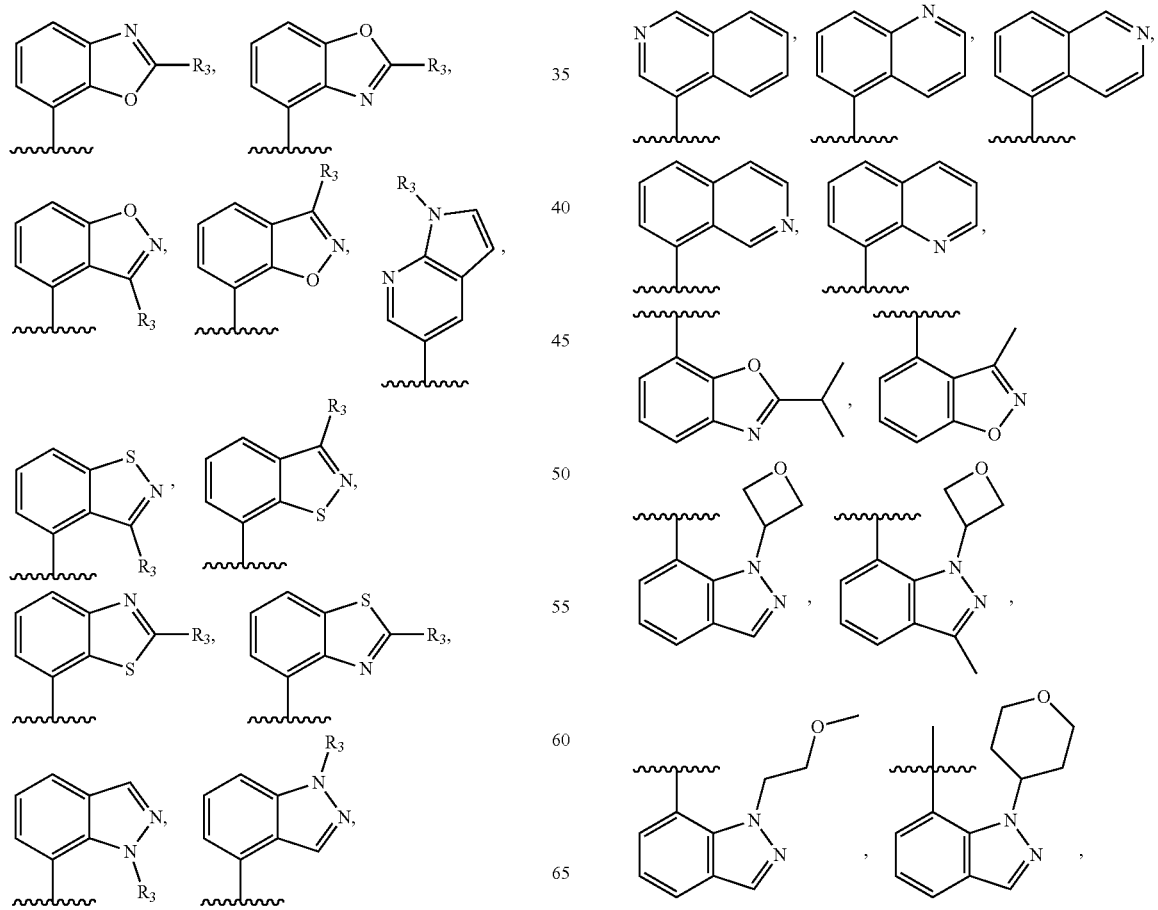

wherein R$_3$' is selected from the group consisting of alkyl, cycloalkyl, alkyl-cycloalkyl, alkoxy, and O-containing heterocycloalkyl.

10. The compound of claim 1, wherein R$_2$ is selected from the group consisting of:

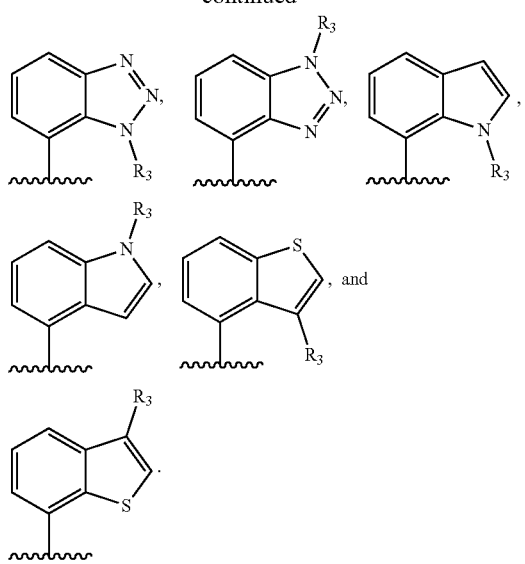

-continued

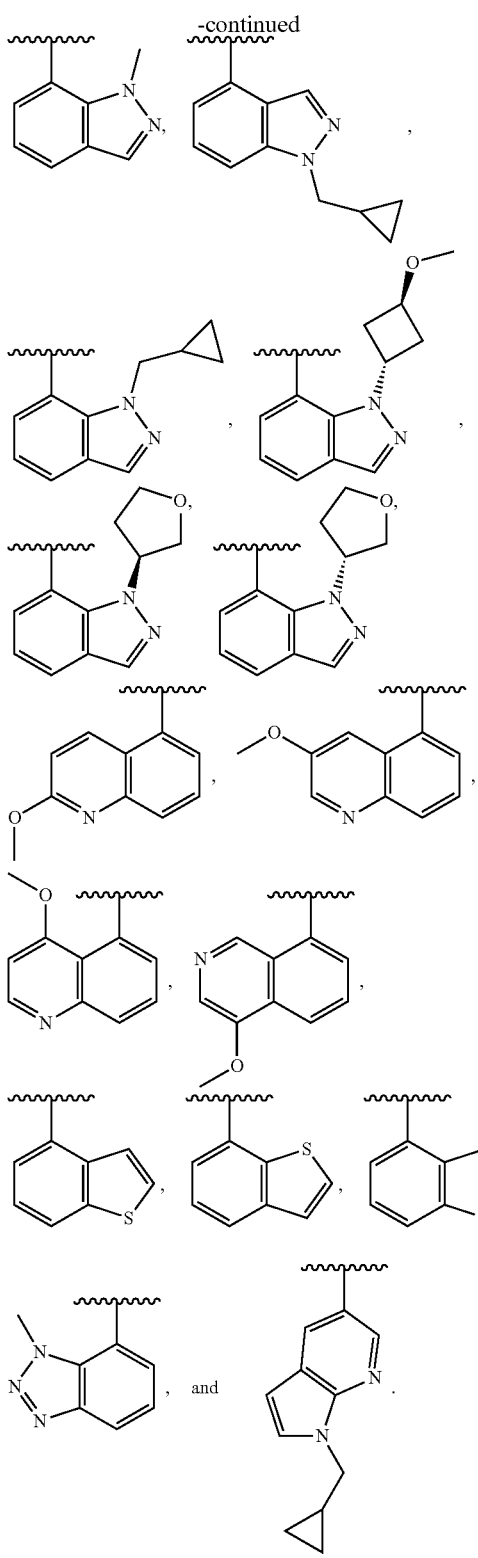

11. The compound of claim 1, wherein $R_3$ is H, halide, Me, OMe, or Ph.

12. The compound of claim 1, wherein $R_a$ is H.

13. A pharmaceutical composition, comprising a compound of claim 1; and a pharmaceutically acceptable excipient.

14. The compound of claim 1,
wherein:
each $R_1$ is H;
$R_a$ is H; and
n is 0;
or a pharmaceutically acceptable salt thereof.

15. The compound of claim 14, wherein B is —(CH$_2$)$_4$—O—.

16. The compound of claim 14, wherein $R_2$ is selected from the group consisting of

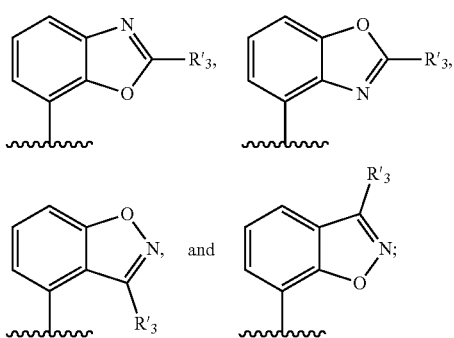

or the group consisting of

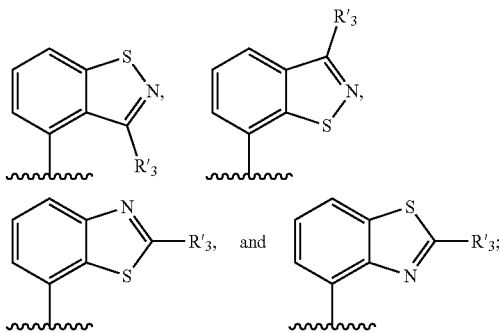

or the group consisting of

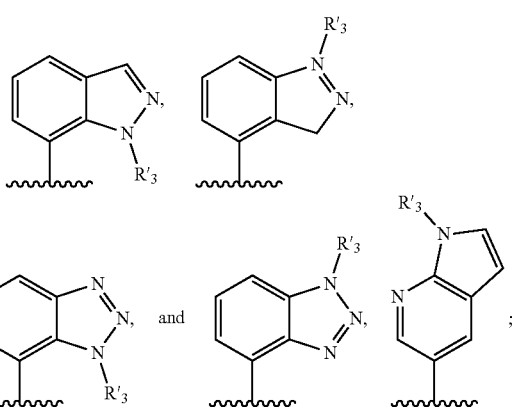

or the group consisting of

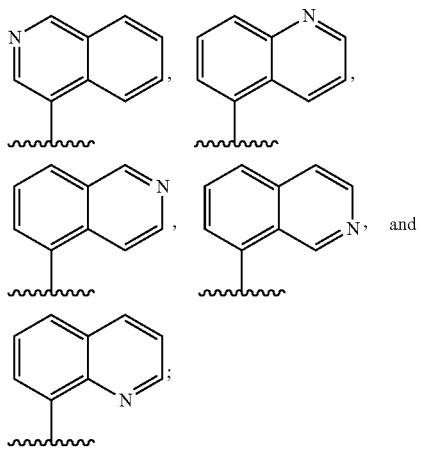

wherein R₃' is selected from the group consisting of alkyl, cycloalkyl, alkyl-cycloalkl, alkoxy, and O-containing heterocycloalkyl.

17. The compound of claim 14, wherein R₂ is selected from the group consisting of

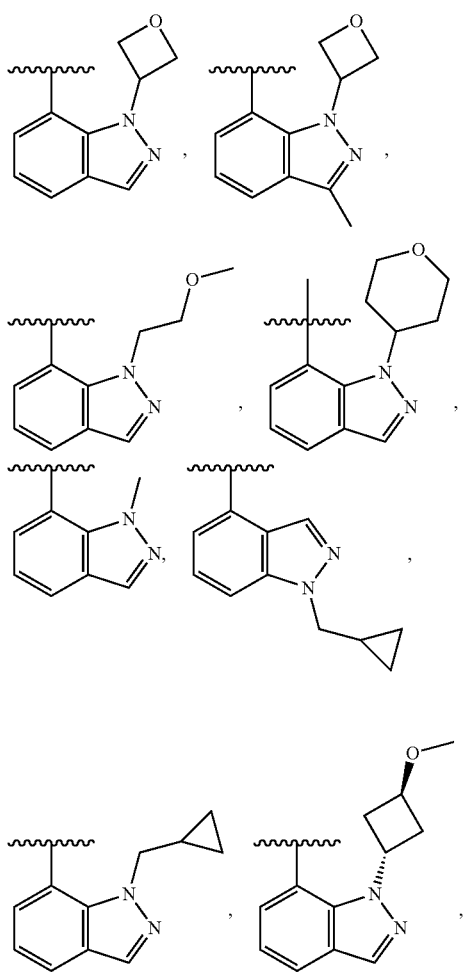

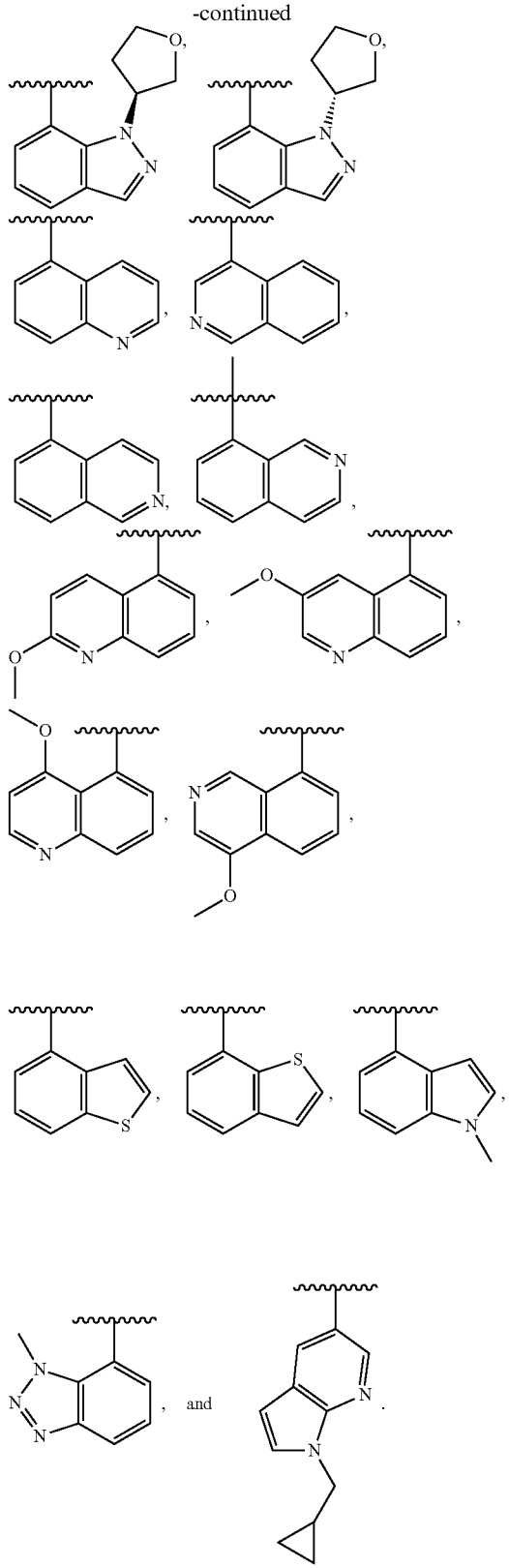

18. A pharmaceutical composition formulated for oral administration, comprising a compound of claim 14 or a pharmaceutically acceptable salt thereof; and a pharmaceutically acceptable excipient suitable for oral administration.

19. The compound of claim 1 selected from the group consisting of:
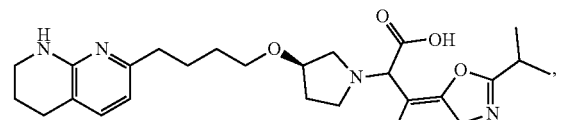
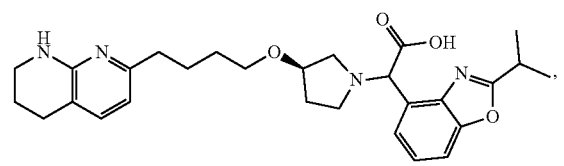
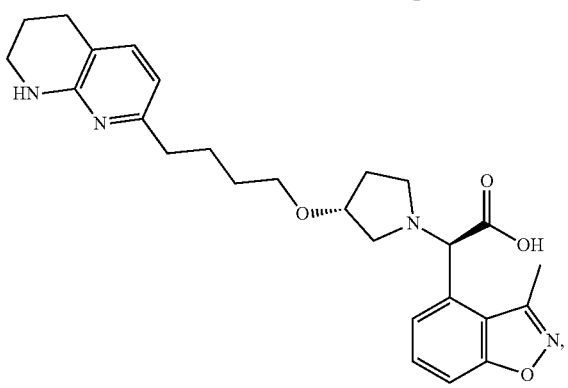
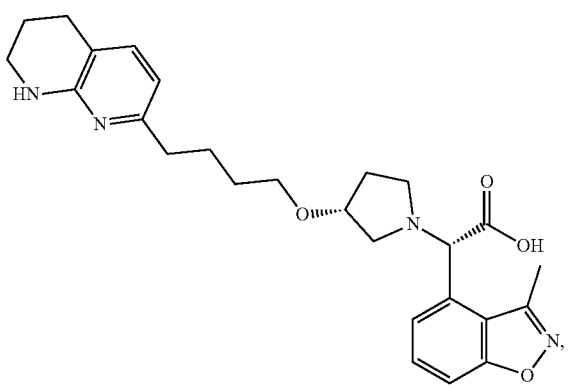
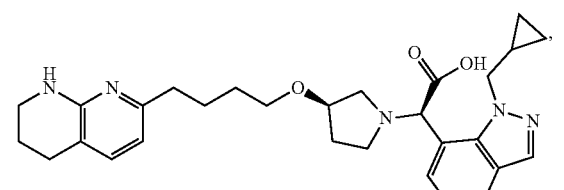
-continued
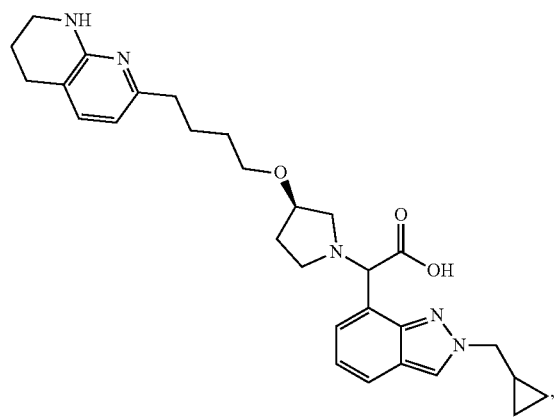
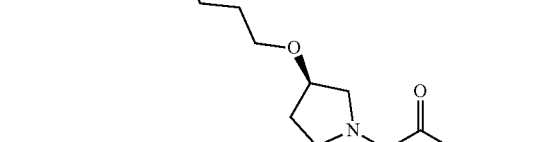
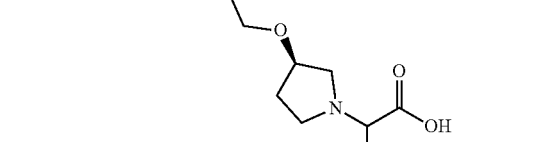
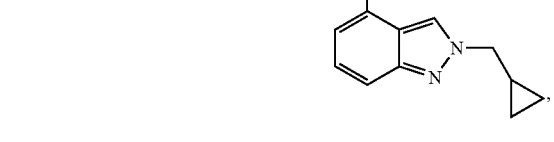
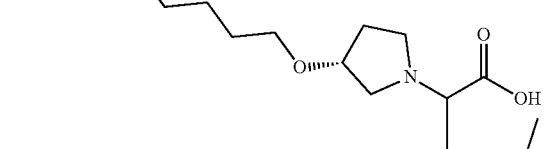

125
-continued
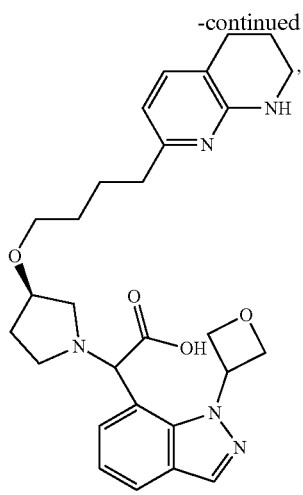
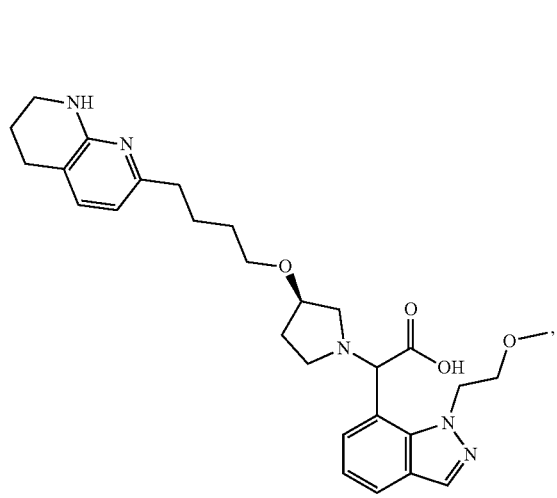
126
-continued
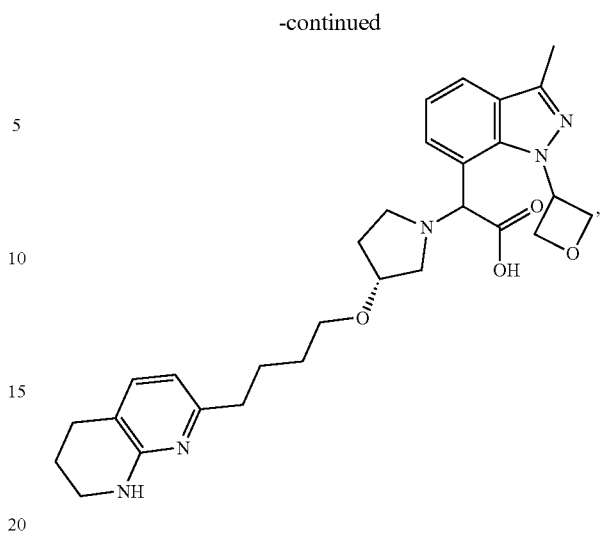
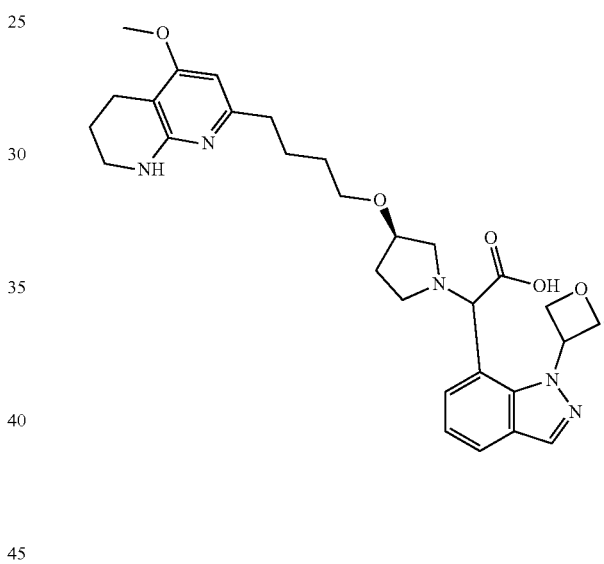
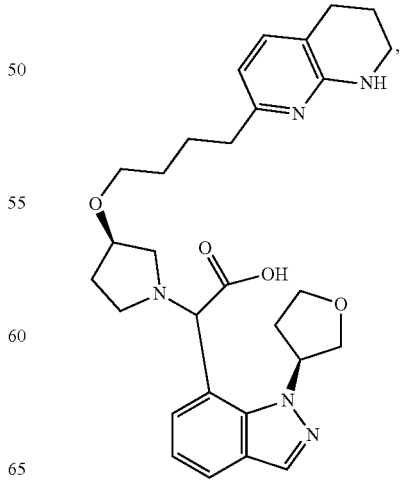

127 -continued
128 -continued
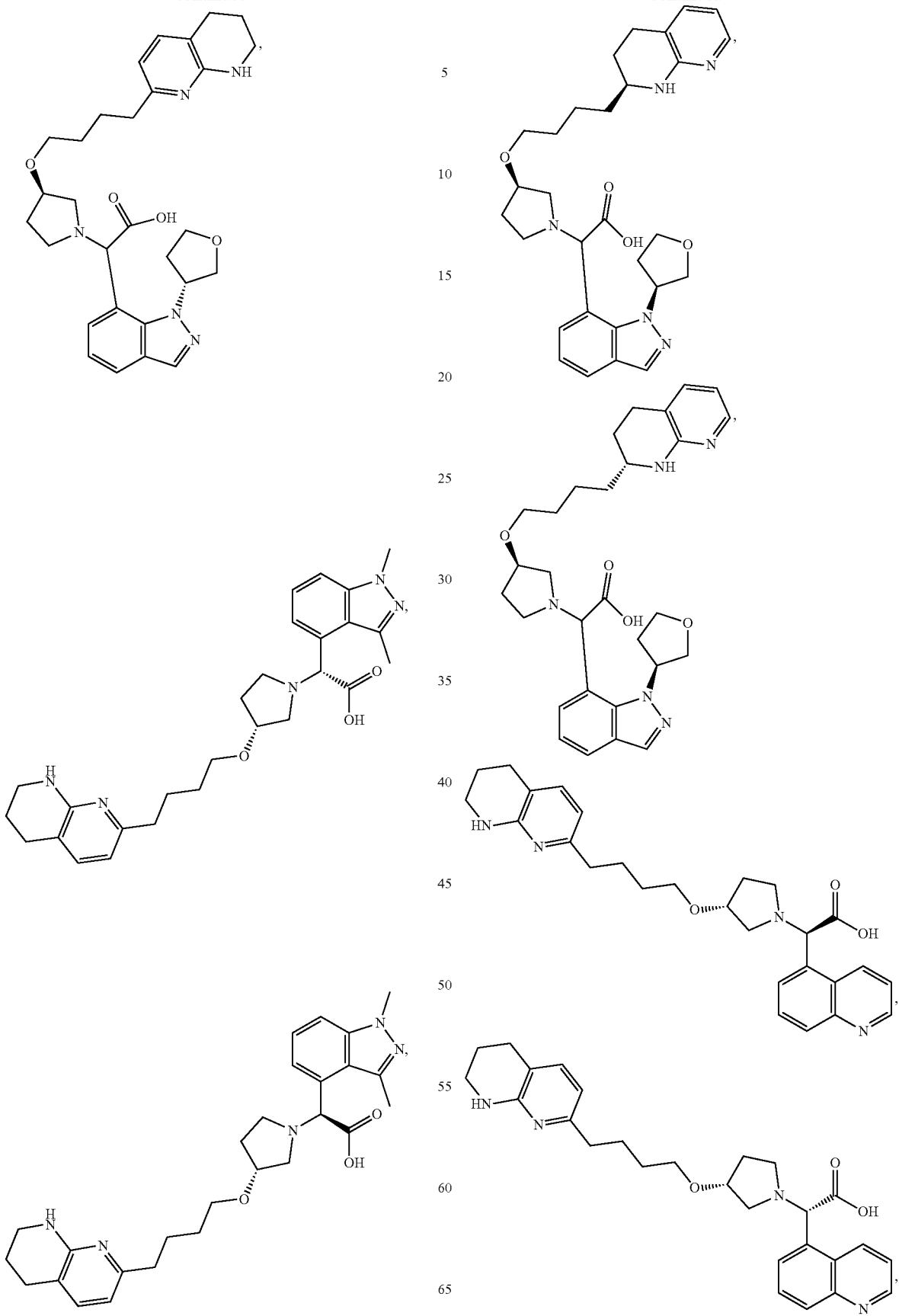

129
-continued
130
-continued
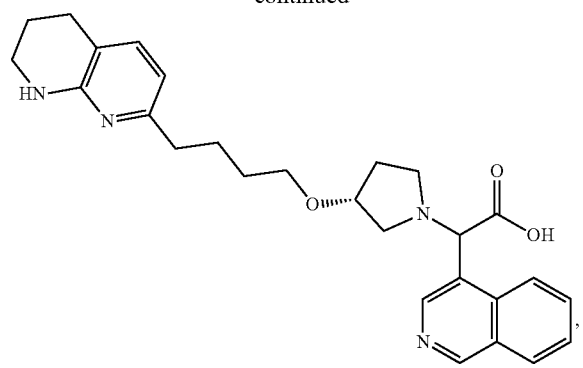
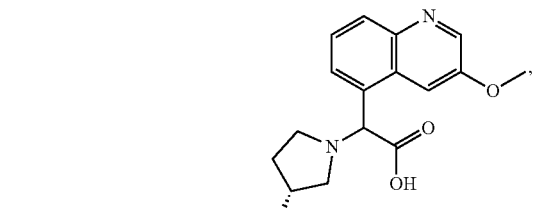
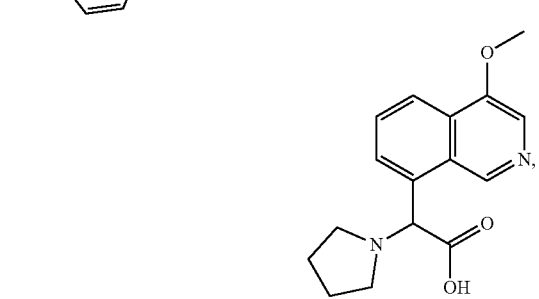
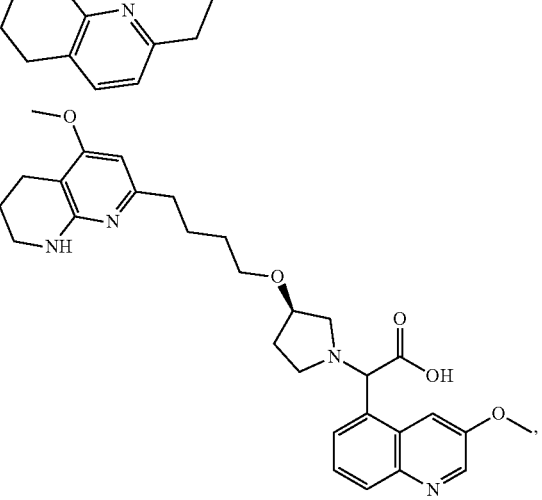
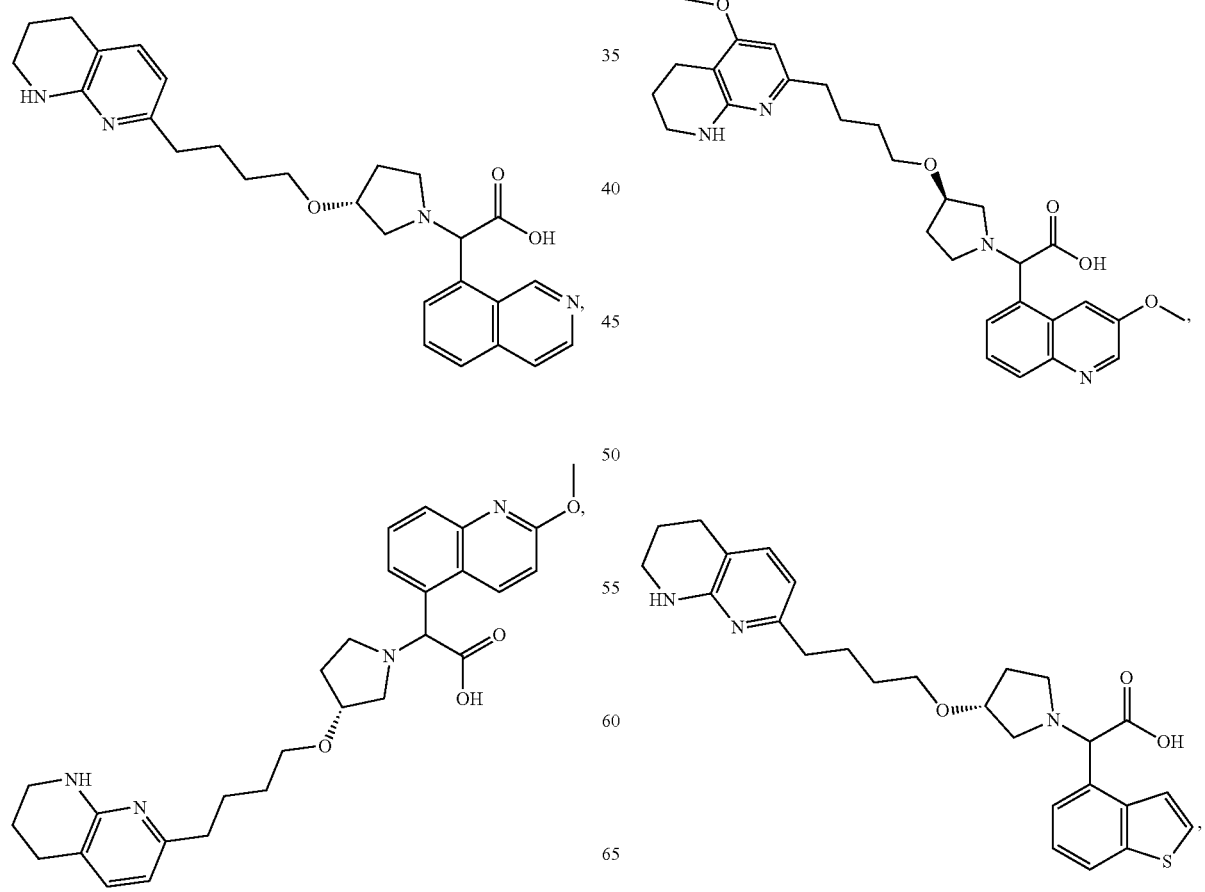

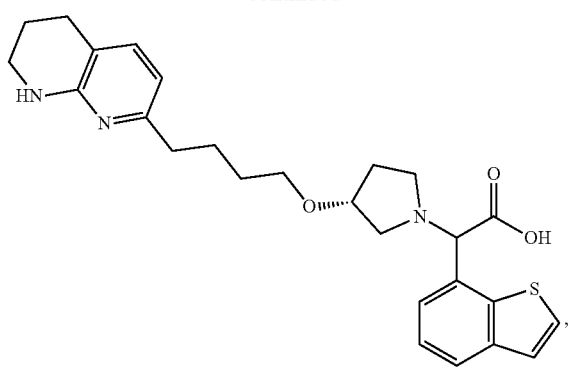
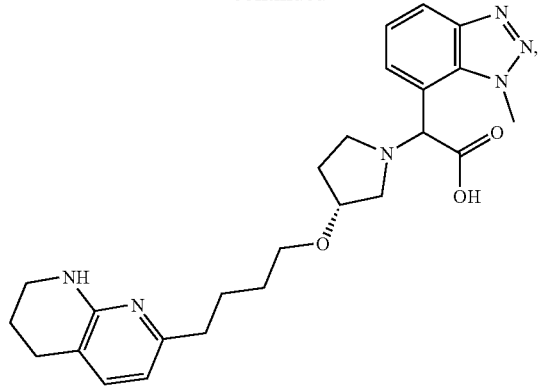 [SMILES: Cn1nnc2cccc(C(C(=O)O)N3CC[C@@H](OCCCCc4ccc5c(n4)NCCC5)C3)c21]
or a pharmaceutically acceptable salt thereof.
20. A compound having the structure:
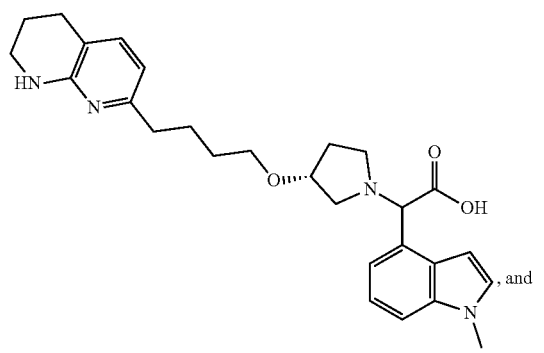
, and
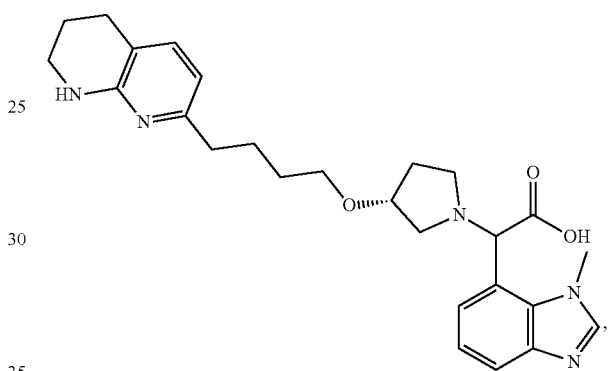
or a pharmaceutically acceptable salt thereof.
* * * * *